United States Patent [19]
Jenkins

[11] Patent Number: 6,028,608
[45] Date of Patent: Feb. 22, 2000

[54] SYSTEM AND METHOD OF PERCEPTION-BASED IMAGE GENERATION AND ENCODING

[76] Inventor: Barry Jenkins, 248 Meadow Dr., Auburn, Pa. 17922

[21] Appl. No.: 08/853,139

[22] Filed: May 9, 1997

Related U.S. Application Data

[60] Provisional application No. 60/033,710, Dec. 20, 1996.

[51] Int. Cl.[7] .................................................. G06F 15/00
[52] U.S. Cl. ............................................................ 345/433
[58] Field of Search .................................. 345/422, 433, 345/419, 421, 473, 474, 475

[56] References Cited

U.S. PATENT DOCUMENTS

| | | | |
|---|---|---|---|
| 4,479,784 | 10/1984 | Mallinson et al. | 364/518 |
| 5,031,117 | 7/1991 | Minor et al. | 364/522 |
| 5,043,922 | 8/1991 | Matsumoto | 364/518 |
| 5,091,960 | 2/1992 | Butler | 364/522 |
| 5,138,699 | 8/1992 | Minor et al. | 345/433 |
| 5,222,204 | 6/1993 | Swanson | 345/433 |
| 5,239,624 | 8/1993 | Cook et al. | 364/518 |
| 5,289,577 | 2/1994 | Gonzales et al. | 345/422 |
| 5,293,480 | 3/1994 | Miller et al. | 364/522 |
| 5,317,689 | 5/1994 | Nack et al. | 345/433 |
| 5,371,896 | 12/1994 | Gove et al. | 345/433 |
| 5,414,801 | 5/1995 | Smith et al. | 345/433 |
| 5,491,780 | 2/1996 | Fyles et al. | 345/422 |
| 5,493,643 | 2/1996 | Soderberg et al. | 345/422 |
| 5,511,156 | 4/1996 | Nagasaka | 345/433 |
| 5,550,959 | 8/1996 | Freeman | 345/422 |
| 5,596,686 | 1/1997 | Duluk, Jr. | 345/422 |
| 5,600,763 | 2/1997 | Greene et al. | 345/422 |

*Primary Examiner*—Phu K. Nguyen
*Attorney, Agent, or Firm*—Oblon, Spivak, McClelland, Maier & Neustadt, P.C.

[57] ABSTRACT

A computer implemented method of image generation that employs adaptive, progressive, perception-based spatio-temporal importance sampling to reduce the cost of image generation. The method uses an adaptive approach to sampling which employs refinement criteria based on specific spatio-temporal limits of human vision. By using these refinement criteria the method produces an image with a spatio-temporal structure that is closely matched to the spatio-temporal limits of human vision. Using one sampling criteria the spatial sampling density is adjusted in proportion to the sampled region's exposure duration in a manner that substantially reflects the visual systems's increase in acuity as a function of exposure time. Using other criteria the spatial and temporal sampling frequencies of a region of the image stream are adjusted based on the measured or estimated retinal velocity of the sampled element in a manner that substantially reflects both dynamic visual acuity limits of vision and the critical temporal sampling frequency for the perception of smooth motion. The method includes image parallel, shared-memory multiprocessor implementations based on sample reprojection and primitive reprojection, the latter using a technique of adaptive rasterization. In these implementations the natural temporal image coherence and temporal visibility coherence of the image stream produce a temporal locality of data reference that enhances performance of the system. Because temporal image coherence and temporal visibility coherence increase the spatial resolving performance of the human visual system, the performance of the present method parallels the performance of human vision making performance degradations relatively invisible to the user.

16 Claims, 27 Drawing Sheets

```
struct sample                              /* array accessed by variable sample_array_index */
{
    short int  xi, yi;                     /* image space coordinates of the sample */
    float      fxi, fyi;                   /* floating point representation of image-space coordinates*/
    int        xi_last, yi_last;           /* image space coordinates of sample during last epoch*/
    float      vxi, vyi;                   /* Image-plane velocity */
    float      vxi_last, vyi_last;         /* image space velocity during last sampling epoch*/
    int        rx, ry;                     /* retinal location of sample during last epoch*/
    float      x, y, z;                    /* object space coordinates of the sample */
    float      xn, yn, zn;                 /* primitive normal at the sample location */
    float      u, v;                       /* texture coordinates at the sample */
    float      A, C1, C2;                  /* Diffuse shading components in AC1C2 color space*/
    int        primitive_index;            /* reference to a primitive list */
    int        material_index;             /* reference to a material list */
    int        exposure_time;              /* the clock time when the sample was first generated*/
    float      LA[2], LC1[2], LC2[2];      /* Shading components in earlier epoch - for motion blur*/
    char       LOD;                        /* indicates the level-of-detail of the database for sample */
    char       spotsize_x;                 /* indicates the image area width covered by the sample*/
    char       spotsize_y;                 /* indicates the image area height covered by the sample*/
    char       resolvabilityflag;          /* Bits set to indicate reason for limited resolvability */
    short int  lastime;                    /* clock time at last actual reprojection*/
};

struct primitive
{
    int   primitive_id;                    /* Unique value for each primitive in the database */
    int   vertex[3];                       /* Index reference to vertex in a shared vertex list */
    int   object;                          /* Index reference to source object that references - */
                                           /* - object specific transformation & other object data */
    int   material_index;                  /* reference to a material list */
    float normal [x, y, z,];               /* primitive normal */
    int   object_class;                    /* Classification of soucrce object based on dynamic */
                                           /* - occlusion properties. (See copending application) */
    char  moving_or_not;                   /* ==0 if source object is stationary in 3 space, else ==1*/
    int   exposure_time;                   /* the clock time when the primitive first became exposed */
    char  resolvabilityflag;               /* Bits set to indicate reason for limited resolvability */
    char  fastest_vertex_x;                /* Indicates which vertex has the fastest estimated or - */
                                           /* measured retinal velocity in x dimension */
    char  fastest_vertex_y;                /* Indicates which vertex has the fastest estimated or - */
                                           /* measured retinal velocity in x dimension */
    float vximax_last, vyimax_last;        /* max image-space velocity during last sampling epoch*/
    short int  lastime;                    /* clock time at last actual reprojection*/
};
```

*FIG. 12*

SYSTEM AND METHOD OF PERCEPTION-BASED IMAGE GENERATION AND ENCODING

CROSS-REFERENCE TO RELATED CO-PENDING APPLICATION

The present application is related to copending application Ser. No. 08/852,899, also naming Barry Jenkins as sole inventor and filed on even date herewith. The contents of the copending application are incorporated herein by reference.

This is a non-provisional application based on provisional application Ser. No. 60/033,710, filed on Dec. 20, 1996, incorporated herein by reference.

BACKGROUND OF THE INVENTION

1. Field of the Invention

This invention relates to a method and system of generating a perceptually lossless image stream using perception-based adaptive, progressive, spatio-temporal importance sampling.

2. Description of Background

The design of image display and encoding systems has been significantly influenced by known psychophysical parameters of human visual performance. Several spatial, temporal, and intensity limits of the human visual system have been exploited to increase the efficiency of image encoding and display.

The RGB encoding of color images is a fundamental example of image engineering that reflects human visual performance, in this case the tristimulus nature of visual color coding in the brain. The NTSC color coding scheme and derivatives including CCIR 601 4:2:2 encoding reflect an important performance limit of human vision, namely the decreased contrast sensitivity to isoluminant chrominance information.

In addition to limits of static contrast sensitivity, the limited temporal bandwidth of the human visual system has been exploited in the design of image display and encoding systems. The frame rate of motion picture and television formats have generally been designed to match the lower limits of visual temporal integration.

More advanced coding schemes exploit the dynamic contrast sensitivity characteristics of the human visual system. In human vision the contrast sensitivity to high spatial frequency decreases with temporal frequency above about 2 Hz. In addition the contrast sensitivity to low spatial frequencies increases at low temporal frequencies then decreases above 10 Hz. Contrast sensitivity to all isoluminant color decreases above 2 Hz. These are fundamental spatio-temporal limits of human vision which are described by the spatio-temporal contrast sensitivity function or Kelly Surface in Kelly (1985). This paper and other referenced papers are more fully cited at the end of this specification, and are incorporated herein by reference.

Several coding schemes for moving images exploit these dynamic performance limits by coding high spatial frequency luminance and isoluminant color information at a lower temporal frequency than low spatial frequency luminance information. Three-dimensional subband coding directly incorporates this type of compression. Interlace is a common encoding method that effectively transmits a crude form of three-dimensional subband encoding. Other compression schemes such as MUSE, as well as some systems that exploit interframe coherence, indirectly result in an image stream in which low spatial frequencies are displayed more rapidly than high spatial frequencies.

While image compression, encoding, and display technologies have been greatly influenced by visual performance considerations; comparatively little work has been done to exploit the spatio-temporal limits of human vision during the synthesis of computer generated imagery. This is true despite the fact that much more information is available about the visible spatio-temporal structure of the image stream during synthetic image generation than during the encoding of images using conventional film or video cameras.

One of the first methods to directly employ known limits of visual perception during image synthesis was the use of contrast metric as an adaptive sampling criteria as described by Mitchell (1987). In the method of adaptive sampling, first suggested by Whitted (1980), an image region is initially sampled with a sparse sampling and the samples are analyzed to estimate the local image information content. Further samples are obtained in subregions wherein the analysis suggests a high image information content. The initial sampled region is so subdivided by this adaptive sampling process wherein the local sample density is made in some proportion to the local image information content. FIGS. 1A through 1G are a progression of images showing successive refinements of a portion of an image bounded by rectangle ABCD using adaptive sampling. In FIG. 1A, initial rays have been traced through the corners and the center. It is determined that the colors of BE and CE are too different (by comparison to some predetermined criteria), so the image is refined by adding a new point at the center of the upper half of the rectangle bounded by BCE, as shown in FIG. 1B. Assuming that G and E still are not close, the process is repeated by adding a new point K. When K is found to stabilize the image, then the process continues with the lower half of BCE. By performing this successive refinement, the rectangle ABCD can be anti-aliased using the relative weights as shown in FIG. 1G.

In early implementations intensity differences and other statistical measures of intensity variation (e.g. variance) were determined in a sampling region and compared to predetermined intensity-based stopping criteria. Mitchell (1987) suggested the use of stopping criteria based on contrast. The contrast criteria is more perception-based than absolute intensity metrics because, for the human visual system, the amount of visible image information is determined more by contrast structure than by absolute intensity variations. Moreover Mitchell employed different contrast stopping criteria for red contrast, green contrast, and blue contrast which reflect the sensitivity of the human visual system to each of these color contrasts.

This technique of employing a wavelength based contrast refinement criteria for adaptive sampling was later extended by Bolin and Meyers (ACM SIGGRAPH Proceedings 1995, pg409–418) in a method of adaptive sampling in which image information is synthesized directly into the frequency domain. Bolin and Meyers employed the AC1C2 color space in which A is an achromatic or luminance channel and C1 and C2 are chrominance channels. In this method the refinement criteria is different for the three channels and reflects the visual system's increased sensitivity to luminance contrast as shown in FIG. 2. FIG. 2 illustrates the human spatial contrast sensitivity functions (CSF) for achromatic and isoluminant chrominance contrast. Contrast sensitivity is the inverse of the minimum visible contrast and is plotted in FIG. 2 for various spatial frequencies. Typical for human spatial contrast sensitivity functions, higher spatial frequencies require greater contrast to be visible. The spatial contrast sensitivity function is a measure of the spatial acuity of the visual system.

The method of Bolin and Meyer further develops the use of a contrast refinement criteria by effectively weighing the contrast by the spatial frequency in a way that reflects the actual spatial CSF. In this method a discrete cosine transform (DCT) representing local samples is recomputed for each new sample generated. The DCT expresses the local image structure in terms of discrete spatial frequency components. The discrete cosine transform is convoluted by the spatial CSF to compute a running overall contrast metric that is effectively weighted by spatial frequency. Changes in the contrast metric with new samples are used as criteria for further sampling. The motivation of this method is to produce image information that can be used directly by image compression schemes. Unfortunately the method is extremely expensive since it requires recomputation of DCT for each sample. Its computational cost makes it unsuitable for application to real-time image generation.

In fact, to date the general technique of adaptive sampling has not been applied to real-time image generation in any significant way. The adaptive sampling approach is not easily applied to conventional real-time graphics systems. These graphics systems are generally implemented as object-order transformation-rasterization pipelines in which the rasterization units have write-only access to a fixed, hardwired subset of samples in the image buffer. In a typical implementation the set of samples accessed by a rasterization unit may be widely dispersed throughout the image to insure load balancing of the rasterizers. This mapping of rasterizer to image does not allow adaptive sampling because the rasterizer is generally unable to read surrounding samples. In addition typical graphics systems implement rasterizers as ASICs which perform relatively simple rasterization algorithms based on linear incremental interpolation such as Pineda arithmetic. These simple rasterization units generally cannot be programed to perform more complex tasks required by an adaptive sampling scheme. For these reasons adaptive sampling has heretofore been employed exclusively in non-real-time image generation methods that use a strictly image-order point sampling technique such as ray tracing or ray casting.

In addition to spatial contrast limits of human vision the temporal responsiveness of retinal and higher processing elements imposes significant limits on the performance of the human visual system. Image elements that are presented to the visual system are not fully resolved by the system for a time period that approaches 1000 ms. FIG. 3 (from Harwerth (1980)) shows the contrast sensitivity plotted against exposure time for various spatial frequencies for two experimental subjects. From the figure it can be seen that low spatial frequencies (e.g., 0.50 cycles/degree) are fully resolved after 100 ms of exposure whereas higher spatial frequencies (e.g., 12 cycles/degree) are not fully resolved for exposures less than one second. From the figure it can be seen that low spatial frequencies (eg. 0.50 cycles/degree) are fully resolved after 100 ms of exposure whereas higher spatial frequencies (eg. 12 cycles/degree) are not fully resolved for exposures less than one second. A more recent study by Luntinen et al. also shows the pronounced effect of exposure time on contrast sensitivity, particularly for high spatial frequencies up to 1000 ms. FIG. 13 shows four graphs (A through D) in which contrast sensitivity is plotted as a function of exposure time from 0 to 10 seconds. In each graph the relationship is plotted for different total exposure areas of the viewed surface (a grating pattern). Each graph represents the relationship for one of four spatial frequencies as indicated. This study shows that contrast sensitivity is decreased by low exposure time and low exposure area. Note that the increase in contrast sensitivity with increasing spatial frequency in this case is because the measured low frequencies are below the "peak" spatial frequency on the spatial contrast sensitivity curve under the employed experimental conditions.

During real-time image synthesis it is possible to determine the exposure duration of image elements (e.g. graphics primitives) in the image stream. Using this information primitives with a low exposure time could be rendered at a decreased resolution without producing visual artifact. Existing real-time image generation systems do not exploit this fundamental spatio-temporal limit of human vision to reduce the cost of producing a perceptually lossless image stream.

A related spatio-temporal limit of the human visual system is the dynamic visual acuity (see Brown (1972b)) which expresses the acuity of the visual system for moving objects. Image elements that undergo optical flow on the retinal receptor surface produce transient stimulation of retinal and higher processing elements that may not meet the integrational time required to completely resolve the moving image elements. As a result, objects with a high retinal image velocity are poorly resolved by the visual system. FIG. 4 (from Kelly (1985)) shows the spatial contrast sensitivity function for targets (e.g., sinusoidal gratings) moving at various retinal velocities. This figure illustrates that as retinal velocity increases the sensitivity to high spatial frequencies is lost first while the sensitivity to low spatial frequencies is relatively preserved. (At very low retinal velocities (e.g. 0.012 degrees/sec) the sensitivity to low spatial frequencies is actually increased while the sensitivity to high spatial frequencies is still decreased by retinal motion). Eye movements tend to reduce the retinal image velocity of tracked image elements through the oculomotor strategies of pursuit and fixation. Nevertheless for objects with high image-space velocity, high image-space acceleration, or unpredictable image-space motion, oculomotor tracking is not completely accurate and results in retinal image motion that decreases the resolvability of the moving elements. Relationships describing the efficacy of oculomotor pursuit such as FIG. 5 (from Lisberger (1987)) which relates retinal image velocity as a function of image-space acceleration and predictability are known and can be used to estimate retinal velocity based on image-space velocity and/or acceleration of the tracked elements.

Because the image-space velocity of individual graphics elements (e.g., primitives or objects) in an image stream can be determined during image generation, the resolution of such elements could, in principle, be reduced without incurring a loss of visible information. Unfortunately no existing image generation system employs this method of selecting the rendering resolution of a graphics element (e.g., primitive) to reflect the image-space velocity of the element in a manner that reflects known limits of dynamic visual acuity. Even real-time image generation systems such as the system by CAE Electronics Ltd. of Saint-Laurent, Quebec, Canada, which employs an eye tracker that would allow the direct determination of retinal image velocity of elements, does not exploit this temporal limit of human vision to reduce the cost of image generation.

A third spatio-temporal limit of human vision, closely related to the first two, is expressed by the critical temporal sampling frequency (CTSF) for the perception of smooth motion. Successive stimulation of non-contiguous retinal elements results in a perceptual temporal aliasing phenomena that results in an appearance of staggered, unsmooth motion. This type of discontinuous stimulation of the retina can be produced by image elements with a high image-plane or retinal velocity that are displayed at a relatively low frame rate. The temporal sampling frequency at which image elements must be displayed to be perceived as having smooth motion is called the CTSF for smooth motion and is a function of the retinal velocity of the image element. The CTSF for any image element is given by the equation:

$$CTSF = f_{min} + k_{max}(r)$$

Where CTSF is the critical temporal sampling frequency for the perception of continuous motion, $f_{min}$ is the lowerbound on temporal sensitivity, $k_{max}$ the upperbound on spatial sensitivity, and r is the (retinal) velocity of continuous motion being sampled (see Watson et al. (1986) and Watson et al. NASA Tech Paper 2211). This relationship expresses the fact that the CTSF for an image element is a linear function of retinal velocity with intercept determined by a lower bound on temporal sensitivity and slope determined by the upperbound on spatial sensitivity $k_{max}$. Using forced-choice experiments, Watson found that the CTSF was a linear function of motion with intercepts around 30 Hz and slopes between 6 and 13 cycles/degree for two subjects. At higher stimulus contrasts the maximum CTSF exceeded 80 Hz.

Watson's work also confirmed the earlier work of Kelly in showing a decrease in spatial acuity produced as a function of retinal velocity. The limit of dynamic visual acuity together with the CTSF relationship describe a simplified "window of visibility" function that describes the spatio-temporal performance window of human vision. This window of visibility is based on an approximation to the relationship between spatial acuity and retinal velocity given by the equation:

$$k = k_{max}/v_r$$

Where $v_r$ is the retinal velocity, k is the reduced spatial acuity and $k_{max}$ is the maximum spatial frequency limit of the visual system as determined by the spatial contrast sensitivity function. This function is shown in FIG. 6. This figure is the "window of visibility" which describes the region in spatio-temporal frequency space that represents the stimulus energies detectable by the human visual system. In this figure the spatio-temporal spectrum of an image element translating at velocity v has energy located on a line with slope v in the two dimensional spatio-temporal frequency space. For velocities less than a "corner" velocity, $v_c$, high spatial acuity is maintained. For velocities less than $v_c$, spatial acuity decreases with the inverse of the velocity. The corner velocity, $v_c$ is approximately 2 degrees/second based on Kelly's data (Journal of the Optical Society of America A 69(10), 1979:1340–1349). This simplified function conceptually illustrates the spatio-temporal sensitivity of human vision that is more completely described by the Kelly surface of FIG. 4.

Based on the dynamic visual acuity and the CTSF relationships, it is clear that the perceptually optimal approach to image generation in the case of rapidly moving image elements (e.g. high speed viewpoint motion) would be to maintain (or even increase) frame rate while decreasing resolution. Unfortunately, no existing image generation systems monitor the velocity of image elements to adjust the spatial and temporal sampling frequencies of these elements in a manner that reflects the spatio-temporal limits of the human visual system. In fact in the case of high image element velocity essentially every existing image generation system degrades performance in the worst possible way, by preserving resolution while allowing frame rate to decrease with system load. While some graphics systems (e.g., SGI reality engine) are able to decrease overall image resolution during high system loads, these systems do not allow individual elements to be rendered with a resolution and temporal sampling frequency that reflects their dynamic resolvability. Even graphics systems such as Microsoft's proposed Talisman architecture (see Torborg et al. (1996)) in which individual objects may be rendered at different resolutions and update rates, do not at present employ these fundamental limits of human vision to select a resolution and frame rate that is perceptually optimal for the object.

Because of their object-order organization and limited support for variable resolution rendering, existing graphics architectures typically degrade performance under high system load primarily with a decrease in frame rate. When this frame rate falls below the critical temporal sampling frequency for the perception of smooth motion a perceptually catastrophic temporal fracture is created in the image stream. Recent studies emphasize that frame rate is more important than resolution for maintaining the illusion of immersion and enhancing performance within virtual environment systems.(see Smets et al. (1995)).

One sampling approach that could, in principle, be applied to allow frame rate to be maintained at the expense of resolution is the method of refinement sampling. Fuchs first described the refinement sampling approach and applied it to a system of rendering in which the resolution of the image is increased over time by resampling at progressively higher sample densities. The refinement is achieved by a progressive stratification used in conjunction with the previously described adaptive sampling to achieve an adaptive progressive refinement of the image in which resolution is increased over time and local spatial sampling density reflects local image information content. Fuchs noted that the refinement method was best suited for implementation with visible surface determination methods that compute image samples independently, such as ray tracing. Like the closely related adaptive sampling approach, progressive refinement sampling requires a more complex approach to sampling than is achieved by typical rasterization schemes used by existing graphics pipelines. A multipass approach (rasterizing every primitive more than once) would be required to increase the resolution of a an image region over the course of a single frame interval. This would require retaining the image space representations of all primitives in a sampled region for the frame such that the rasterizing processor could repeatedly access each primitive. Existing image generation systems are typically based on a feed forward transformation-rasterization pipeline that does not, in general, allow the rasterizers to directly access primitive data in this way.

A few image transmission systems have employed the progressive refinement approach for non-real-time transmission of images. To date, however, progressive image refinement has not been applied to real-time image generation.

Bishop (1994) suggested an extreme form of progressive refinement for image synthesis in which the concept of a temporally coherent frame is entirely abandoned. In this method a randomized subset of samples in the image is rendered and then immediately updated. The newly computed samples are combined with earlier samples during image reconstruction. This approach to image generation maintains frame rate of the image stream while sacrificing the spatio-temporal coherence of single images. A simulation of the method showed that for the same computational expense the frameless rendering method produces a more fluid, less jerky image stream than conventional double buffered rendering. However, the loss of temporal coherence resulted in a crude type of motion blur and disruption of edge integrity. The authors acknowledged that the randomized sampling required by the method make it unsuitable for z-buffer based renders that rely upon object-order rasterization and incremental image-space rasterization algorithms. The renderer used in this study by Bishop, as well as in virtually all progressive refinement image synthesis, is based upon ray tracing. Largely because of the cost associated with the ray tracing implementation, this rendering method did not work in real-time. Although not stated by the designers of this system the approach is well suited to rendering image streams in which the image (retinal) velocity of image elements is high. In such cases the requisite CTSF could be maintained while the blurring and disruption of edge integrity would not be apparent because of the reduced dynamic visual acuity. On the other hand, for situations of low image-space velocity, visual acuity is increased and the edge-disruption and blurring are very visible.

Although existing image generation systems are generally unable to dynamically control image resolution, particularly on an object or primitive basis, these systems do employ other measures to maintain a desired frame rate by decreasing the amount of displayed image information. Several systems dynamically monitor frame rate and decrease the geometric detail of objects fed to the rendering pipeline as frame rate decreases below a minimum value. This approach requires that database objects have multiple representations each with a different degree of geometric or surface detail. Low level-of-detail representations are fed to the rendering pipeline when an increased frame rate is required. The method can substantially accelerate the object-order geometry engine phase of rendering but has less affect on the rasterization phase. This is because rasterization speed is more dependent on the number of pixels covered than the number of primitives rasterized. Low level-of-detail representations generally cover the same image area as the corresponding high level-of-detail object.

Sudden changes in the level of detail at which an object is represented can result in perceptually objectionable discontinuities in the image stream. This can be mitigated somewhat by rendering both high and low level of detail representations and blending the resulting images.(1995 ACM SIGGRAPH Course on Interactive Display of Large Databases, Lecture B Graphics Techniques for Walkthrough Applications). This requires additional computation precisely when the system is attempting to reduce the computational cost of rendering an image frame. A more efficient approach would be to directly create a composite rendering of the transitional object by a weighted importance sampling of 2 or more LOD representations of the object. Once again conventional object-order rasterization pipelines do not support this type of distributed sampling.

Level of detail management is used in another commonly employed method of accelerating image generation. In this method a reduced level-of-detail version of an object is rendered when the object occupies a small area of the display viewport. This acceleration has a perceptual basis in the fact that objects at a distance will project to relatively small areas of the image plane and therefore produce less image information. Existing image generation systems generally select a single level of detail for an entire object. This approach requires a preprocessing step for each object (e.g., determination of depth of the object's bounding box) and generally neglects the fact that an object may span a large range of depths relative to the eyepoint. The walls of a building or hull of a large ship are individual objects that may be simultaneously near and far from a single viewpoint. One solution to this problem is to subdivide a large object into smaller objects. Unfortunately this increases the number of objects on which the depth test or area projection test must be made.

A more effective approach would allow the selection of a specific level-of detail representation to be made for each image sample rather that globally for each object. This approach would allow blending of multiple LOD representations of an object at the sample level. This approach would require that minimum depth information be available for each image sample before the sample is actually rendered. Current image generation architectures are based on an object-order, depth-comparison rasterization pipeline that does not, in general, allow the minimum depth of a sample to be determined before generation of the sample by rasterization.

Another factor affecting the temporal responsiveness of the human visual system is adaptation. Individual retinal photoreceptors have a response range that is less than two orders of magnitude. Nevertheless the visual system can operate over an absolute dynamic luminance range exceeding 13 orders of magnitude. This dynamic range is achieved, despite a relatively limited unit response range, through a powerful automatic gain function called adaptation. Through adaptation the retinal photoreceptors adjust to the average surrounding luminance. Adaptation does not occur instantly. Adaptation to higher luminance occurs more rapidly than adaptation to lower luminances. Dark adaptation has a relatively rapid phase in which adaptation to a luminance 2 orders of magnitude lower occurs with a half life of approximately 100 ms. A slower phase, corresponding to photoreceptor pigment bleaching, requires several minutes to completely adapt to the lowest luminance levels. In a recent paper Ferwerda et al. (1996) teach a model of visual adaptation which was applied to image synthesis to simulate the effect of adaptation on acuity, color appearance, and threshold detection. In this work an adaption model was applied to non-real-time image synthesis. This model assumes that the level of adaption is uniform throughout the visual field and tied to some metric of global scene illumination (e.g. one half the highest visible luminance). In fact, the level of adaptation can vary considerably through the visual field because of regional variation in luminance of the retinal image. Changing patterns of luminance on the retinal image can result in transient mismatches between the luminance of the retinal image and the state of adaptation of the corresponding retinal elements. These transient mismatches can significantly decrease the visible information content of an image stream with high luminance range and relatively high retinal image velocity components. Methods of real-time image generation that employ eye tracking could, in principle, track the luminance exposure history for various regions of the retina and modulate the information content (resolution and level-of-detail) of the synthesized image to reflect the local balance between luminance and adaptation. Existing eye-tracked image generation systems do not identify unadapted retinal elements to reduce the computational cost of image generation in this way.

In addition to the spatial, temporal, and spatio-temporal limits of human vision already discussed, the performance of the human visual system is severely restricted by the highly non-uniform distribution of photoreceptors in the retina. This distribution of photoreceptors, and the corresponding retinotopic distribution of later processing elements in the visual cortex, results in very limited spatial acuity outside the very center of the visual field. The maximum spatial acuity is confined to a relatively small region in the center of the visual field that corresponds to a retinal region, called the fovea, that has a high density of photoreceptors.

The spatial acuity in the visual field falls to less than 10% of central acuity at 5 degrees retinal eccentricity (angular distance from the fovea) and continues to decrease with increasing eccentricity. The relationship between visual acuity and retinal eccentricity is called the acuity falloff function and is shown in the FIG. 7. Because the amount of visible image information is related to the square of the acuity, the image resolution required to match the acuity falloff function falls very steeply with retinal eccentricity. The average resolution of an image matched to the acuity falloff function would be 1/500th of the resolution at the visual center of interest.

A variety of eye tracking technologies are available to determine, in real-time, the view direction or point-of-regard of a single viewer. The point-of-regard is that location on an image plane that is in the center of the observer's visual field. This part of the visual field is processed by the observer's foveal receptor elements and can be seen with high acuity. Technologies for tracking the point-of-regard include video analysis of the corneal reflection (e.g., ISCAN Inc. Cambridge Mass.), optical analysis of the corneal reflection (e.g., U.S. Pat. No. 5,270,748) or the reflection of the iris-scleral boundary (Reulen et. al. (1988)).

Systems which generate images that are viewed instantaneously by a single viewer can, in principle, use the viewer's point-of-regard to significantly reduce the amount of computation required to generate a perceptually correct instantaneous image. Despite the availability of noninvasive real-time eye tracking equipment, very few real-time generation systems have been developed which track the viewer's visual point-of-regard and use it to reduce the computational cost of instantaneous image generation.

Early work on display systems designed to match acuity falloff was motivated by a need to generate very wide field-of-view images using limited image generation hardware. These early designs incorporate non-linear optical (McDonnell Aircraft, Fisher R. W. Society for Information Display International Symposium Digest of Technical Papers, pg. 144–145, 1982) or holograph elements (Hughes Aircraft U.S. Pat. No. 5,071,209) to project a nonlinear image from a conventional display device (CRT or Light Valve) onto a wide field-of-view screen. In these projective methods the non-linear projection of a nonlinear image results in a perspective image in which the resolution decreases as a function of the angular distance from the viewer's point of regard.

Designs based on non-linear image generation and projection present very serious technological challenges. To date no working systems based on this design have been produced. In these systems the optical or projective elements must be moved with velocities and accelerations that match that of human eye movements, which achieve angular velocities of several hundred degrees per second and angular accelerations in excess of 1000 degrees/second$^2$. Perhaps overshadowing the optical-mechanical problems of such projective systems is the computational complexity of generating the requisite nonlinear images in real time. These systems require the generation of images in which more peripheral pixels represent increasingly large areas of the image. An example of such an image of a rectangular grid is shown in FIG. 8, from Fisher. The synthesis of such images involve non-affine projections which fail to preserve the linearity of the edges of graphics primitives when projected onto the image plane. Conventional hardware rasterization units are incapable of directly rendering such non-linear primitives because they employ linear incremental algorithms (e.g. Pineda arithmetic) that depend on linearity of primitive edges as well as the linearity of image-space gradients on the interior of the primitive.

An alternative design for area-of-interest systems avoids nonlinear projective elements and employs conventional image generation methods. In this type of design a conventionally generated low resolution image is displayed together with a higher resolution image insert that is positioned at the viewer's point-of-regard. At least one system based on this design is currently commercially available (CAE Electronics Ltd.). This system employs two independent image generation systems one for the low resolution background image and one for the high resolution insert at the area-of-interest. The advantage of this design is that conventional image generation hardware can be employed. A principle disadvantage is that the design attempts to approximate the acuity falloff function with a simple step function. The exact shape of the step function will determine the degree of computational savings gained and will affect the perceptual accuracy of the image. Because the acuity falloff function is poorly approximated by a single step function the computational savings that results from this method will be significantly less than the theoretical maximum savings.

In fact for a circular display subtending 100 degrees of visual angle the maximum computational savings that can be obtained using a single step function occurs when the high resolution inset is a circular window subtending approximately 20 degrees. In this case the area-of-interest is a circle with radius 20 degrees that is computed at full resolution and the outer circular region of the image is computed with a resolution of approximately 3% of the area-of-interest circle. This stepwise approximation to the acuity falloff function is shown in FIG. 10. The average computed resolution in the entire image in this case is only 6% of maximum resolution, representing a speedup factor of approximately 16.3. By comparison the average image resolution obtained by employing a continuous approximation accurate to within 0.5 degrees of the acuity falloff function is only 0.5% representing a potential speedup factor of approximately 200. Note that the estimate for the step function case assumes that the low resolution area covered by the inset is rendered but not displayed. This is the approach used by the CAE system.

Additional savings can be obtained using a step function that falls below the acuity falloff curve but this would result in a visible discontinuity at the edge of the high resolution insert. Several rasterization pipelines with different depth buffer resolutions could potentially be employed to create a multistep approximation to the acuity falloff function. In the simplest implementation each z-buffer rasterizer would generate a rectangular image at a specific resolution and corresponding location. The resulting images could be composited so that progressively higher resolution images are exposed as concentric inserts. This approach would provide a better approximation to the acuity falloff function than a single step method. However the improved correlation does not produce a corresponding reduction in the computational cost of rasterization because this architecture incurs considerable redundant rasterization as a result of overlapping the various regions.

An image generation method capable of producing a more continuous resolution gradient could more closely approximate the acuity falloff function; resulting in increased computational efficiency without the perceptual discontinuities that result from step function approximation.

Virtually all general-purpose, real-time image generation systems employ a transformation stage in which the control points, or vertices, of graphics primitives undergo planar perspective projection onto an image plane. In typical implementations this is followed by a second process, usually called rasterization, in which the samples or pixels corresponding to the projection of the primitive are rendered. The result of such a system is to effect a planar perspective of the graphics database onto a viewport. Unfortunately, because the retina is not flat, the neural processing elements of the brain that subserve vision have evolved to analyze a more nearly spherical, not planar perspective projection of the actual world. Consequently existing systems that employ planar projection as part of the image generation process produce a perceptual distortion that is caused by differences between the image generation system's planar perspective projection and the approximately spherical perspective projection of the visual system's image analysis manifold, the retina.

For view angles that are not too wide (e.g. less than 50 degrees field-of-view) differences between planar perspective projection and spherical perspective projection are small for single images. However even at relatively low view angles, planar perspective projection can result in a pattern of optical flow that is noticeably different from the optical flow fields produced by the corresponding spherical perspective projection. This is most easily seen for the case of rotation of the view direction vector about one axis centered at the viewpoint. A continuous rotation, at constant angular velocity, of the view direction vector about the y (up) axis, centered at the viewpoint, produces a look around or pan pattern of optical flow on the projection surface. In the case of spherical perspective projection, this panning motion produces an optical flow field in which all elements have a constant velocity of optical flow throughout the projection manifold. In contrast, under planar perspective projection the same panning motion produces an optical flow field in which elements at a greater angular eccentricity from the view direction vector have a higher image-space velocity than samples near the center of the projection. This produces a familiar "stretching" near the edge of the viewport and "squashing" near the center of the viewport that is apparent even at moderate view angles and which becomes extreme for larger fields-of-view. Because the visual system is exquisitely sensitive to optical flow patterns this distortion is quite apparent even at moderate view angles and tends to disrupt the sense of immersion or virtual presence that is the goal of high definition real-time graphics systems.

Despite the rather non-physiologic character of planar perspective projection its use greatly simplifies the process of rasterization which is central to existing graphics pipelines. As a result it is widely employed in image generation systems based on rasterization. Planar perspective projection of vertices preserves the image-space linearity of the edges of polygonal graphic primitives. Because the object-space to image-space mapping effected by planar perspective projection preserves the linearity of these edges the image-space boundaries of the primitive can be established by linear incremental methods. Once the boundaries of a primitive are established, for example its extent in a single scan line of the image, then the interior of the primitive is rendered by interpolating object space values such as depth, surface normal and texture parameters, across the image space extent of the primitive. For primitives projected onto the image plane by planar perspective projection, these linear image-space segments correspond to linear segments on the surface of the primitive in object-space and so can be interpolated with linear incremental methods.

For spherical projection, on the other hand, the image-space manifestation of polygonal primitive edge is not linear. As a result the image-space extent of a primitive under spherical perspective projection cannot be determined from the projection of the primitive's vertices. Moreover a linear span of pixels or samples within a primitive on a spherical projection manifold corresponds to a curved set of samples on the surface of the primitive in object-space. This non-linear image-space to object-space mapping cannot be computed by a linear incremental interpolation and so significantly complicates the process of rasterization.

Optical or holographic elements can be employed to convert an image generated by planar perspective projection into a spherical projection. This approach is not applicable to the typical case of images generated for display on a CRT or flat panel display and would require a light-valve or other projective technology. Image processing can be applied after rendering to convert the planar projection into a spherical projection. This approach introduces an additional step into the image-generation process and does not produce the same result as directly computing the spherical projection because the density of image information in the two mappings is different. Consequently, it would be desirable to compute the spherical perspective projection directly. The direct rendering of a spherical projection can be accomplished using rendering methods that, unlike conventional rasterization, do not depend on preserving the linearity of mappings between object-space and image-space. Rendering methods such as ray casting which employ an image-order, point sampled approach to image synthesis do not depend on these linear mappings and can directly produce a spherical perspective rendering. To date there are no general-purpose real-time image generation systems based on ray casting. Several special-purpose image generation methods employing, voxel or height-fields (e.g., U.S. Pat. No. 5,317, 689 assigned to Hughes Aircraft, and U.S. Pat. No. 5,550, 959 assigned to Nova Logic Inc.) or highly simplified geometries (e.g. the computer game Doom™ distributed by Id Software) exist that employ a simplified form of spatial subdivision ray casting based two dimensional grids. For these systems the restriction of database form limits the methods to special applications. Moreover many of these methods (e.g. 2-D grid ray casting) also employ image space interpolations that require linear mappings between image-space and object space, thereby making them unsuitable to direct computation of spherical, or other non-linear projections.

The optical subsystem of the eye also imposes limits on the performance of the visual system. At any instant the eye has a focal depth that is determined by the dynamic state of accommodation of the lens, the pupillary diameter, and the fixed focal characteristics of the cornea. Because the optical system has a limited depth-of-field, objects substantially removed from the focal plane will not be focused properly on the retina thereby reducing the resolvable detail of the element. In conventional image generation systems, images are generated by planar perspective projection that does not account for the optical refraction and dispersion of rays that normally occurs in the lens of the eye. As a result all elements in a typical computer generated image are in focus regardless of their depth from the viewpoint. The depth-of-field effect which produces blurring for objects removed from the focal plane has been simulated in some non-realtime image synthesis methods. One of the first methods used to simulate this effect was the method of distributed ray tracing [Cook R. L., Porter T, Carpenter L. Distributed Ray Tracing ACM SIGGRAPH Proceedings 1984 pg. 137–145). This method employs ray tracing in which the distribution of rays is selected to travel through different parts of a lens with known focal length and aperture. The method uses an assumed focal distance for computing images in non-realtime. Distributing the rays in this fashion simulates the dispersion that produces the depth-of-field effect. In this approach the additional computation is required to compute a reduction in visible image information. An alternate approach would be to determine those parts of the image that are out of the viewer's focal plane and render them with reduced resolution or level-of-detail, thereby reducing the computational cost. Real-time image generation systems that employ eye-tracking could, in principle, determine a viewer's instantaneous focal depth (e.g. by employing an oculometry system capable of real-time determination of ocular focus) and render graphic elements substantially removed from the focal plane at a lower level-of-detail or resolution. To date no existing real-time image generation system employs this method.

From the foregoing analysis it is clear that existing real-time image generation systems do not effectively exploit several significant spatial, temporal, and spatio-temporal limits of human vision that could reduce the cost of image generation. From this analysis it is also clear that in order to exploit these limits of human vision, image generation systems should employ progressively stratified, adaptive refinement sampling and other variable resolution techniques that are not readily implemented in conventional rasterization pipelines.

SUMMARY OF THE INVENTION

Accordingly it is an object of the present invention to effectively exploit several spatial, temporal, and spatio-temporal limits of human vision to decrease the cost of image generation by producing an image stream that has a spatio-temporal structure that is closely matched to these specific spatio-temporal limits of human visual performance.

Advantageously, by matching the spatio-temporal structure of the image stream to specific spatio-temporal limits of the human visual system the method achieves unprecedented computational efficiency for the generation of a perceptually lossless image stream.

It is another object of the present invention to provide a method of image generation which employs a progressively stratified sampling approach in which resolution is increased during the rendering of each frame thereby allowing frame rate to be maintained at the expense of resolution by early termination of the rendering.

It is yet another object of the present invention to provide a method of image generation in which the CTSF for individual graphic elements is computed and used to achieve a balance between resolution and temporal sampling frequency rate which is perceptually optimal for any system load.

It is yet another object of the present invention to provide a method of adaptive sampling employing contrast refinement criteria which efficiently approximates the spatial contrast sensitivity function for human vision by weighing the intersample contrast values by the intersample distances wherein said weights reflect the spatial contrast sensitivity for specific spatial frequencies corresponding to said intersample distances.

It is yet another object of the present invention to provide a method of adaptive sampling employing contrast criteria wherein said method of adaptive sampling accounts for the effect of adaptively determined parameters on the resolvability of image regions by modulating the aforementioned intersample weights in a manner that reflects the influence of said parameter on the spatial contrast sensitivity function for human vision.

It is yet another object of the present invention to provide a method of spatial sampling for image generation in which the spatial sampling density is made in some predetermined inverse proportion to the sampled element's exposure time in the image stream in a manner that reflects a temporal limit of human vision in which acuity increases with exposure duration.

It is yet another object of the present invention to provide a method of spatial sampling for image generation in which the level-of-detail of the sampled database is selected to be in some inverse proportion to the exposure time of the sampled element in a manner that reflects a temporal limit of human vision in which acuity increases with exposure duration.

It is yet another object of the present invention to provide a method of spatial sampling for image generation in which the spatial sampling density is made in some predetermined inverse proportion to the sampled element's estimated retinal velocity based on the element's image-space velocity and image-space acceleration in a manner that reflects the visual system's reduced spatial acuity for image elements with high retinal motion.

It is yet another object of the present invention to provide a method of spatial sampling for image generation in which the level-of-detail of the database sampled is selected to be in some inverse proportion to the sampled element's estimated retinal velocity based on the element's image-space velocity and image-space acceleration in a manner that reflects the visual system's reduced spatial acuity for image elements with high retinal motion.

It is yet another object of the present invention to provide a method of spatial sampling for image generation in which the spatial sampling density is made in some predetermined inverse proportion to the actual retinal velocity of the sampled element as determined from the element's image-space velocity and the velocity of the viewer's point-of-regard.

It is yet another object of the present invention to provide a method of spatial sampling for image generation in which the level-of-detail of the sampled database is selected to be in some predetermined inverse proportion to the actual retinal velocity of the sampled element as determined from the element's image-space velocity and the velocity of the viewer's point-of-regard.

It is yet another object of the present invention to provide a method of spatio-temporal sampling for image generation in which the temporal sampling frequency is made in some proportion to the estimated or measured retinal velocity of the sampled element in a manner that reflects the critical temporal sampling frequency for the perception of smooth motion.

It is yet another object of the present invention to provide a method of approximating reprojection that employs the first or higher order partial derivatives of optical flow on the image manifold with respect to viewpoint and viewdirection motion. It is a further object of the present invention to provide a method of selectively applying these approximations to specific regions of the optical flow field in a manner that improves the accuracy of the approximation.

Advantageously the specified method of approximating reprojection has a significantly lower computational cost than actually reprojecting samples or vertices using the conventional vector matrix multiplication using a transformation matrix.

It is yet another object of the present invention to provide a image generation system, implemented in a shared memory multiprocessor architecture, in which the aforementioned perception-based sampling strategies and approximate methods of reprojection are combined with a visible surface determination method comprising a combination of sample reprojection and ray casting whereby the overall combination provides a system of image generation having intrinsic dynamic performance characteristics that are similar to the dynamic performance characteristics of the visual system; making performance degradation relatively invisible to the user.

Advantageously, this image generation system does not depend upon a linear mappings between image-space and object-space and so can directly compute a spherical perspective projection that is more similar to the retinal projection than the planar perspective projection computed by typical rasterization systems, thereby reducing perspective distortion during image generation.

Advantageously, because this image generation system can render images without linear mappings between image-space and object-space it can directly render a non-linear projection based on the acuity falloff function of the-human retina whereby dynamic projection of the image based on the user's point-of-regard provides a wide field-of-view image that appears to have a uniform resolution throughout but which has a low computational cost.

It is yet another object of the present invention to provide a method of adaptive rasterization which allows progressively stratified, adaptive, perception-based importance sampling during rasterization.

It is yet another object of the present invention to provide an image generation system, implemented in a shared memory multiprocessor architecture, in which the aforementioned perception-based sampling strategies using the aforementioned method of adaptive rasterization are combined with a visible surface determination method comprising a combination of primitive reprojection and ray casting (specified in the copending application) whereby the overall combination provides a system of image generation having intrinsic dynamic performance characteristics that are similar to the dynamic performance characteristics of the visual system; making performance degradation relatively invisible to the user.

It is yet another object of the present invention to provide a method of optimizing the technique of visibility event encoding (specified in the copending application) by using primitives from low level-of-detail representations to encode primitives that are newly exposed in the image stream and subsequently replacing these primitives with primitives from higher level-of-detail representations as the exposure time of the primitives increase wherein the replacement schedule reflects a temporal limit of human vision in which acuity increases with exposure duration.

It is yet another object of the present invention to provide a method of optimizing the technique of visibility event encoding (specified in the copending application) by using primitives from low level-of-detail representations to encode primitives that have a high image-plane velocity and/or acceleration and subsequently replacing these primitives with primitives from higher level-of-detail representations if the image-space velocity and/or acceleration of the primitives decrease wherein the replacement reflects the limits of dynamic visual acuity in which the resolvability of image elements is decreased by retinal image motion.

It is yet another object of the present invention to provide a method of dynamic subimage processor assignment and subimage-to-image mapping for eye-tracked implementations of the present image generation systems that is retinotopically organized whereby the retinotopic organization produces a subimage to processor mapping that reflects the visual system's high acuity for regions of the visual field near the point-of-regard.

Advantageously, this retinotopic mapping increases performance of the present method of image generation because the viewer's natural eye movement strategies of pursuit and fixation, which tend to improve vision by stabilizing the foveal image elements, also produce a corresponding temporal locality of data reference for foveal subimage processors.

Advantageously, the performance of the present image generation method using the retinotopically organized processor assignment parallels the performance of the viewer's visual system such that the performance of the image generation system is maximal during fixation and smooth pursuit, when visual acuity is high, whereas the performance of the method degrades during rapid eye movements or saccades, when the visual system is temporarily blinded.

It is yet another object of the present invention to provide a method of spatio-temporal sampling for image generation in which the aforementioned retinotopic mapping of subimage processors to visual field is used to maintain a dynamic record of the luminance exposure histories of the viewer's retina that is used to compute the apparent level of contrast in an image region based on the adapted state of the retinal elements processing the region, whereby the spatial sampling density is reduced in regions of the image stream having luminance values to which the corresponding retinal elements have not adapted.

Advantageously the computation of adaptation-adjusted contrast allows further computational savings by reducing sampling density in regions of the image stream that are relatively invisible to the viewer because of the adapted state of the corresponding retinal elements.

It is yet another object of the present invention to provide a method of real-time image generation in which the viewer's focal depth is determined directly or estimated from the depth of the graphic object at the point-of-regard whereby graphics elements substantially removed from the estimated focal depth are rendered with a level-of-detail and/or resolution that is in some inverse proportion to the elements's blur circle as computed from the focal length, pupil size and element depth.

It is yet another object of the present invention to provide a method of spatial sampling for image generation in which the spatial sampling density is made in some predetermined inverse proportion to the sampled element's exposure area in the image stream in a manner that reflects a temporal limit of human vision in which acuity increases with exposure area for exposure areas below a specific critical value.

The aforementioned objects and advantages are achieved in accordance with the present invention which uses progressively stratified, adaptive, spatio-temporal sampling employing perception-based refinement criteria to reduce the cost of generating a perceptually lossless image stream.

An estimate of the peak bandwidth of the human visual system can be computed from the maximum spatial and temporal sampling frequencies to which the system is sensitive. By this metric the bandwidth of the human visual system exceeds 24 GB/sec (e.g., 1 arc min resolution×120 degrees×160 degrees×100 Hz×4 bytes per sample). Despite this very high apparent bandwidth, a single viewer is able to actually perceive only a relatively small fraction of the image information computed by today's high resolution real-time image generation systems which produce much less than 24 GB/sec of image information.

The source of this apparent paradox lies in the heterogeneous nature of both the image stream and the visual receptive field. The spatial and temporal resolving ability of the human visual system varies considerably throughout the visual field, being maximal in a rather small part of the entire receptive field of the system. In addition the amount of local VISIBLE image information in an image sequence, displayed as a real-time image stream with a dynamic spatio-temporal structure, is generally much less than the image information determined by statistical metrics of static image structure (such as luminance variance) for the individual images of the sequence. The difference between static image information and dynamic visible image information is influenced by the local contrast structure, local optical flow characteristics, the local temporal visibility coherence, and other factors (e.g. depth-of-field) which vary throughout the image stream. The VISIBLE spatio-temporal structure of an image sequence is generally highly heterogeneous throughout the stream. Mismatches between the visible spatio-temporal structure of the image stream and the spatio-temporal sensitivity of the visual system processing elements mapped to the stream can occur. A mismatch in which the spatio-temporal image information in a specific image region exceeds the spatio-temporal processing limits of the visual processing elements mapped to the region result in wasted image information. Conversely, a mismatch in which the local image information content of an image stream is less than the maximum amount of information that could be processed by the corresponding visual processing elements will produce visual artifact.

The present invention employs novel perception-based spatio-temporal sampling techniques which produce an image stream with a spatio-temporal structure that is closely matched to the spatio-temporal limits of the human visual system. These sampling techniques allow an image generation system to adaptively determine the local, visible spatio-temporal structure of the image stream and progressively adjust the local sample density and level-of-detail to reflect several specific spatio-temporal limits of human vision. By matching the level of detail and spatio-temporal sampling frequencies to such visual performance limits as contrast sensitivity, dynamic visual acuity, critical temporal sampling frequency, retinal eccentricity, and focus, the method achieves unprecedented computational efficiency for the generation of a perceptually lossless image stream.

In addition to sampling strategies, an image generation systems requires a visible surface determination algorithm and an implementation architecture. The copending application describes a method of primitive reprojection that employs a visible surface determination technique and implementation architecture which have intrinsic dynamic performance characteristics that are remarkably similar to those of the human visual system. The multiprocessor systems of primitive reprojection specified in the copending application are methods of real-time image generation that, like the human visual system, realize improved performance when temporal image coherence is high. High temporal image coherence within the image stream produces a corresponding temporal locality of data reference for subimage processors that reduces non-local data references and improves performance. Likewise high temporal image coherence tends to produce a relative stabilization of image elements on retinal receptors which improves the spatial resolving ability of these visual processing elements.

In a similar manner high temporal visibility coherence reduces the amount of visibility search required for the primitive reprojection method and thereby improves performance of the image generation method. Temporal visibility coherence is a type of temporal image coherence that results because coherent patterns of optical flow tend to limit the rate at which graphic elements are exposed and occluded. High temporal visibility coherence also tends to improve the spatial resolving performance of the human visual system by reducing the amount of newly exposed surfaces that are processed by retinal and later elements.

In addition to the method of primitive reprojection described in the copending application, the sampling strategies of the present method can be employed in a similar system of image generation based on sample reprojection. Systems employing sample reprojection, as specified in the present disclosure, also have performance that is dependent on the level of temporal image coherence and temporal visibility coherence.

In the present method of perception-based spatio-temporal importance sampling, the available performance of the image generation system is used to produce a level of spatial (e.g. resolution) and temporal (update rate) sampling that is perceptually optimal for any system load. Together with the intrinsic dynamic performance characteristics of the image generation method, the present spatiotemporal sampling strategies cause system performance degradation to parallel visual system performance degradation in a way that makes these degradations relatively invisible to the viewer. These sampling techniques together with the intrinsic performance characteristics of the reprojection architecture provide an extremely efficient system of perceptually lossless real-time image generation.

FIG. 16 conceptually illustrates the functional similarities between the present method of real-time image generation and the visual system. The pyramid schematically represents the three components of an image generation system. At the base is the foundational implementation hardware. For the present method the hardware is a system based on shared memory multiprocessor components which, like the neural network of the human visual systems realizes increased performance with increases in spatio-temporal locality of data reference. At the next higher level of functional organization for an image generation system is the visible surface determination process. This process, implemented on the underlying hardware architecture, fundamentally defines the character of the image generation system. The classification system of Molnar and other systems for classifying image generation systems are principally based on the method of visible surface determination employed. The preferred embodiment of the present method uses a reprojective approach to visible surface determination which, like the process of human vision is most efficient when the temporal image coherence and temporal visibility coherence of the image stream are high. Finally, on top of the visible surface determination method are the sampling strategies that determine the local spatio-temporal sampling frequencies. The present invention employs sampling methods in which the local dynamic spatial and temporal resolvability of the image stream is determined and the spatio-temporal structure of the image is substantially constructed to reflect the visible information content in the sampled region in a manner that reflects specific spatio-temporal filtering characteristics of human vision. Thus at the level of hardware, visible surface determination technique, and sampling method, the performance characteristics of the present method of image-generation parallels the performance of the visual system, creating a high degree of computational efficiency for the generation of a perceptually lossless image stream.

Because the implementation architectures employ general-purpose central or distributed shared memory multiprocessor architectures they accommodate advanced software based photorealistic rendering and dynamic load balancing strategies. A novel method of retinotopic load balancing is described in which subimages are assigned to specific regions of the retinal image.

The present invention employs contrast-based refinement criteria similar to that suggested by Mitchell. Contrast is defined as:

$$(I\max - I\min)/(I\max + I\min) \quad \text{(equation 1)}$$

The present method approximates the visual system's need for increased contrast at higher spatial frequencies by weighing the actual contrast between two samples by the intersample distance in a manner that reflects the spatial contrast sensitivity function of FIG. 2. Unlike the method of Bolin et al. this technique does not require conversion of samples to the frequency domain. By working directly in the spatial domain the method requires much less computation. Like the method of Bolin and Meyer the technique is approximate and can only be applied effectively for reasonably high spatial frequencies (e.g. during the later stages of adaptive sampling). This method, like all adaptive sampling techniques, suffers from potential inaccuracies if it is applied to an initial sample ensemble that is too sparse. In this case the statistical assumptions underlying the method fail and undesired undersampling can result. The limitations of adaptive sampling as applied to image generation have been reviewed by Arvo and Kirk (1991). Avro et. al. point out that the simplest form of adaptive sampling (e.g., the type illustrated in FIGS. 1A–1F) can introduce statistical bias into the final result for high contrast areas that is attributable to early stages of sampling. Despite the generally small statistical bias that can be introduced by this simple type of adaptive sampling it is a widely used approach that is known to produce good results and excellent computational economy.

The quantitative effect of various factors that are known to alter visual acuity are, in the science of visual physiology, often expressed by their affect on the spatial contrast sensitivity function. Factors that affect the spatial resolving ability of the human visual system determine the visible information content within the image stream and include exposure duration, retinal velocity, and retinal eccentricity. In the present method the value of these various parameters is determined on a local basis during adaptive sampling. Their local values are used to effect the local information content of the generated image by using the value of these parameters to modulate the distance-specific contrast weights in a manner that reflects the effect of the specific parameter on the spatial contrast sensitivity function.

Additionally the value of these visibility parameters is used to select a database for sampling that has a level-of-detail appropriate to the visible information content of the sampled region of the image stream.

The method employs a progressive stratification during adaptive sampling in which the resolution of each image region is increased during a single frame interval. This allows frame rate to be maintained by decreasing resolution. Additionally the method uses the estimated or measured retinal velocity of graphic elements (e.g. samples or primitives) to select a temporal sampling frequency for the element that reflects the CTSF appropriate to the element.

Two example implementations of the present method are presented. Both employ reprojective methods of image generation implemented using shared memory multiprocessor architectures. A first implementation is a system of real-time image generation that employs a visible surface determination method based on sample reprojection and ray casting. A second implementation employs the method of primitive reprojection and ray casting specified in the copending patent application. In each case the present methods of perception-based sampling greatly reduce the amount of spatio-temporal sampling necessary to produce a perceptually acceptable image stream and thereby facilitate a real-time implementation of the reprojective image generation methods.

Sample reprojection is a known method of image generation. It has been used to accelerate non-real-time ray tracing (cf. Badt, Adelson, Fu) and, in an approximated, interpolated form, as the basis of image-based rendering methods (Chen S. E. et al (1993)). This prior art method is thoroughly reviewed in the copending application which specifies several methods that improve the accuracy and efficiency of sample reprojection. In the present implementation, spatial subdivision ray casting is employed in specific exposure regions to generate newly visible samples. Visible samples are reprojected between frames and the visibility among previously visible samples is resolved by depth buffering according to the method of Fu. Efficient methods of identifying exposure regions, conducting spatial subdivision ray casting, and load balancing are specified in the copending application in conjunction with primitive reprojection. Many of the techniques are readily employed in the present implementation in which samples, not primitives, are the reprojected elements.

The combination of sample reprojection and ray casting is ideally suited to acceleration by the perception-based adaptive sampling methods of the present invention. In sample reprojection all newly visible samples are generated by ray casting into identifiable exposure holes in the image. Ray casting, being an image-order, point sampled method, is ideally suited to perform adaptive sampling during rendering. The present method requires a variable resolution rendering approach that is implemented, in the case of sample reprojection, by assigning a "spot size" to each sample that is initially generated by ray casting and subsequently reprojected. The spot size of each sample indicates the number of depth-buffer/image-buffer sample locations to which a single sample is actually written. In low resolution regions of an image the spot size of samples is relatively large, producing a low image information density per unit image area. In the present method the spot size of a sample is modified to reflect changes in the resolvability of the image in the region of the sample thereby effecting corresponding changes in resolution in the same region of the image. In this method the initial sample size of a newly generated (e.g. by ray casting) sample is selected to be in some predetermined inverse proportion to the visible information content of the image in the region of the newly visible sample. Factors that affect this visible information content (e.g., exposure duration, retinal velocity, etc.) are determined during adaptive ray casting and used to modulate the initial spot size of the sample. Subsequently, if the visible information content in the region of a sample increases (e.g., because the exposure times of samples in the region have increased, or the retinal velocity has decreased) then the spot size of the sample is decreased. In the present method a decrease in the spot size of a reprojected sample will produce "holes" in the image buffer that are filled by ray casting, thereby increasing the local image information density by generating new samples. Conversely, if the local visible information content of the image in the region of a sample decreases (e.g., because of increased retinal velocity of the sample) then the spot size of the sample is increased and surrounding samples are averaged to a single sample. The method employs known techniques of posterization, and sample weighting together with non-linear reconstruction kernels (see Mitchell (1987) and Rushmeier et. al. (1994)) to effect the reconstruction of an image comprising samples of different "spot sizes".

In the present sample reprojection embodiment the number of graphic elements that must be transformed for each frame is much higher than for typical real-time image generation systems based on primitive rasterization. To mitigate the cost of sample transformation the present method employs efficient techniques of approximate reprojection based on higher-order partial derivatives of optical flow with respect to viewpoint and view direction vector motion.

A second implementation of the present method employs the system and related method of primitive reprojection described in the copending application. In the method of primitive reprojection, primitives, not samples, are the reprojected elements. In the method of primitive reprojection ray casting or other visibility tracing in exposure regions is not performed to generate image samples but primarily to identify newly visible primitives. In this method all image samples are generated by rasterization of visible primitives. To achieve adaptive sample generation during rasterization the system employs a method of adaptive rasterization. In this method the interpolative process of rasterization is conducted adaptively, with the spatial sampling density modulated by local visible information density as determined using the aforementioned perception-based refinement criteria. Unlike conventional rasterization the method of adaptive rasterization is not constrained to a strict object order. During adaptive rasterization the surrounding samples of the depth buffer are examined to determine the local visible contrast structure of the image. Some of the surrounding samples examined may have been produced by the earlier rasterization of a different primitive. In this method, if the refinement criteria indicates that supersampling is required in a region then additional samples are generated by re-rasterizing those exposed primitives in the region. This is made possible because in the implementations of primitive reprojection, described in the copending application, a reference to the source primitive of each sample is stored in the buffer and the image-space representations of all subimage primitives are retained in a local memory store directly accessible by the rasterizing processor.

Though they share a common reprojective approach to visible surface determination, sample reprojection and primitive reprojection place different demands on compute and storage resources. In addition these methods, in conjunction with the present method of perception-based spatio-temporal sampling, are amenable to different optimizations and extensions that make them suited to different applications.

A detailed comparison of primitive reprojection and sample reprojection is now presented, focusing on the suitability of each method to specific application areas. A principle difference between primitive reprojection and sample reprojection is that sample reprojection requires the processing and storage of many more reprojected elements. On the other hand the reprojective processing of samples is considerably simpler than the processing of primitives, which require rasterization for each frame. In fact, for sample reprojection the diffuse shading component (including texture value) of the reprojected samples can be retained between frames. Another difference between sample and primitive reprojection is that they require different techniques to locate potential exposure regions. In the case of sample reprojection exposure regions include: 1)reprojection holes, 2) view volume incursion regions, 3) expansion holes caused by perspective separation of samples. During primitive reprojection potential exposure regions include: 1) reprojection holes, 2) occlusion-exposure transition regions in the image buffer, 3) view volume incursion regions. Another difference between the two methods is the type of visibility search that is conducted in potential exposure regions. For sample reprojection, visibility tracing (e.g. ray casting) within exposure regions is conducted to generate newly visible reprojection elements, samples. Conversely the goal of visibility search for primitive reprojection is to identify newly visible primitives.

A principle advantage of sample reprojection is that it can directly render spherical and other non-planar projections. This makes sample reprojection implementations well suited to applications in which wide field-of-view, spherical, or other useful non-planar projections (e.g. based on the acuity falloff function) are required. Such applications include advanced virtual environment simulators. The level of performance and realism possible for these applications can be significantly enhanced by the present method of perception-based spatio-temporal sampling.

A principle advantage of primitive reprojection is the relatively low storage requirement and the fact that it is amenable to the method of visibility event encoding described in the copending application. This makes the primitive reprojection implementation ideally suited to real-time client server applications and non-real-time animation encoding methods. The level of compression achieved by the visibility event codec method can be significantly enhanced by the present method of perception-based sampling.

Both sample reprojection and primitive reprojection are amenable to image-parallel implementation using shared memory multiprocessor hardware. Both methods benefit from the natural temporal image coherence and temporal visibility coherence of the image stream. Because the acuity of the visual system is enhanced by high temporal image coherence and high temporal visibility coherence, performance degradation of both methods tends to occur when acuity is low. In the present method of perception-based spatio-temporal importance sampling this performance degradation is manifest as a decreased resolution and/or level of detail. Because of the low visual acuity for the corresponding regions of the image stream, the reduced resolution and/or level of detail is relatively invisible to the viewer. This results in a particularly graceful performance degradation that is effectively tuned to the spatio-temporal limits of the user's visual system. Both methods benefit from load balancing techniques based on optical flow (described in the copending application). Additionally, eye-tracked versions of both methods benefit from the retinotopic dynamic load balancing methods described in the present specification.

Additionally both reprojective methods of image generation are ideally suited to the present method of perception-based adaptive spatio-temporal sampling because the exposure time of reprojected elements is determined for both methods. This facilitates techniques of the present method in which resolution and/or level-of-detail is adjusted to reflect the exposure duration of individual reprojected elements.

Therefore reprojective systems of real-time image generation are ideal architectures for the implementation of the present perception-based rendering methods.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A through 1F are a progression of images showing successive refinements of a portion of an image bounded by rectangle ABCD by determining which segments are similar;

FIG. 12 is a C language data structure for two types of graphic elements that can be reprojected: samples and primitives.

FIG. 24 including

DETAILED DESCRIPTION OF THE PREFERRED EMBODIMENTS

Figure 11:
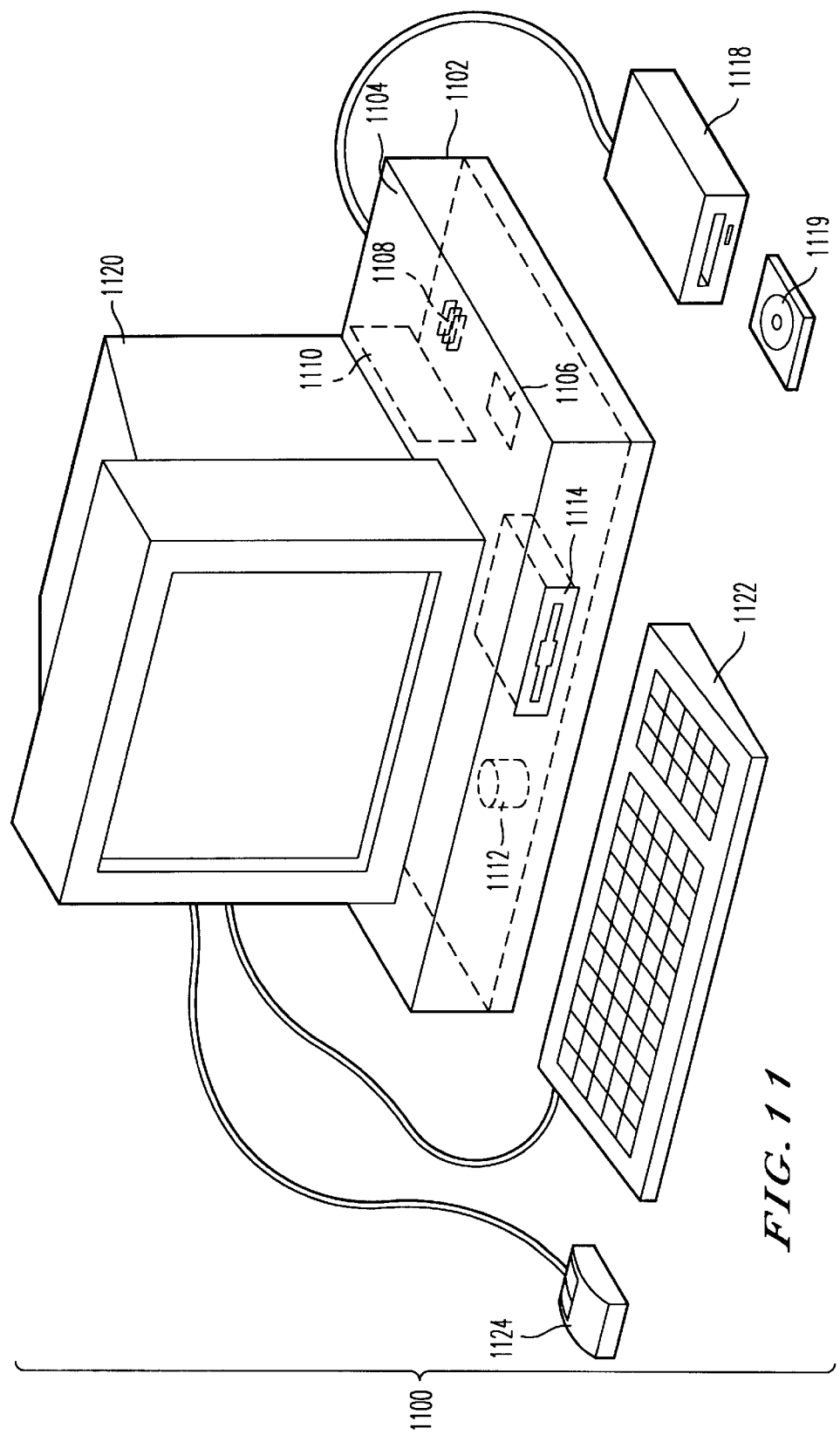
FIG. 11 is a schematic illustration of a uniprocessor computer system for implementing a system and related method for primitive reprojection-based real-time image generation according to the present invention.
Figure 13B:
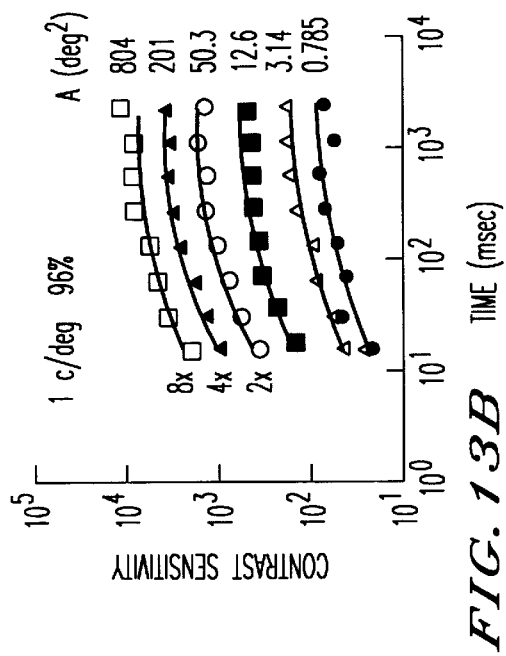
FIG. 13 (taken from Luntinen O. et al.(1995)) is a set of graphs (A through D) illustrating contrast sensitivity plotted against exposure time for various exposure areas and spatial frequencies.
Figure 13D:
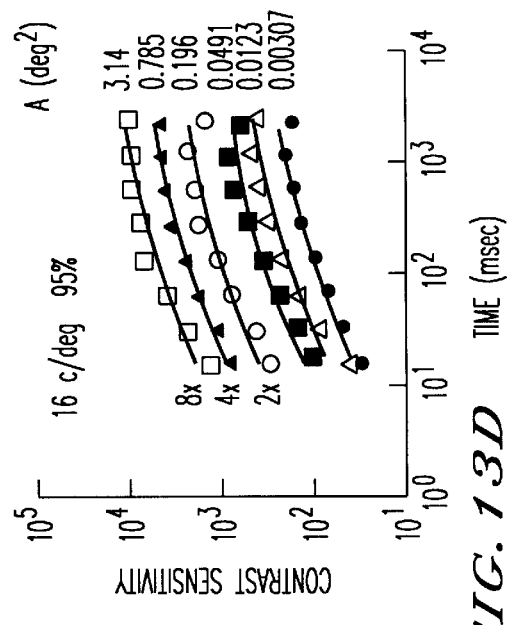
Figure 13A:
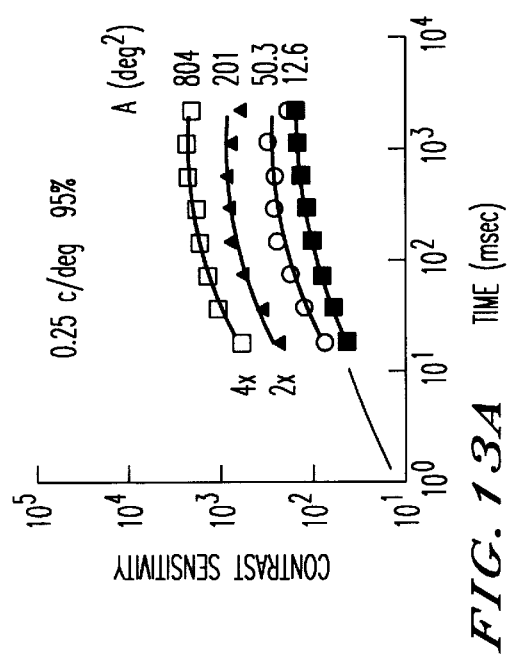
Figure 13C:
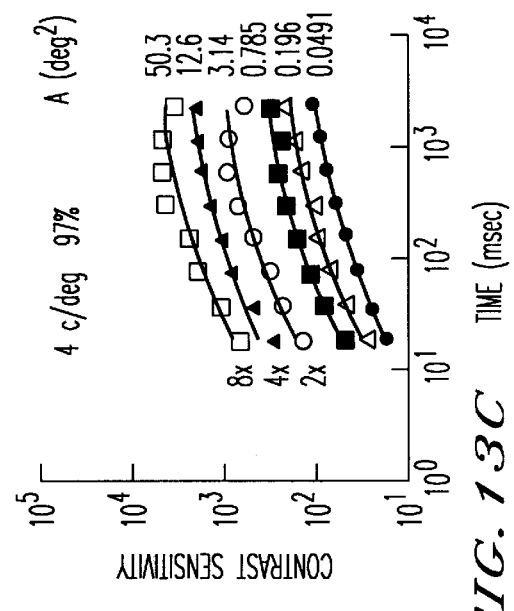

Referring now to the drawings, wherein like reference numerals designate identical or corresponding parts throughout the several views, FIG. 11 is a schematic illustration of a uniprocessor computer system for implementing a system and related method for primitive reprojection-based real-time image generation according to the present invention. A computer 1100 implements the method of the present invention, wherein the computer housing 1102 houses a motherboard 1104 which contains a CPU 1106 and memory 1108. The computer 1100 also includes plural input devices, e.g., a keyboard 1122 and mouse 1124, and a display card 1110 for controlling monitor 1120. In addition, the computer system 1100 further includes a floppy disk drive 1114 and other removable media devices (e.g., compact disc 1119, tape, and removable magneto-optical media (not shown)), a hard disk 1112, or other fixed, high density media drives, connected using an appropriate device bus, e.g., a SCSI bus or an Enhanced IDE bus. Although compact disc 1119 is shown in a CD caddy, the compact disc 1119 can be inserted directly into CD-ROM players which do not require caddies. Also connected to the same device bus or another device bus, the computer 1100 may additionally include a compact disc reader/writer 1118 or a compact disc jukebox (not shown). In addition, a printer (not shown) also provides printed lists of image primitives, exposure events, and three-dimensional images.

The system further comprises at least one computer readable media. Examples of such computer readable media are compact discs, hard disks, floppy disks, tape, magneto-optical disks, PROMS (EPROMs, EEPROMs, Flash PROMs), DRAM, SRAM, etc. Stored on any one or on a combination of the computer readable media, the present invention includes software for controlling both the hardware of the computer 1100 and for enabling the computer 1100 to interact with a human user. Such software may include, but is not limited to, device drivers, operating systems and user applications, such as software development tools. Such computer readable media further includes the computer program product of the present invention for implementing a system and related method of generating a perceptually lossless image stream using perception-based adaptive, progressive, spatio-temporal importance sampling.

The method of adaptive spatio-temporal sampling employing perception-based refinement criteria is now specified. This method is applicable to sampling by ray casting or by the method of adaptive rasterization that is specified later in this disclosure. Details of an implementation based on sample reprojection and a second implementation based on primitive reprojection are also presented later in this specification.

In the present method the visible contrast between two samples is computed from the actual contrast and additional data describing the intersample distance, exposure history, depth-of-field, retinal location of samples, image-plane velocities and accelerations of both sample and point-of-regard, and regional adaptation state of the retina.

This data is employed to adjust the actual contrast to substantially reflect the apparent or visible contrast based on specific spatio-temporal limits of the human visual system. This adjusted contrast is compared to predetermined refinement criteria to determine if additional sampling should be performed in the region of the two samples.

In this implementation a channel-specific hyperbolic approximation to the spatial contrast sensitivity function (CSF) is employed. The spatial CSF is used to effectively adjust the contrast between two samples based on their intersample distance in a manner that substantially reflects the human visual system's fundamental spatial filtering characteristic (described by the spatial CSF) in which higher absolute contrast is required to visually appreciate structure at higher spatial frequencies.

In this implementation the coefficients describing a hyperbolic approximation to the spatial CSF are computed as a function of the exposure history, depth-of-field, retinal eccentricity, and measured or estimated retinal velocity of the samples. The functions used to compute the hyperbolic coefficients effectively account for various spatio-temporal limits of human vision by modifying the hyperbolic shape of the spatial CSF curve to reflect the known effects of these parameters on human visual acuity.

The process is organized to first compute the absolute contrast and then determine the visible contrast based on the unmodified spatial CSF. If this contrast is above a predetermined threshold then the visible contrast is recomputed using an adjusted CSF coefficients computed from a specific function that accounts for a specific spatio-temporal limit of vision. If this value is above a predetermined refinement criteria value then the visible contrast is recomputed using CSF coefficients that are adjusted to reflect a different spatio-temporal limit of vision.

The process continues until the intersample contrast is determined to be below a predetermined refinement criteria value or until all of the spatio-temporal limit functions have been used to modulate the spatial CSF coefficients in the search for limited visibility.

The present method involves monitoring the dynamic resolvability of image elements during their lifetime in the image stream. Properties such as exposure duration, velocity, acceleration, and retinal location may change during the reprojected element's (e.g., sample or primitive) lifetime in the image stream. In order to monitor the visibility of a reprojected element during its presence in the image stream, special visibility information is stored for each reprojected element.

For implementations based on sample reprojection the visibility information is stored for each sample. In these implementations the reprojected elements, i.e. samples, are created by the process of ray casting in exposure regions. In the present invention this ray casting employs the aforementioned method of perception-based adaptive sampling to generate samples. During this process various visibility parameters such as the sample velocity and depth-of-field are determined and stored with the sample. In addition to storing these visibility parameters the method stores a special 16 bit visibility code that describes the overall level of resolvability of the sample and indicates which of the specific spatio-temporal limits of vision was determined to most influence the sample's visibility. This information is used to set a samples "spot size" that determines its weight in the image reconstruction. Additionally this visibility data is subsequently used to efficiently detect changes in the sample's resolvability that could necessitate modification of the samples spot size.

Figure 9A:
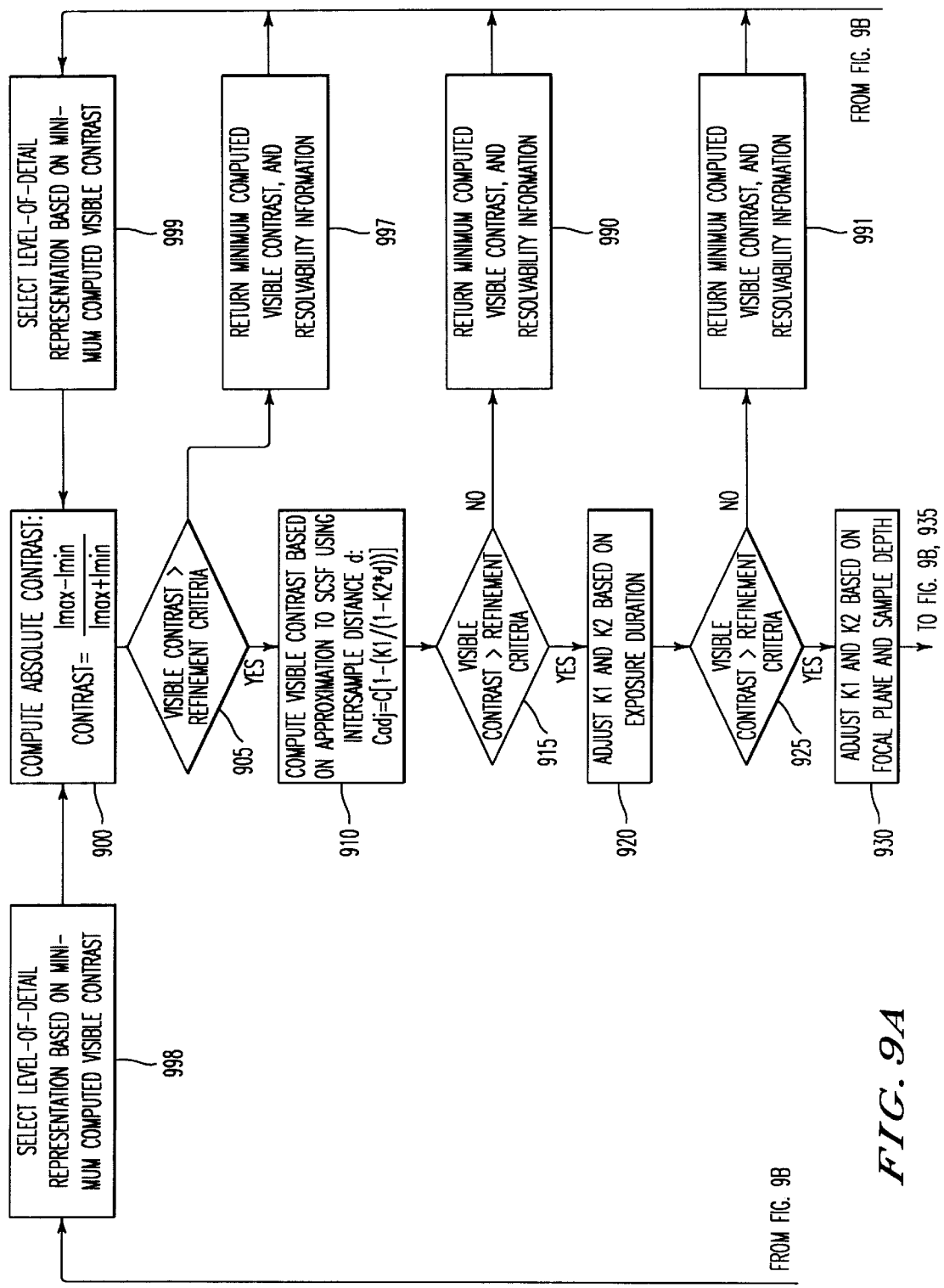
FIG. 9 is a flowchart which charts the logic to determine the visible contrast between two samples.
Figure 9B:
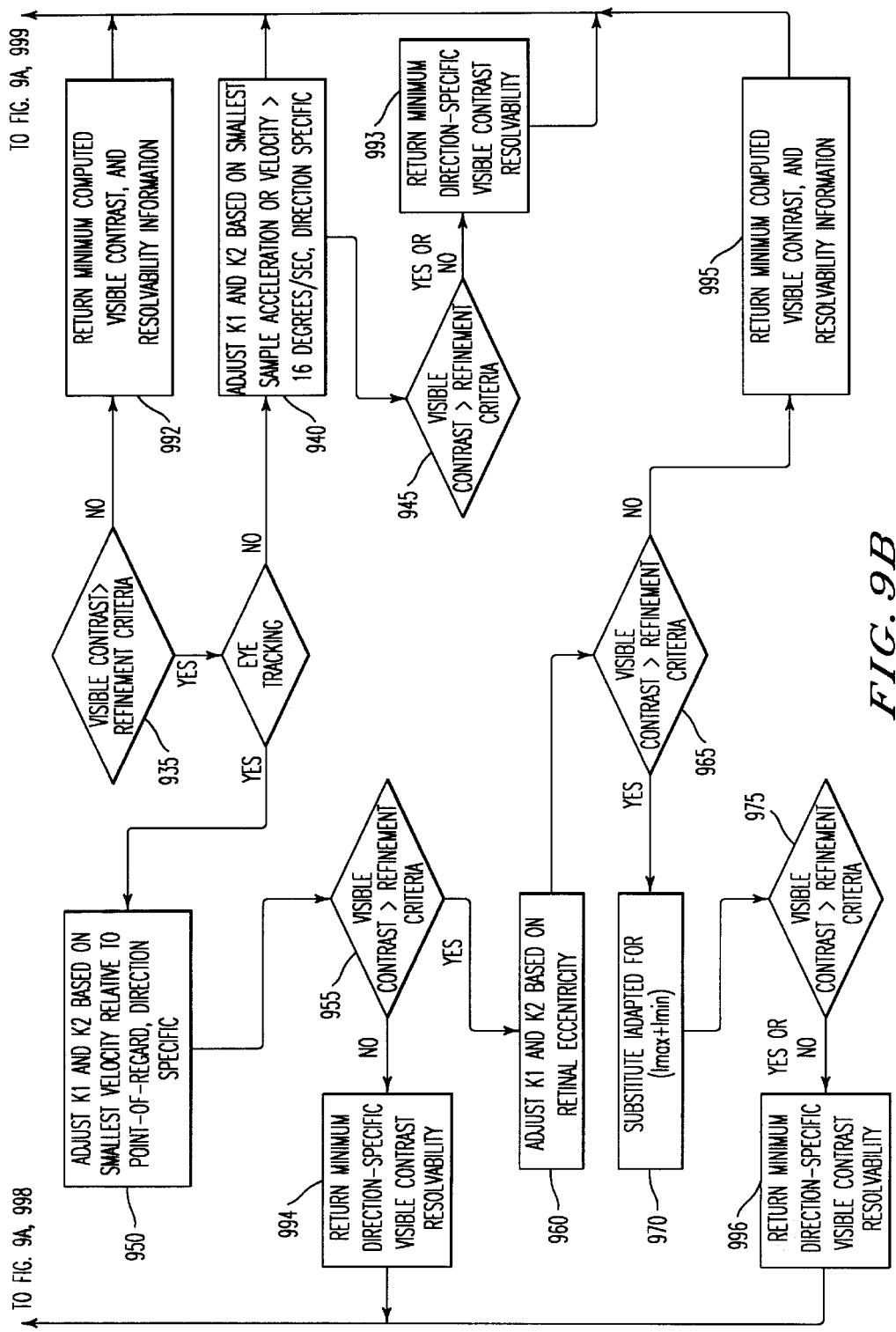
Figure 10:
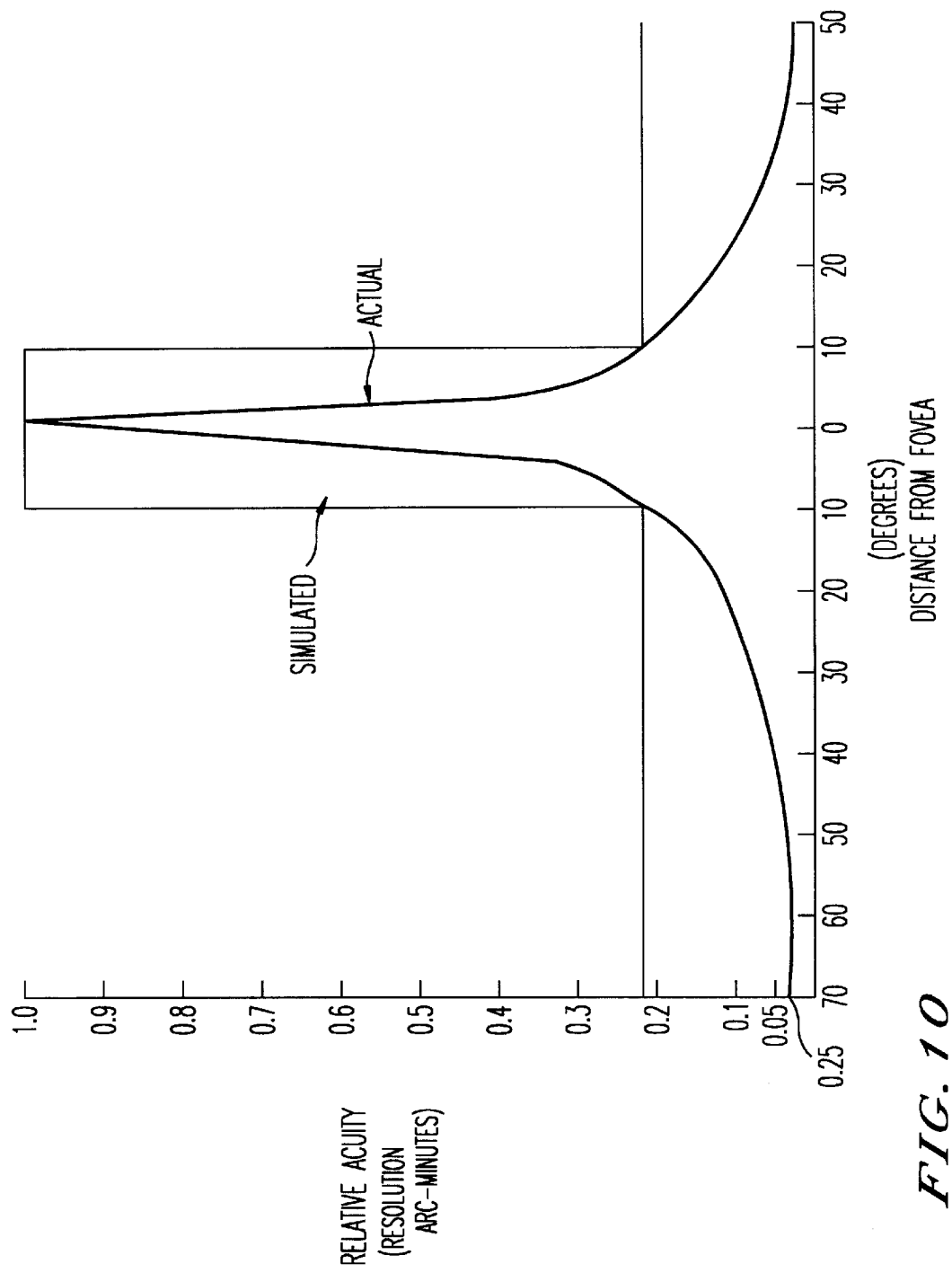
FIG. 10 is a graph of the actual acuity falloff function (see FIG. 7) in conjunction with a step-wise approximation of the acuity falloff function representing an image generation system with a full resolution circular area of interest with a 20 degree radius and a low resolution outer circle.

The logic of determining the visible contrast between two samples based on the actual contrast is illustrated by the flowchart of FIG. 9. The flowchart demonstrates the process of computing the visible contrast between two samples given the actual contrast together with a variety of parameters that can affect the resolvability of image information. The process is controlled by a calling process that manages the actual adaptive sampling (e.g., adaptive ray casting, or adaptive rasterization). The process calls other functions to compute the quantitative effect of various parameters on visibility. These called functions compute approximations to specific physiologic and psychophysical relationships and may be implemented as mathematical approximations or look-up tables. The process returns the adjusted contrast value based on the first tested spatio-temporal visibility limit that caused the adjusted contrast to be less than a predetermined refinement criteria. Alternatively, if the intersample contrast exceeds the predetermined refinement criteria value then the process returns the aforementioned information together with information indicating that the intersample contrast exceeds the refinement criteria.

Figure 1A:
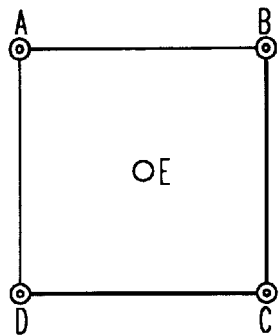
Figure 1B:
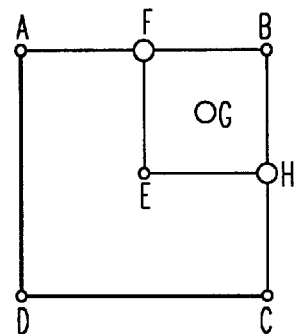
Figure 1C:
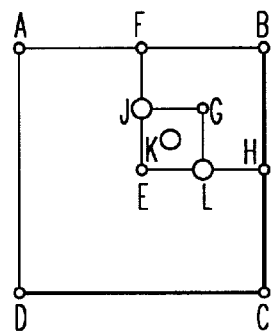
Figure 1D:
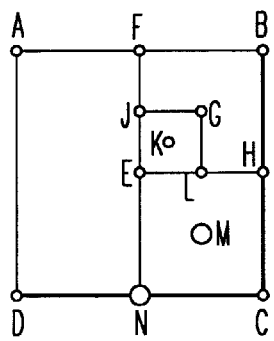
Figure 1E:
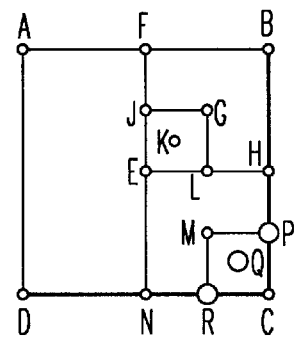
Figure 1F:
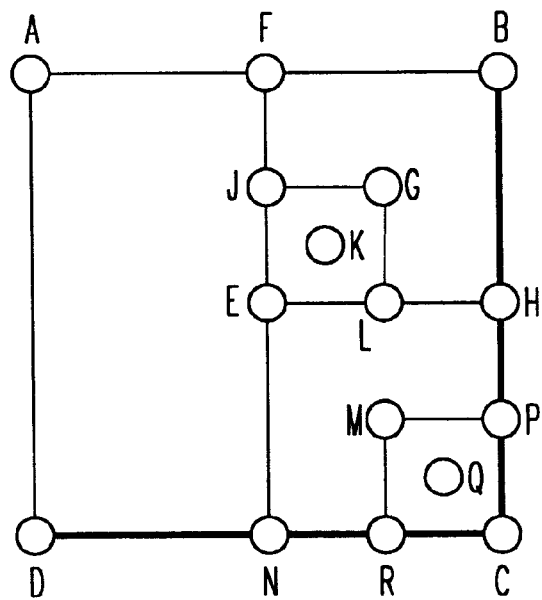
Figure 1G:
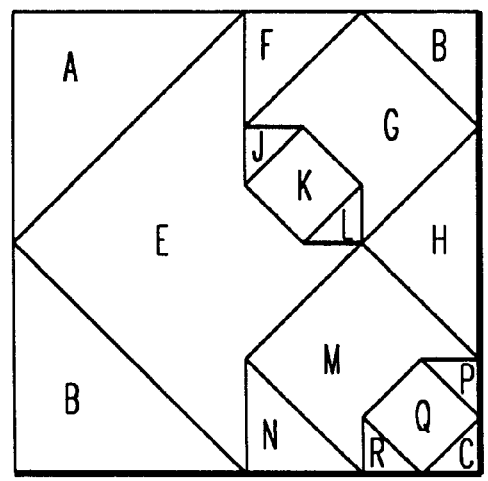
FIG. 1G is an illustration of the relative weights of portions of rectangle ABCD as used in supersampling based on the division of FIG. 8F.
Figure 2:
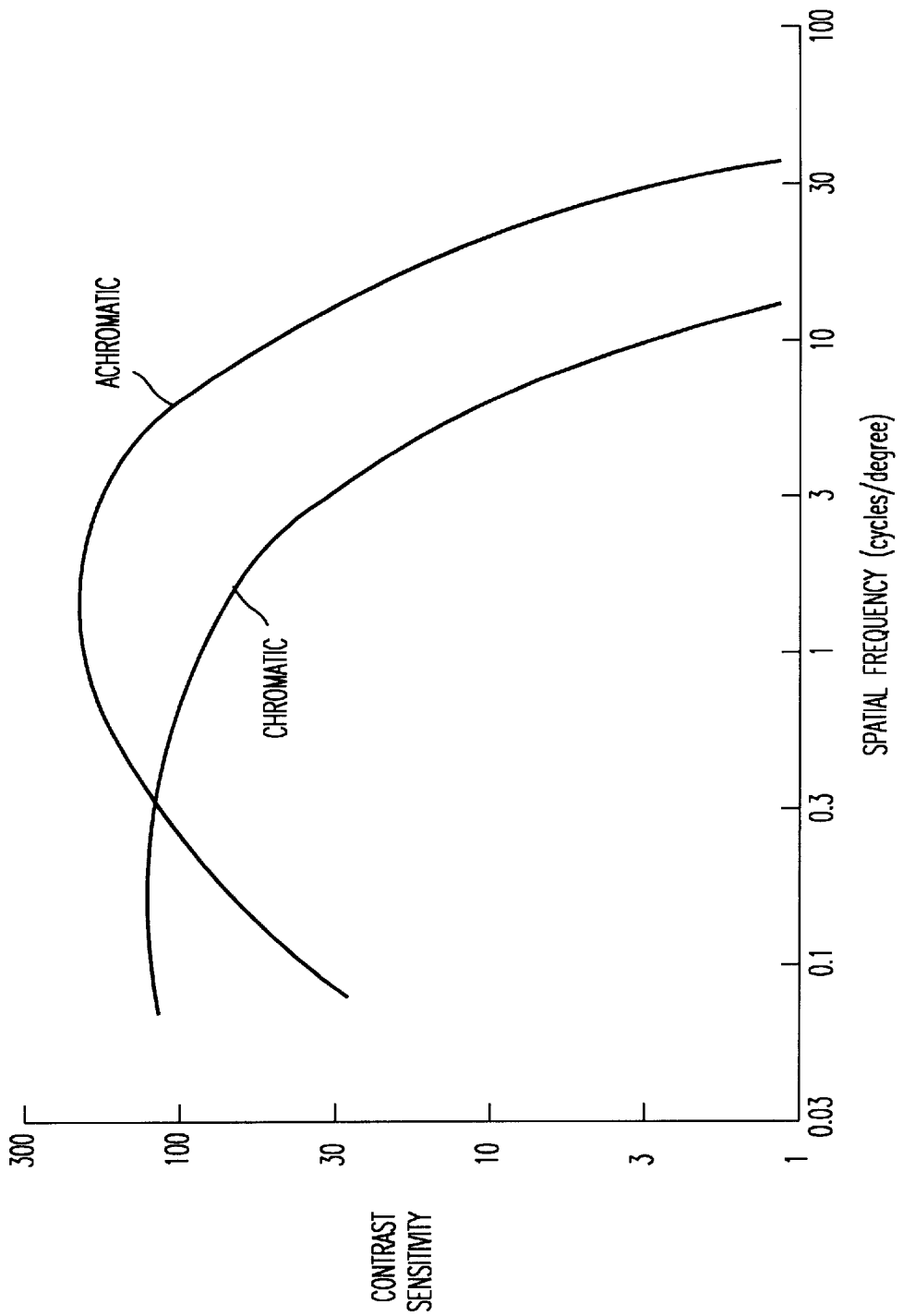
FIG. 2 is a graph showing isoluminant chromatic and achromatic contrast plotted for various spatial frequencies representing the spatial contrast sensitivity function (CSF) for the human visual system.

FIG. 9 shows the process of perception-based adaptive spatial sampling for the uniprocessor implementation of FIG. 11. The process is applied during the performance of the prior art method of adaptive spatial sampling by ray casting described earlier in conjunction with FIGS. 1A through 1F. Alternatively the process is applied to control the method of adaptive rasterization, specified later in this disclosure. In either case the process begins with step 900 in which the intersample contrast between two samples (e.g., samples G and E in FIGS. 1E and 1F) is determined. On completion of step 900 control shifts to step 905 in which the intersample contrast is compared to a predetermined refinement criteria to determine if additional sampling is needed in the region between the two samples. These first two steps are just those of conventional adaptive sampling using contrast refinement criteria. If the comparison of step 905 indicates that the contrast does not exceed the refinement criteria then the contrast value is returned to the calling function, which is the control function for adaptive sampling, together with a return value indicating that no additional sampling should be conducted between the two samples. This process is shown as step 997. Additionally in step 997 data indicating the specific cause of sampling termination is saved for the generated samples. In the present implementation this data is stored as equivalent to the "resolvabilityflag" data field of the C data structure "sample" in FIG. 12. In the case of step 997 a bitflag is set to indicate that the unadjusted intersample contrast did not exceed a predetermined refinement criteria. An analogous process occurs in subsequent steps 990–996 and indicates for each sample the specific reason why the adjusted intersample contrast failed to exceed the predetermined criteria.

Otherwise if the unadjusted contrast determined in step 900 exceeds the predetermine criteria control shifts to step 910. In step 910 the intersample contrast is adjusted to reflect the intersample distance using a function that approximates the spatial contrast sensitivity function of human vision. By this step the actual contrast at high spatial frequencies is reduced to an adjusted value of contrast that reflects the visual system's lower sensitivity to contrast at higher spatial frequencies. In the present method the intersample distance is used directly in an simple hyperbolic equation 2:

$$\text{Contrast}_{adj} = \text{Contrast}*[1-(K1/(1-K2*d))] \quad \text{(equation 2)}$$

Where d is the intersample distance, and both K1 and K2 are coefficients that describe the hyperbolic shape of the spatial contrast sensitivity function expressed in the spatial rather than the frequency domain. The present method employs the AC1C2 color model during rendering and uses separate contrast refinement criteria for A, C1, and C2 channels that reflect the visual system's sensitivity to these specific contrasts. Additionally a separate set of coefficients corresponding to K1 and K2 in the preceding equation are employed that reflect the earlier cutoff of high spatial frequency chromatic contrast compared to achromatic contrast. At the completion of step 910 control shifts to step 915 in which the adjusted intersample contrast for each color channel is compared to a predetermined refinement criteria. If the adjusted contrasts are less than the refinement criteria for continued sampling then control shifts to step 990.

In step 990 the minimum determined visible contrast is always returned to the calling function together with a return value indicating that no further sampling is required between the two tested samples. Additionally in step 990 for implementations using sample reprojection the visibility flag (e.g. equivalent to the "flag" field of the C language data structure "sample" of FIG. 12) of each of the two samples is modified to indicate the specific spatio-temporal limit of vision that produced the minimum value for adjusted visible contrast. In this particular case the flag is set to indicate that the sample's low resolvability was the result of the local contrast structure in the region where the sample was generated.

Figure 3B:
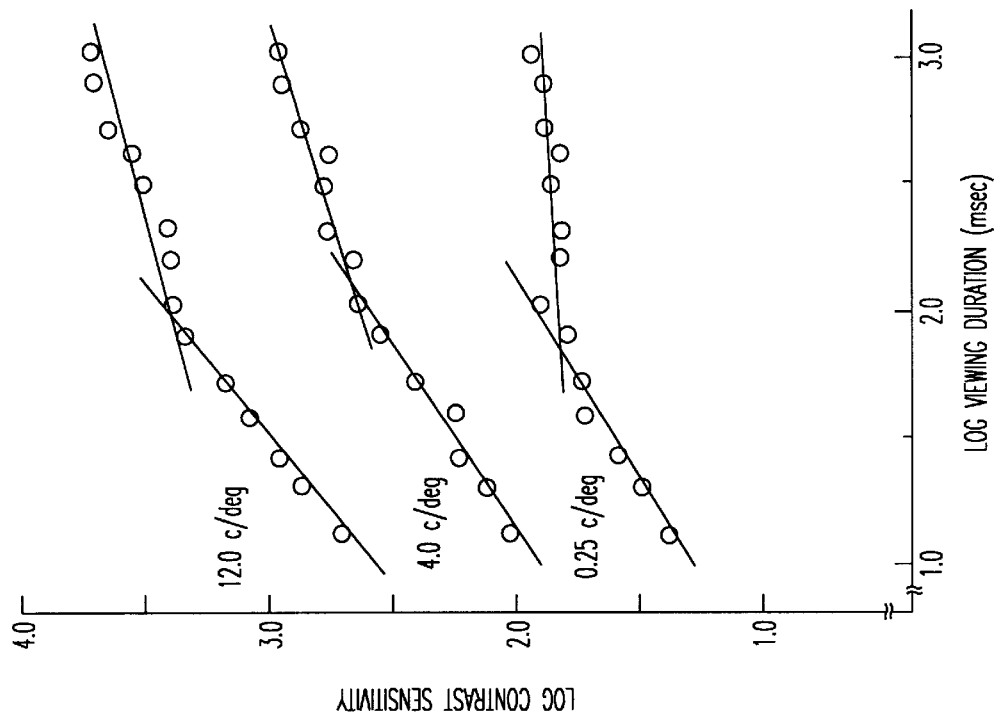
FIG. 3 is a pair of graphs (A and B) illustrating contrast sensitivity plotted against exposure time for various spatial frequencies for two experimental subjects (prior art from Harwerth R. S. et al. Vision Research, Vol. 20, pg. 15–22, 1980)
Figure 3A:
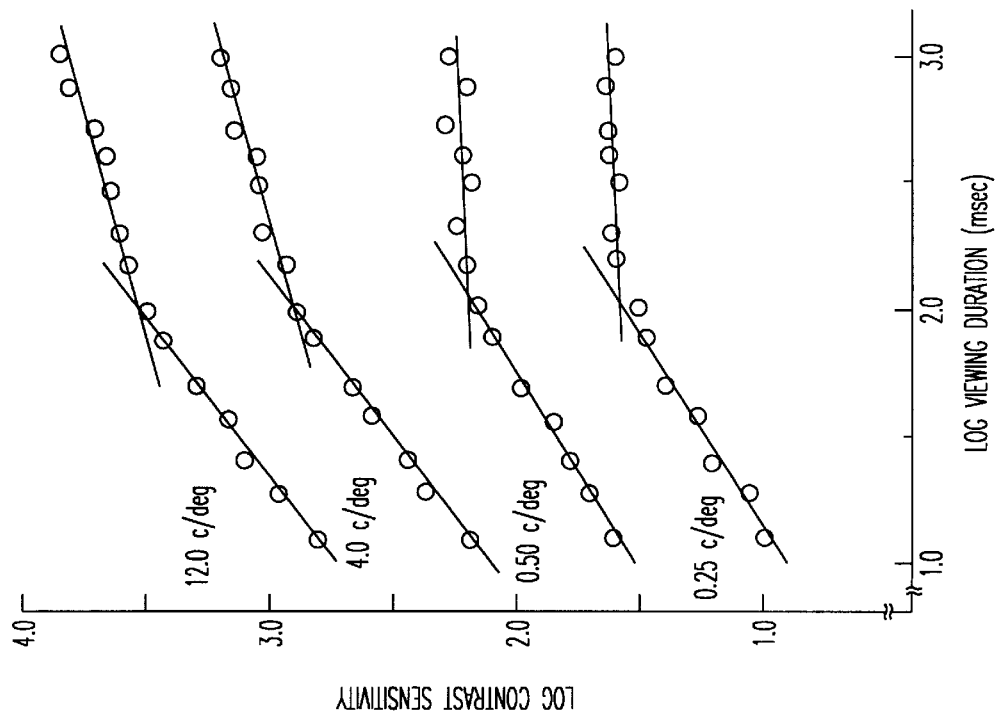

If the comparison of step 915 determines that the adjusted (visible) contrast exceeded the predetermined refinement criteria then control shifts to step 920. In step 920 the visible contrast is adjusted to reflect the exposure duration of the image region being sampled. The exposure duration of samples generated by ray casting in an actual exposure region is zero whereas adaptive sampling conducted in other regions (e.g., during adaptive rasterization of previously visible primitives, or during ray casting in exposure holes) may encounter previously exposed samples. During adaptive rasterization the sample exposure time is equal to the exposure time of the primitive being rasterized. In the present method the values of the function approximating the spatial CSF response (e.g., K1 and K2 in the previously described hyperbolic approximation equation 2) are modified by a predetermined function of the exposure time in a manner that reflects the relationship between visual acuity and exposure time illustrated in FIG. 3. Such a relationship is computed using a lookup table of predetermined values or alternatively an approximate mathematical formula may be employed.

In addition to adjusting the visible contrast based on exposure time the contrast can also adjusted to reflect the exposed area of the sampled region if the area is below a minimum predetermined threshold corresponding to a critical exposure area for visual integration. In this technique the exposed area of the sampled graphic object (eg. primitive, or collection of primitives) is estimated using a metric that reflects the number of exposed visible samples in the depth buffer from the graphic object. In this technique if the exposed area is below a predetermined threshold, corresponding to a critical area, then the contrast is adjusted in some predetermined proportion to the exposed area in a manner that reflects the effect of exposure area on contrast sensitivity. The magnitude of the contrast adjustment based on exposure area exposure area as well as the critical exposure area depends on the spatial frequency and exposure duration in a manner illustrated in FIG. 13 (from Luntinen et al. Vision Research Vol 35, No. 16, pg 2339–2346.) This technique allows newly exposed graphics elements to be spatially undersampled based on both exposure time and exposed area in a manner that reflects these specific spatio-temporal limits of the visual system. Such undersampling reduces the cost of image generation while minimizing visual artifacts of undersampling. In this technique the exposure area of an exposed primitive is estimated from the number of samples belonging to the primitive in the encoder depth buffer. The exposure area for an individual primitive is determined, in the case of primitive reprojection, during the read of the depth buffer to establish newly occluded primitives as previously described.

On completion of step 920 control shifts to the decision step 925 in which the adjusted intersample contrast determined in step 920 is compared to a predetermined refinement criteria. If the adjusted contrast is higher than a the value of the refinement criteria then control shifts to step 930. Otherwise control shifts to step 991, which performs the same process of step 990.

In step 930 the intersample contrast is adjusted to reflect the resolvability of the samples based on their position relative to the viewer's focal plane. In the present method the resolvability of the samples is determined by estimating the size of the blur circle that is produced by the samples based on the viewer's current focal depth and pupil size. A relationship equivalent to that of equation 3 is employed to approximate the size of the blur circle:

$$C=(1-r/s')*d \qquad \text{(equation 3a)}$$

In this expression C is the size of the blur circle (which is inversely related to the resolvablity of the element), p is the pupil size, s' is the distance of the object's image (as defined below), r is the distance from the anterior cornea to the retina (approximately 22.23 mm when accommodated for distance). The depth of the sample's image (s' in equation 3a) is computed from the thin lens equation:

$$s'=(s \times f)/(s-f) \qquad \text{(equation 3b)}$$

where f is the focal depth of the lens that depends on the state of accommodation of the eye and s is the objects depth, on the opposite side of the lens measured from lens center.

In the present method the viewer's focal depth is determined in real-time using one of two techniques. In a first technique the location of the viewer's point-of-regard is determined using known systems and methods of real-time eye tracking described earlier. The depth of the exposed samples in the region of the point-of-regard is determined (by reading the corresponding part of the image depth buffer) and the focal depth is assumed to be this depth. This technique assumes instantaneous change in focal properties of the eye when the point-of-regard changes. (Additionally a kinetic model of vergence and accomodation can be employed to account for delays in the focal state of the eye with changes in target depth.) This method provides a reasonable estimate of the focal depth under most circumstances and allows real-time depth-of-field to be approximated with only eye-tracking equipment. Eye tracking systems employing video analysis (e.g., the high-speed eye tracking and pupillometry system from I-Scan Inc. Cambridge Mass.) generally return a real-time value for pupil size that can be used to more precisely estimate the degree of adjusted resolvability (e.g. by using the value in equation 3).

In a second technique for determining the viewer's focal depth, oculometric methods are employed to measure the focal depth directly. Systems such as the OVRAS (Ocular Vergence and Accommodation Sensor) made by Applied Modern Technologies Inc. of Huntington Beach Calif. are capable of real-time determination of focal depth.

In either case the magnitude of the blur circle is estimated in the previously described fashion and the spatial CSF coefficients are adjusted to reflect the degree of focus of the samples in the sampling region. This adjustment is performed using a precomputed lookup table that relates the shape of the spatial CSF curve to the degree of focus of the image, as determined by blur circle size. On completion of step 930 control shifts to step 935 in which the adjusted contrast is compared to a predetermined refinement criteria. If the adjusted contrast is determined to exceed the refinement criteria then control passes to step 992 which performs a process analogous to step 990. Otherwise control passes to step 940 if eye tracking is not employed or step 950 if eye tracking is employed.

Figure 5:
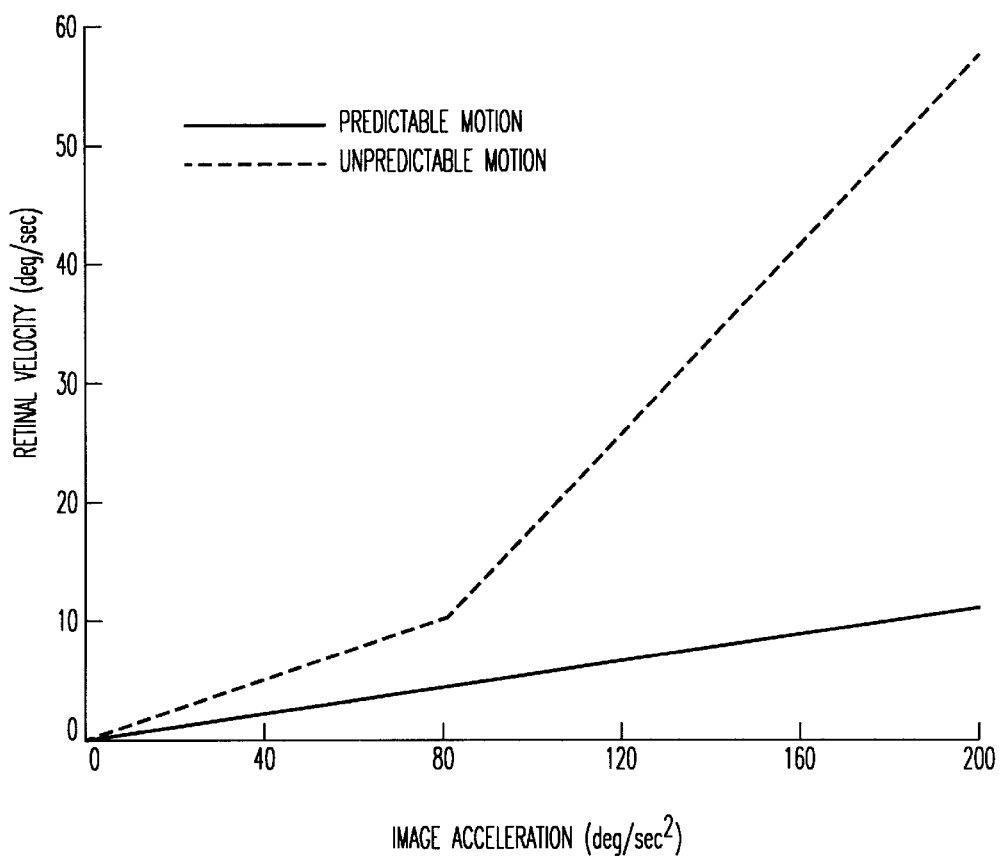
FIG. 5 (from Lisberger et al. (1987)) is a graph showing retinal image velocity plotted for increasing image space acceleration for both predictable and unpredictable motion.
Figure 6:
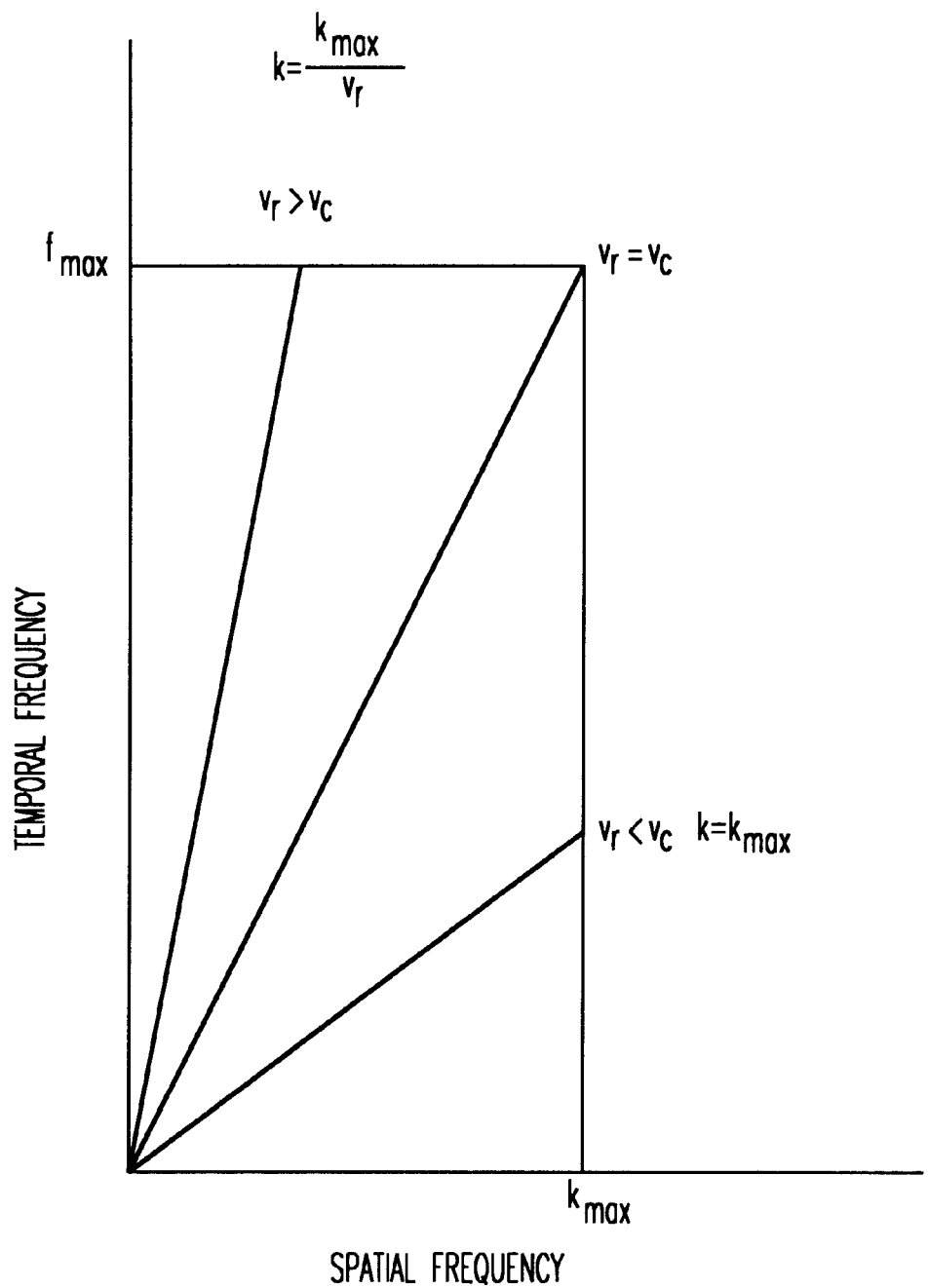
FIG. 6 is a graph (and related functions) showing the "window of visibility" which describes the region in spatio-temporal frequency space that represents the stimulus energies detectable by the human visual system. Prior art from Watson et al. J. Optical Society of America. A, 3(3), 300–307,1986.)
Figure 7:
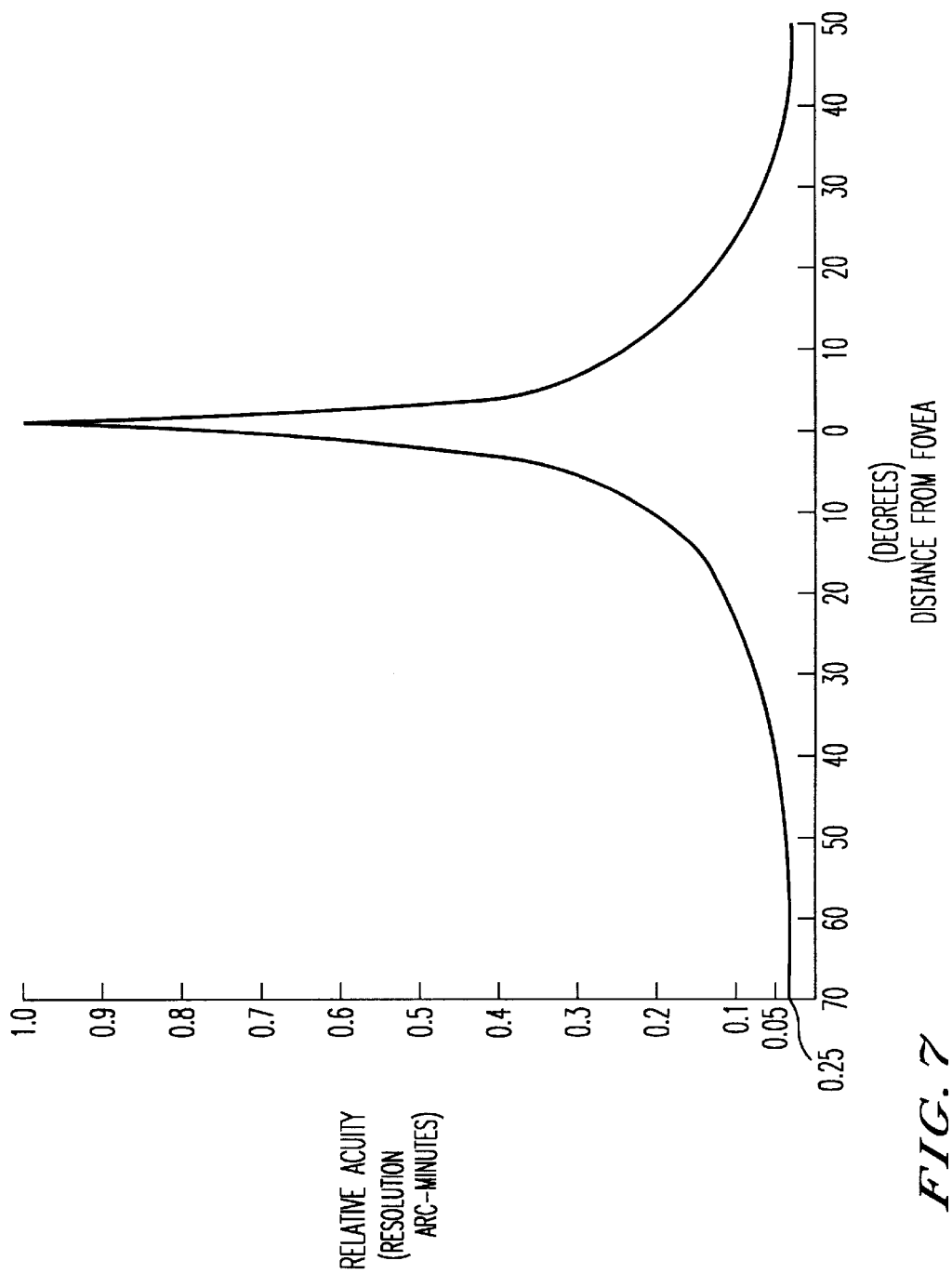
FIG. 7 is a graph illustrating human visual acuity as a function of distance from the fovea, representing the acuity falloff function.
Figure 8:
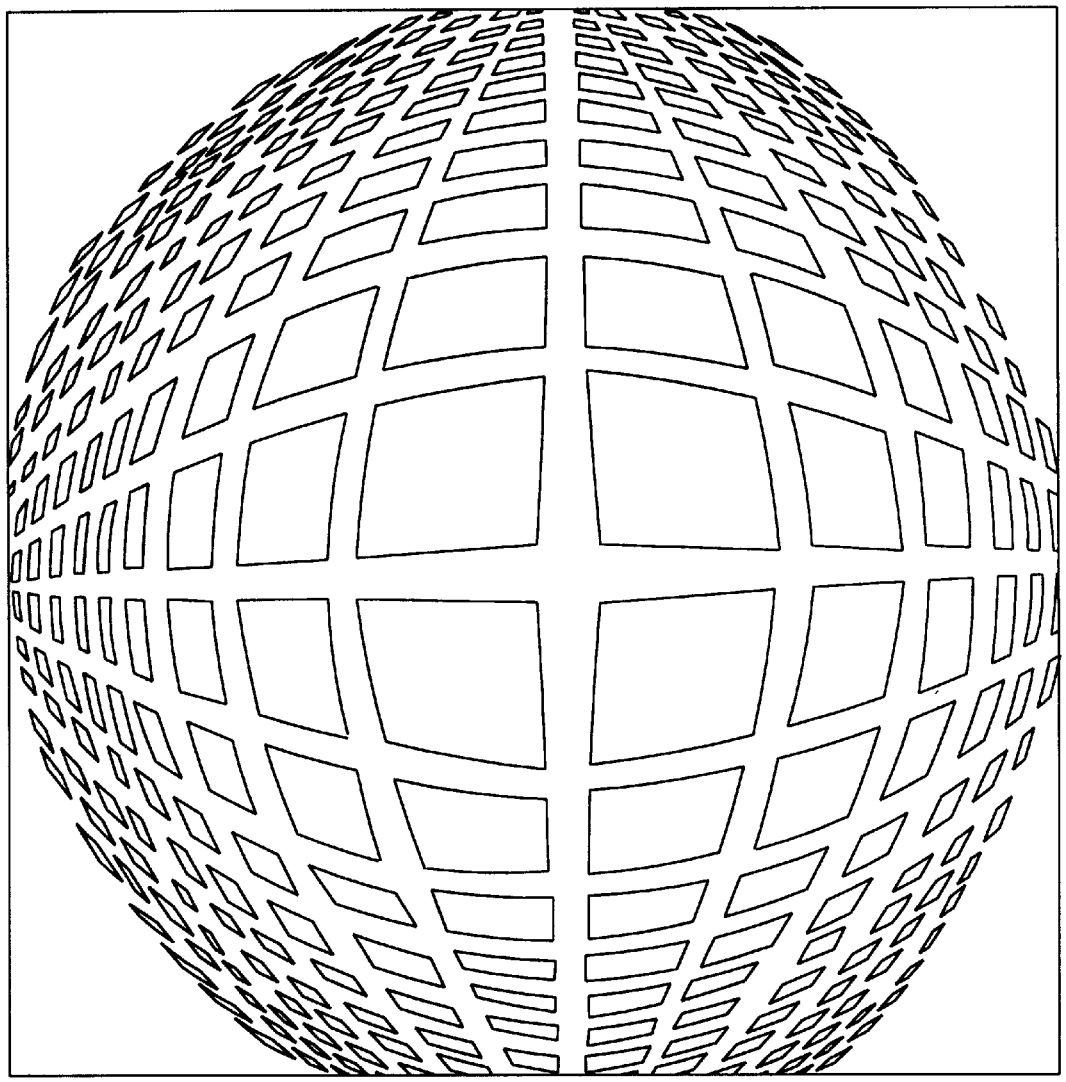
FIG. 8 (taken from Fisher (1982)) is an illustration of a rectangular grid generated using the method of Fisher which represents the non-linear projection of a nonlinear image resulting in a perspective image in which the resolution decreases as a function of the angular distance from the viewer's point of regard.
Figure 14:
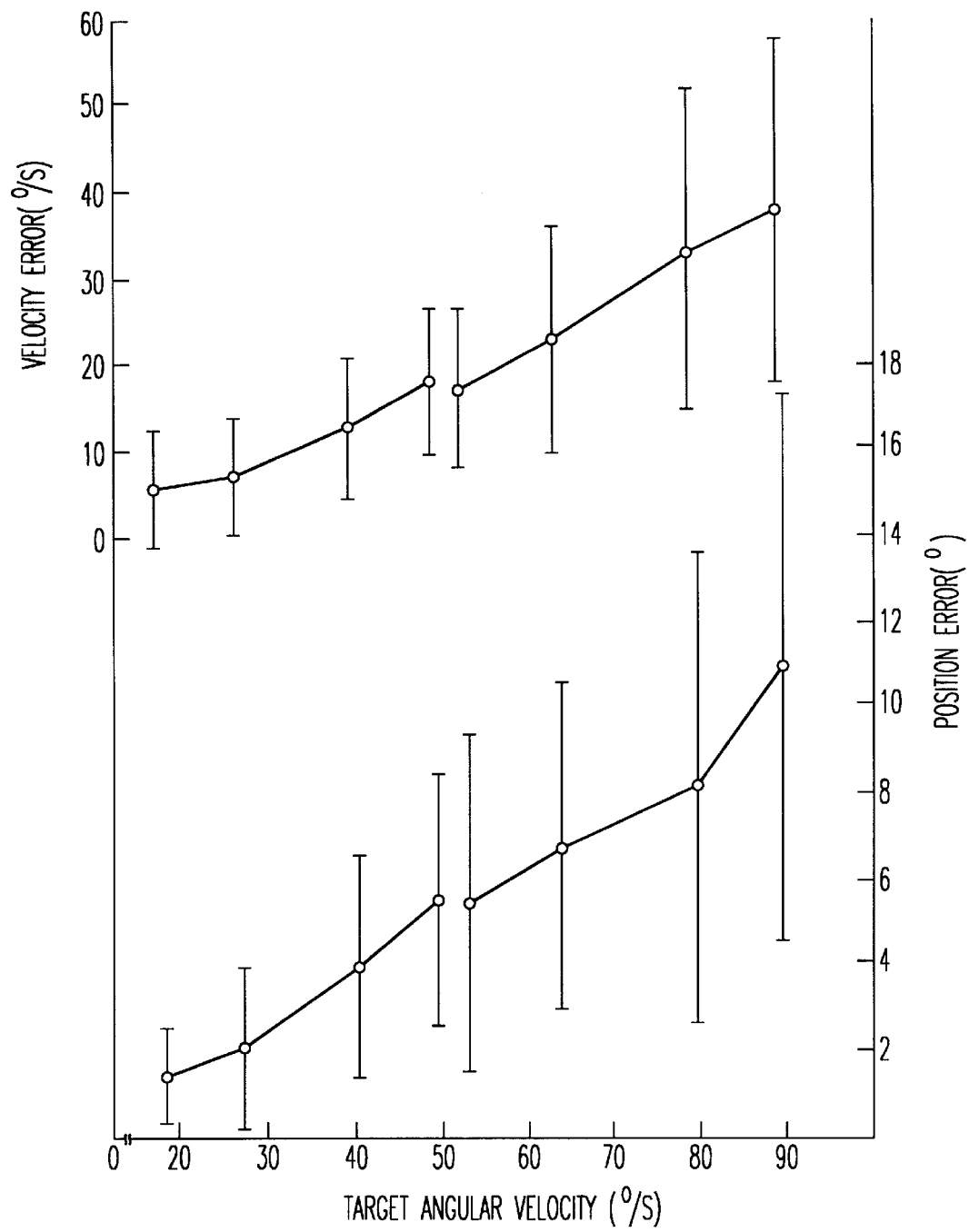
FIG. 14 is an illustration of a known relationship between the image-space velocity of a tracked graphic element and the element's retinal image velocity from a study by Brown (1972b) where the top curve shows the retinal image velocity as a function of image-space velocity during tracking.

In step 940 the visible contrast is adjusted to reflect the sampled region's retinal velocity which is estimated from the image-space velocity and image-space acceleration of graphic elements in the region. This adjustment is made in a manner that reflects the viewer's dynamic visual acuity for the sampled element. The retinal velocity is estimated from the image-space velocity and acceleration of the sampled elements using a known relationship substantially equivalent to the relationship shown in FIG. 5 (from Lisberger et. al.) between image-space acceleration and retinal image velocity. As shown in FIG. 5 the degree of "predictability" of the motion influences the accuracy of the oculomotor pursuit and fixation mechanisms responsible for stabilizing the retinal image of the target element. Additionally, known relationships between image-space velocity and retinal velocity for tracked elements are also employed to estimate the retinal velocity of an element from the known image-space velocity of the element. The present method employs the relationship determined in a study by Brown (1972b) and shown in FIG. 14. The complete set of factors that influence the predictability of an image-space target, the efficacy of oculomotor pursuit, and the exact effect of retinal image motion on visual acuity is not yet known but remains a subject of vision research (see review by Knowler: Vision and Visual Dysfunction, Volume 5, Limits of Vision, Chapter 4, The Stability of Gaze and its Implications for Vision, Macmillan Pres, 1991 ISBN 0-8493-7505-3). What is clear from all studies of dynamic visual acuity is that retinal image motion decreases the spatial contrast sensitivity and other metrics of spatial acuity for high spatial frequencies. The present method employs currently known relationships between the image-space velocity and acceleration of a graphic element to estimate the retinal image velocity of the element. In these relationships the retinal image velocity is determined to be in some proportion to the image-space velocity, image-space acceleration, and the degree of unpredictability of the image space motion. The method further employs known relationships between the resolvability of a retinal image and the retinal image velocity of the image region in which the resolvability is in some inverse relationship to the retinal image velocity of the image. The method can easily incorporate more refined relationships between these variables as they become available from ongoing vision research.

Figure 4:
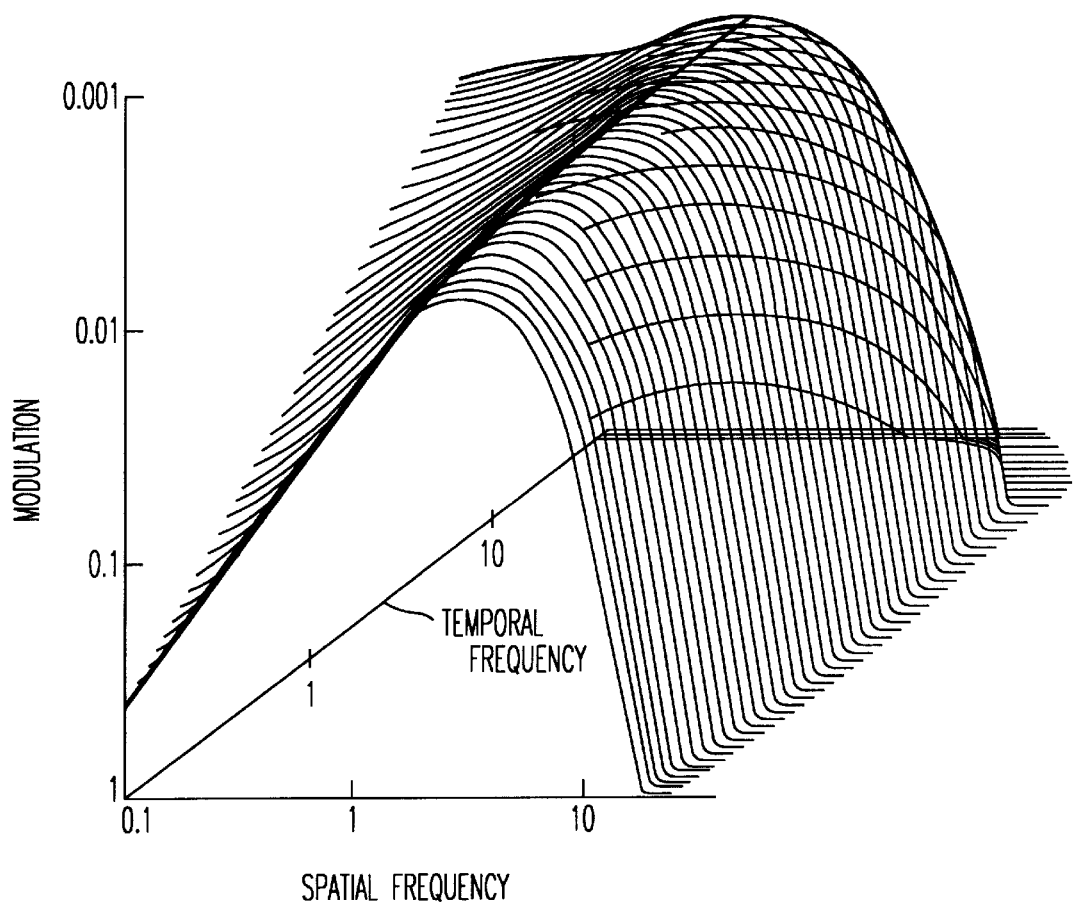
FIG. 4 (from Kelly (1985)) is a graph showing the spatial contrast sensitivity function for targets (sinusoidal gratings) moving at various retinal velocities.

The previously described relationships between image-space velocity and acceleration, and retinal image velocity assume that the target is being freely tracked by the viewer. As a result such relationships tend to provide a minimum value for retinal motion given for any degree of image-space acceleration. In step 940 the value of the estimated retinal velocity is used to compute the relative acuity of the sampled region using a relationship equivalent to equation 4:

$$k_0(v_r)=k_{max}(v_c/(v_r+v_c)), \qquad \text{(equation 4)}$$

where $k_o$ is the reduced spatial acuity (spatial frequency limit) of the observer, $v_r$ is the retinal velocity of the observed image element, $v_c$ is the "corner velocity", and $k_{max}$ is the maximum spatial frequency limit of the system as determined by the spatial contrast sensitivity function of the visual system (e.g. Kelly). This formula is cited from Eckert M. and Gershon B. "The Significance of Eye Movements and Image Acceleration for Coding Television Image Sequences" chapter 8 in the volume "Digital Images and Human Vision", Andrew B. Watson Ed. 1993 MIT press, ISBN-0-262-23171-9, included herein by reference. The computed acuity is used to modify the coefficients K1 and K2 of equation 2 in a manner that reflects the effect of retinal velocity on the spatial contrast sensitivity function. This relationship is implemented as a lookup table that stores the relationships graphically illustrated in FIG. 4 wherein high spatial frequencies undergo cutoff with increasing retinal velocity. The reduction in visual acuity caused by retinal image motion is direction-specific and does not occur in the direction orthogonal to the retinal image motion. To account for the direction-specific character of dynamic visual acuity the present method determines the intersample distance and intersample velocity in each image-space dimension and computes separate adjusted contrasts for each image-space dimension. Using this technique, for example, two samples separated in both xi and yi directions may be determined to have a high visible contrast in the yi dimension but not in the xi dimension because of high estimated retinal velocity in this dimension. In this example the process determining visible contrast returns information to the adaptive sampling calling process equivalent to the "struct contrast" C data structure shown as part of Table 1.

TABLE 1

```
struct contrast
    {
    float cA;           /* Contrast for A channel in AC1C2 color model */
    float cC1;          /* Contrast for C1 channel in AC1C2 color model */
    float cC2;          /* Contrast for C2 channel in AC1C2 color model */
    char sample__in__x; /*0 = no further sampling, 1 = further sampling*/
    char sample__in__y; /*0 = no further sampling, 1 = further sampling*/
    };
```

In this case the sample__in__x and sample__in__y fields indicate to the adaptive sampling process in which image-space dimension(s) additional sampling is required. The effect of step 940 is to produce spatial undersampling in regions that are adaptively determined to have image-plane velocities which would produce retinal motion even if the regions were being tracked by smooth pursuit eye movements. Following step 940 control passes to the step 945. In step 945 it is determined if the adjusted contrast is less than or equal to, or alternatively greater than a predetermined value of a refinement criteria. If greater, then the direction specific fields "sample__in__x" and "sample__in__y" of the data structure equivalent to the C data structure shown in Table 1 are set to a value of "1". Otherwise these fields are set to a value of "0". In either case control shifts to step 993 which performs a process equivalent to step 990, except that the resolvability flags are set to indicate whether or not the estimated retinal velocity of the sampled element(s) was sufficient to reduce the resolvability of the two samples below a predetermined value.

If eye-tracking is employed then control flows from step 935 to step 950 rather than 940. In step 950 the visible contrast is adjusted to reflect the sampled region's retinal velocity which is determined to be the difference between the sample's image-space velocity and the image-plane velocity of the point-of-regard as measured by eye-tracking. This adjustment is made in a manner that reflects the viewer's dynamic visual acuity for the sampled element. Other details, including the direction specific computation of adjusted contrast are as described in step 940 except that the actual retinal velocity rather than an estimated retinal velocity is employed. By actually measuring the retinal velocity of image elements the method does not have to estimate the retinal velocity using a relationship that assumes oculomotor tracking of the elements. Because in the typical case only a small number of image elements are actually tracked the actual measurement of retinal velocities allows a greater degree of undersampling based on dynamic visual acuity. The effect of retinal velocity on visual acuity can be quite pronounced. In the extreme case of rapid retinal velocity of all image elements caused by rapid retargeting eye movements called saccades, the visual processing is actively suppressed in the brain, see Martin, E. (1974). Thus during a substantial part of a saccade the viewer is effectively blind. This suppression prevents the appearance of blur during saccades (which are very frequent events, typically occurring several times per second). Through this saccadic suppression mechanism the visual system creates a graceful performance degradation during periods of extremely low temporal image coherence: it suppresses incoherent information from the retinal elements from reaching higher conscious centers. Under less extreme conditions that typically occur during vehicular simulation or walkthrough of virtual environments only a relatively small amount of the visualized environment is actually stabilized on the retina by the viewer's pursuit and fixation eye movements. Under these conditions the majority of graphic elements may have significant retinal image motion that substantially limits their resolvability. Under these conditions the spatial undersampling that is made possible for elements with low dynamic spatial resolvablity can significantly reduce the cost of image generation.

On completion of step 950 control shifts to a decision step 955. In step 955 if it is determined that the adjusted contrast does not exceed a predetermined refinement criteria then control shifts to step 994 which performs a process equivalent to 990. Otherwise if the refinement criteria is exceeded then control shifts to step 960.

In step 960 the contrast is adjusted to reflect the retinal location of the sampled element. This adjustment is made to reflect the reduced resolvability of image elements at large angles of retinal eccentricity as expressed by the acuity falloff function. The retinal location of a sampled region is determined from its location relative to the viewer's instantaneous point-of-regard as measured by a suitable eye tracking subsystem. In this process a lookup table is employed to access predetermined values of K1 and K2 for the determined retinal location. Alternatively the resolvability can be estimated on the fly using a simple approximate function such as equation 5:

$$A = c1 + c2/(\text{theta} + c3) \qquad \text{(equation 5)}$$

in which A is a measure of the acuity, theta is the angle of retinal eccentricity of the sampled region, and c1, c2, c3 are optimal parameters with values −0.0323, 0.0524, 0.0507 respectively describing an accurate approximation to the acuity falloff function (see Grob, (1994)). Because of the very steep falloff in resolvability with retinal eccentricity, adaptive determination of the retinal location of the sampling region can be used to substantially reduce spatial sampling densities in many regions of the image while still producing an apparently uniform resolution.

On completion of step 960 control shifts to a decision step 965. In step 965 if it is determined that the adjusted contrast does not exceed a predetermined refinement criteria then control shifts to step 995 which performs a process equivalent to 990 except that in this case the flag for the sampled element is set to indicate that the resolvability failure was caused by retinal position. Otherwise if the refinement criteria is exceeded then control shifts to step 970.

In step 970 the contrast is adjusted to reflect the adapted state of the retinal elements viewing the samples. This technique is employed in conjunction with a method of retinotopic load balancing, described later in this specification. In the technique of retinotopic load balancing, subimage processors are assigned to specific regions of the visual field not specific regions of the image. In this technique, for example, specific subimages are mapped to the center of the visual field corresponding to the foveal region of the retinal image. For such a mapping, samples in the image buffer correspond to specific retinal regions. Using this mapping the present method maintains a record of the luminance exposure history of the image buffer sample locations. The level of adaptation of the retinal photoreceptors corresponding to specific sample locations in the buffer is estimated using a kinetic model of adaptation in which the state of adaptation is a function of the current luminance, the last known level of adaptation of the retinal region, and the time interval.

The visible contrast in any portion of the visual field depends upon the adapted state of the retinal region subserving that portion. The visible contrast is actually computed relative to the luminance level to which the relevant photoreceptors are adapted:

$$\text{visible contrast} = dI/I\text{adapted} \qquad \text{(equation 6)}$$

In a typical image stream each retinal region is exposed to a constantly changing level of illumination. Because adaptation does not occur instantaneously, retinal regions can frequently be exposed to levels of illumination for which they are relatively poorly adapted. Contrast sensitivity in these regions is reduced thereby producing a reduction in visible contrast in the corresponding regions of the image stream.

Extreme examples are experienced when going from bright daylight into a dimly illuminated room. In this case the change in illumination can be more than 8 orders of magnitude. Under these conditions the visual system requires many minutes to achieve maximal adaptation. Less extreme changes in the illumination level of different regions occur more commonly and result in more rapid adaptation. Changes in illumination level of 2–3 orders of magnitude are effected by relatively rapid neural mechanisms with a time constant on the order range of 100–150 ms. (see Crawford B. H. Proceedings of the Royal Society 134:283, 1947). This is longer than the typical temporal update rate for image generation (e.g. 33 ms). As a result, when the illumination level of a retinal region changes abruptly, high contrast image information within these newly exposed image regions may not become fully visible for several temporal update periods.

In the present method the level of adaptation in relatively small regions of the retina is recorded in an auxiliary data structure called a retinal buffer. The size of retinal buffer regions is selected to reflect the tendency of individual photoreceptors to adapt to the average luminance in a region surrounding the individual photoreceptor. The size of this region is dependent on the interconnection of retinal receptors by retinal interneurons called horizontal cells. These cells link surrounding photoreceptors together (over ranges that can exceed several minutes of arc) and cause the adapted state of individual photoreceptors to reflect the surrounding luminance. The retinal buffer is a two dimensional array representing adapted luminance levels for retinal regions throughout the visual field. Each element in the retinal buffer holds the current level of luminance to which the corresponding retinal region is adapted. The current adapted luminance of any element in the retinal buffer is determined by the following approximate first order kinetic formula which relates the previous level of adapted luminance to the current level of luminance.

In equation 7, given by:

$$\text{new\_adapted\_luminance} = (LI\text{adapted} - LI\text{current})*\exp(-1.0*k*t) + LI\text{current}, \qquad \text{(equation 7)}$$

"new_adapted_luminance" is the new adapted value, LIadapted is the previous adapted value, LIcurrent is the current luminance value of the region, k is a time constant, and t is the elapsed time between the previous determination and the present determination.

This equation reflects an exponential decay behavior of the rapid phase of dark adaptation. Current luminance levels for elements in the retinal array are determined by reading luminance levels from the sample arrays for subimages that overlap the retinal region. The retinal coordinates corresponding to each sample from the sample buffer is simply computed using the image coordinates of the sample and offsets based on the relative locations of the subimage and the retinal region. In this way the current luminance to which the retinal element is exposed is used to update the new_adapted_luminance (in equation 7) based on the time interval from the last adapted state.

An example of a data structure for the retinal buffer is given by the C language data structures "retinalbuffer_header" and "retinalbuff_element" in table 2:

TABLE 2

```
struct retinalbuffer_header
    {
    int xelements, yelements;       /* size of the linearized 2-D array in each dimension*/
    struct retinalbuff_element* rbptr;  /* pointer to the base of the array*/
    int image_x, image_y;           /* image coordinates at lower left of buffer*/
    int retina_x retina_y;          /* field-of-view (retinal) coordinates*/
    };
/* 2 Dimensional array accessed by rx and ry */
struct retinalbuff_element
    {
    float adapted_luminance; /* Current adapted luminance at this retinal coordinate */
    int t;                   /* clock time since last update*/
    int current_frame;
    };
```

The present technique of determining the visible contrast based on the estimated adapted state of the corresponding retinal elements is possible only with eye tracking implementations. For advanced display systems with a large luminance range and for image streams which have a low degree of spatio-temporal luminance coherence (i.e., rapid changes in luminance values in image regions over time) this method can allow transient reductions in resolution and level of detail that significantly reduce the cost of generating such image sequences.

On completion of step 970 control shifts to decision step 975 in which the adjusted contrast is returned. In a similar fashion to steps 990-994 the resolvability flags for the reprojected element (e.g. sample) are set to indicate the cause of the reduced resolvability as well as the level of resolvability of the sampled element.

In the preceeding sequence the resolvability of two samples is determined based on their intersample contrast and a number of other factors that affect resolvablity. The results of this determination, in this example, are used to determine if additional spatial sampling is needed in a sampled region. Additionally, the results of this determination are used to determine a specific level-of-detail database representation that should be employed if further sampling is conducted in the region. This determination is represented as step 998 and 999 in FIG. 9. In these steps the level of resolvability in a region (e.g. as recorded by the resolvability variable for the elements of the region) is used to determine the level-of-detail representation of the database to be employed during additional sampling of a region as may occur during adaptive sampling or during resampling of the area based on changes in the resolvability of the region. In this context, level-of-detail selection may include geometric level-of-detail as well as level-of-detail specific illumination and shading models. In this way, both the spatial sampling density and the level-of-detail of the sampled database are selected to reflect the dynamic resolvability of the specific region of the image stream.

The particular order of applying processes for determining the resolvability sampled elements is not limited to the specific order presented above in conjunction with FIG. 9. In the present method the goal of these processes is to identify some specific factor (e.g. retinal velocity, exposure duration, depth-of-field) that reduces the resolvability of the image in the region of the sampled elements to a predetermined level. The specific factor that is identified to reduce the resolvability to this level is recorded for the reprojected element (e.g. sample or primitive) by a specific modification of a bitflag variable (e.g. equivalent to the "resolvabilityflag" field of the C language data structure "sample" of FIG. 12. The value of this field, for example implemented as a bitmask, indicates the specific factor responsible for the reprojected element's low resolvability during the last sampling period. Because factors affecting resolvability of the image elements tend to change gradually with the evolution of the image stream it is likely that, for a specific sampled graphic element, the cause(s) of low resolvability will be relatively consistent over time. Consequently the value of a resolvability flag, determined for one frame, can be used later to select a function or process for computing resolvability that employs a sequence of tests in which the tests most likely to indicate low resolvability are made first. As a result only a few determinations in the entire sequence of determinations illustrated in FIG. 9 usually need to be made.

In the presented implementation the effect of each parameter on resolvability is computed independently to identify the most significant factor. Alternatively, multivariate functions or look-up tables can be employed to compound the effects of multiple parameters on resolvability.

In the present implementation the quantitative effect of low resolvability is assessed by the effect on the intersample contrast. This is a particularly useful method of assessing reduced resolvability during adaptive sample generation. In addition to being controlled by an adaptive sampling process the determination processes previously described can be employed during non-adaptive sample generation. An example of this use of the previously described methods of reducing resolution for non-adaptive rendering is rasterization of an entire primitive at a resolution that reflects the minimum estimated retinal velocity or the minimum retinal eccentricity of the primitive's vertices.

In addition to the modulation of spatial sampling density (resolution) and level-of-detail based on the spatial resolvability of graphics elements, the present invention includes the technique of modulating the local temporal sampling frequency of elements to reflect the temporal resolvability of these elements. In this method the temporal sampling frequency for individual graphics elements (e.g., samples, primitives) or groups of elements is made in some predetermined proportion to the element's measured or estimated retinal velocity in a manner that reflects the critical temporal sampling frequency(CTSF) for the perception of smooth motion.

This approach is facilitated by employing a spatial sampling that uses a progressive stratification. With a progressive stratification, spatial sampling occurs in such a way that terminating sampling at any time will result in a substantially representative distribution of samples within the sampled region. For adaptive sampling patterns such as that represented in FIG. 1, such a progressive stratification is produced by increasing the level of adaptive sampling in a region in a uniform pattern. In a progressively stratified sampling pattern no one small subregion is further "subdivided" by additional sampling until all of the other equivalent subregions have been tested to the same "level" as the current subregion.

Figure 15A:
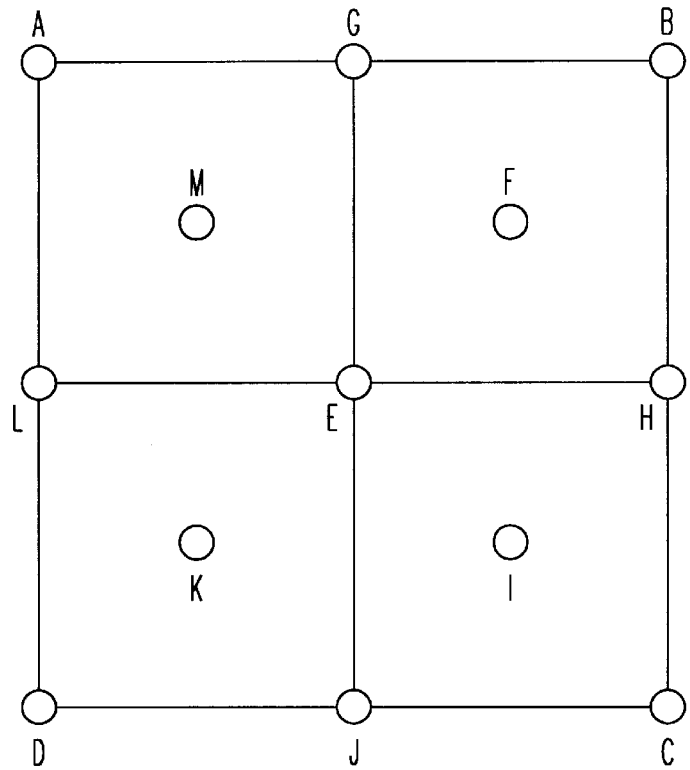
FIGS. 15A and 15B illustrate progressively stratified sampling of an image subregion.
Figure 15B:
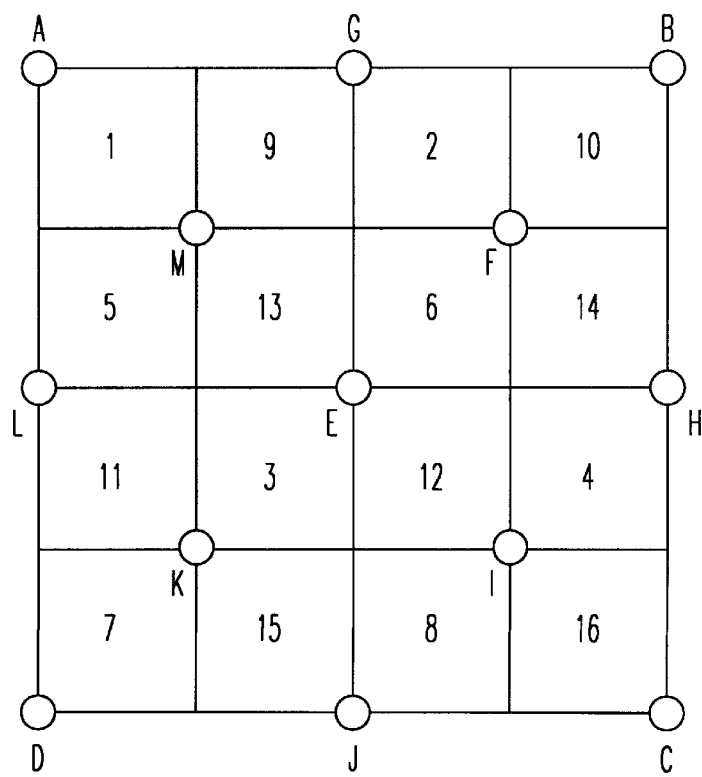
Figure 16:
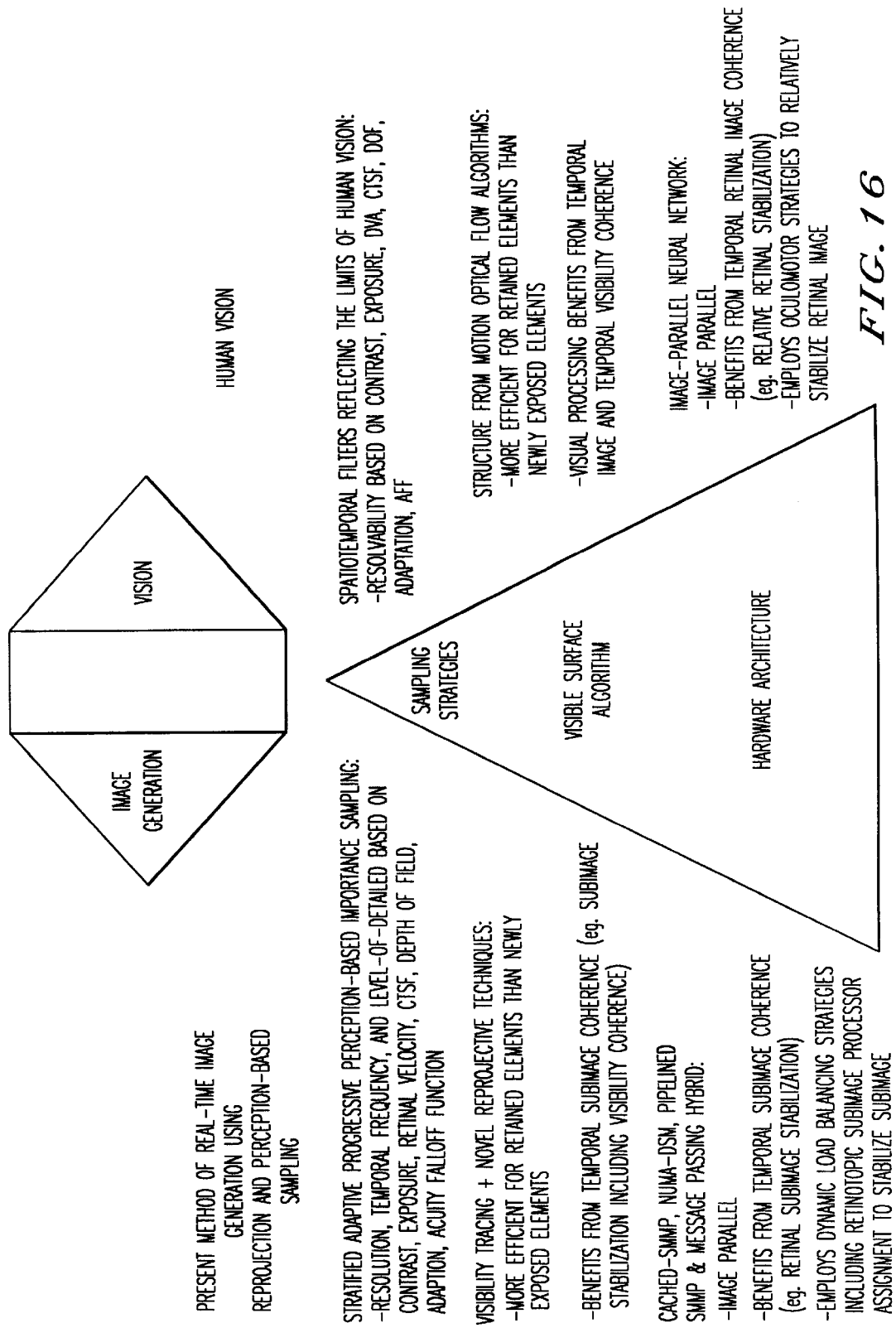
FIG. 16 is illustrates the parallels between the performance of the present method of image generation and the human visual system.

An example of a progressively stratified sampling of a region is shown in FIG. 15A and 15B. In this example the subregions of the sampled region representing rectangles AGEL, GBHE, EHCJ, and LEJD are each tested for the presence of visible information before any one of the subregions is further divided. As the number of subregions to be tested at each stage of the stratification increases then a representative subset of the subregions is tested before any single subregion is subdivided further. In this manner, if the number of subregions to be tested is large, some representative subset of the regions will be sampled if sampling is terminated at an arbitrary time. One example of this approach is shown in FIG. 15B in which the smaller sampled subregions are tested in the order shown by the numbers 1 through 16. By employing such a progressive stratification the sampling process can be terminated at any time during the rendering of a frame while producing a relatively representative set of samples for reconstruction. This approach provides a method of maintaining frame rate by decreasing resolution. As previously discussed in the copending application image parallel methods such as sort-first and primitive reprojection tend to suffer performance degradation when temporal image coherence is low. An image stream with low temporal image coherence has high image-plane velocity components that tend, in general, to produce retinal image motion that reduces the spatial resolvability of these elements. By employing progressively stratified sampling together with an image generation architecture that undergoes performance degeneration with low temporal image coherence, frame rate is maintained at the expense of resolution for regions of the image stream having low temporal image coherence. Since the visual acuity for these same regions tends to be reduced (by the relationship of dynamic visual acuity) reduction in displayed resolution is relatively invisible to the viewer.

An identical argument is applied in the case of low temporal visibility coherence. Reprojective methods such as sample reprojection and the method of primitive reprojection described in the copending application undergo performance degradation when temporal visibility coherence is low (the rate of newly visible or newly invisible primitives is high). Low temporal visibility coherence reduces the spatial resolvability of the image stream by producing newly exposed elements at a high rate. Once again, in the present method the performance degradation that tends to accompany low temporal visibility coherence is manifest as a low resolution during a period of low visual resolvability thereby being relatively unnoticeable to the viewer.

While the spatial sampling frequency in regions of the image stream having low temporal image coherence or low temporal visibility coherence can be reduced, the temporal sampling frequency cannot necessarily be decreased without producing visible consequences. In fact the critical temporal sampling frequency for the perception of smooth motion is actually proportional to the retinal velocity of the sampled image region. This performance characteristic of human vision indicates that temporal sampling frequency (e.g. overall frame rate, or individual element sampling rate) should be maintained or even increased to some degree under conditions of low temporal image coherence (which tends to produce relatively high retinal image velocities for untracked image regions).

In the present method a progressively stratified sampling is employed which allows temporal sampling frequency to be maintained at the expense of spatial sampling frequency. Additionally the CTSF is determined locally and used to decide a balance between frame rate and resolution that is perceptually optimal for any system load.

In the present method, individual graphic elements (e.g., samples or primitives) are sampled with a specific temporal frequency that reflects the CTSF of the element. When applied to reprojective image generation the frequency at which reprojected elements are transformed and displayed is selected to be in some predetermined proportion to the CTSF for the reprojected elements. The CTSF for an element (or group of elements with similar estimated retinal velocities) is estimated using the equivalent of equation 8:

$$CTSF = f_{min} + k_{max}(r), \quad \text{(equation 8)}$$

where CTSF is the critical temporal sampling frequency for the perception of continuous motion, $f_{min}$ is the lowerbound on temporal sensitivity, $k_{max}$ is a constant reflecting the upperbound on spatial sensitivity, and r is the measured or estimated retinal velocity of the element.

In the present method the maximal retinal velocity of individual graphic elements is determined by the previously described techniques. For example, in an implementation based on sample reprojection in which samples are the graphic elements that undergo transformation and display, the image-space velocity and acceleration of the sample is determined using data equivalent to the xi, yi, vxi, vyi, "xi_last", "yi_last" "vxi_last", "vyi_last", and "lasttime" fields of the C language data structure "sample" shown in FIG. 12. This data includes the sample's position and velocity for the current and previous sampling. From this data the image space acceleration can be estimated (as the difference between the two consecutive velocities over the time step determined by subtracting "lasttime" from current time). For implementations employing primitives as the graphic elements the maximum velocity of the primitive vertices is determined using the corresponding data fields equivalent to the C language data structure. If eye tracking is employed the retinal velocity of the graphic element is determined from the relative velocity of the viewer's point-of-regard and the image-space velocity of the graphic element. In any case the determined retinal velocity is used in a relationship equivalent to equation 8 to compute the perceptually optimal temporal update rate for the graphic element.

Conventional image generation systems generally sample all graphic elements (e.g. primitives) at the same sampling frequency which is the frame rate. Similarly, conventional image generation systems sample all graphic elements (e.g. primitives) at the same spatial sampling frequency which is the resolution of the image. In contrast, the present method of spatio-temporal sampling requires graphic elements to be sampled with a resolution and temporal update rate that may be independently determined for each element. This is achieved in accordance with the present invention by employing implementation architectures that support both variable resolution rendering and independent temporal sampling rates for individual graphic elements. The latter technique of transforming and displaying (e.g. rasterizing primitives) graphic elements at different temporal rates is accomplished in the present invention by employing an augmented, multilevel depth buffer in which information is retained between consecutive temporal sampling periods.

The method of transforming and rasterizing primitives at different temporal sampling frequencies is generally not possible employing a conventional single-level depth buffer which does not preserve information between frames. In a conventional depth buffer only the visible (closest) samples are retained. One approach to sampling primitives at a higher temporal sampling rate than the other primitives of the database is to rasterize the more frequently sampled primitives into a separate depth buffer that is composited with a first depth buffer for the less frequently sampled primitives. In this method the more rapidly updated depth buffer is, in the conventional fashion, cleared before rasterization. This compositing approach would require that the number of separately cleared and rasterized buffers equals the number of different temporal sampling frequencies employed. Additionally the cost of the composition is the same as that required to composite two complete images if the location of the primitives is otherwise not available.

The present method of updating graphic elements as a function of their measured or estimated retinal velocity could also be applied to graphics architectures in which entire objects are rasterized separately and composited. The Talisman™ architectural specification (Torborg (1996)) is one such architecture. In the description of the Talisman specification the authors cite as an advantage the ability to update object's at different rates. They suggest that "distant" objects could by updated at a lower rate. The present method of selecting temporal sampling frequency to be in some proportion to the measured or estimated retinal velocity of the object, reflecting the object's CTSF, provides a technique for controlling the update rate of an object that makes efficient use of compute resources and optimizes the appearance of smooth motion. While the present method can be applied to control the update rate of entire objects, it is most effectively applied to control the update rate of individual graphic elements such as primitives or samples. This approach gives a finer level of granularity and control over the spatio-temporal structure of the resulting image stream, thereby providing a better match to the spatio-temporal limits of the visual system.

In the method of primitive reprojection described in detail in the copending application, primitives are the basic graphic elements that undergo reprojection. Application of the present method to primitive reprojection employs a multi-level depth buffer technique described in the copending application. Two related techniques that allow primitives to be transformed and rasterized at different temporal sampling frequencies are described. In both techniques primitives are transformed and rasterized into the buffer in such a way that the samples written to the buffer during the rasterization contain data indicating the specific sampling period in which the samples are generated. The depth buffer is augmented to accommodate the storage of the write time for each sample written to the buffer. This is shown as the field "time" in the equivalent C data structure in Table 3.

A second version of this technique is used if the rapidly updated objects are classified as occluding (in which case they effectively obscured underlying samples in the buffer). In this second technique the regions identified above as consisting of obsolete samples from rapidly updated objects are considered emergence regions and visibility search (e.g. by ray casting) is performed to identify the newly visible primitives.

These methods allow the effect of rapidly updated primitives on a depth buffer containing non-updated primitives to be determined by an efficient differencing process. If the number of rapidly updated primitives is greater than the non-updated primitives then it becomes more efficient to determine the effect of non-updated primitives on a depth buffer containing largely rapidly updated primitives. In this case the alternate temporal subbuffer is employed and all primitives are rasterized to the sub-buffer. In this case rapidly updated primitives are transformed before rasteriza-

TABLE 3

```
struct sample_buffer_sample       /* Elements of augmented depth buffer*/
       {
       int element_ID;             /* e.g. Index of source primitive in local display list */
       float z;                    /* Depth value of sample */
       char object_class;          /* Source object & other information- */
                                   /* 0 == None_Deeper, 1 == OcOc, 2 == NoOc,- */
                                   /* 3 == OcNo, 4 == NoNo, 5 == OCCLUDED, -*/
                                   /* 6 == INVALID, 7 == LOD       - */
       char moving_or_not;         /* O==Source object static, 1==Moving */
       int time;                          /* time, sampling period when sample written*/
       };
struct sample_buffer_element /* Elements in multilevel depth buffer*/
       {
       /* Temporal sample A */
       /* Depth sorted samples with maximum of 5 levels */
       struct sample_buffer_sample A[5];
       /* Temporal sample B */
       /* Depth sorted samples with maximum of 5 levels */
       struct sample_buffer_sample B[5];
       };
/* Multilevel Depth Buffer
struct sample_buffer element Depth_Buffer[Xi] [Yi];
```

In these techniques the rapidly updated primitives are transformed and rasterized into the "current" temporal subbuffer of the temporally buffered multilevel depth buffer and the sampling time is indicated for each sample in the buffer. During this rasterization all samples that are more distant are overwritten. Additionally, earlier samples at the same depth of the samples generated by rasterization are overwritten if the overwriting sample belongs to the same primitive or convex object.

Following the rasterization of all rapidly updated primitives, a search is conducted in the multilevel depth buffer to identify samples having two properties: 1) sample was generated from rasterization of a primitive belonging to the set of rapidly updated primitives, 2) valid sample in the current buffer that was actually generated by rasterization conducted in an earlier temporal sampling period (as determined, for example, by the "lasttime" field in the C data_structure "sample_buffer_sample). Samples having these properties are samples representing the emergence region produced by the rapidly updated primitives.

In one version of the technique, primitives that are sampled at a high temporal frequency are classified as non-occluding and therefore do not obscure other primitives deeper in the multilevel depth buffer. In this case the emergence regions for rapidly sampled primitives, as identified by the foregoing procedure, are processed by removing the obsolete samples to expose the underlying samples.

tion while less rapidly updated primitives may not be transformed before rasterization. In this case the cost savings is only that of not transforming the less rapidly updated primitives. In the preceding case the cost savings is that of not transforming or rasterizing non-updated primitives; while the additional cost is that of identifying the emergence regions produced by the more rapidly updated primitives. In the present method both approaches are employed depending on the relative number of rapidly updating and less rapidly updating primitives.

The foregoing methods of employing a temporally distributed depth buffer can also be applied during image generation by sample reprojection which is discussed in a later section of this specification.

The present method therefore modulates the temporal sampling frequency for a graphic element to reflect the CTSF for the element. Additionally, the method modulates the display resolution of graphic elements or image regions to be in some inverse proportion to the estimated (or measured) retinal velocity of the image region in a manner that reflects the resolvablity of image regions in motion on the retina. The combination of these two techniques results in an image stream having a spatio-temporal structure that is substantially within the "window-of-visibility" for the human visual system.

Under some conditions, image elements under motion on the retina will result in the perception of a blur. Blur is a subtle perceptual phenomena that results when events viewed by the visual system create a retinal image velocity that exceeds the limits of temporal integration for the visual system. Blur can be employed to decrease the temporal aliasing phenomena that results when a limited temporal sampling frequency causes regions of the image stream to be displayed with a frequency lower than the CTSF for the elements in the region. In the present method, blur is computed by averaging earlier representations of a graphic element with the current representation. In the case where primitives are the graphic elements, earlier transformation states of the primitive can be used to allow rasterization of a temporally distributed primitive. The case where samples are the actual transformed graphic elements (i.e., the method of real-time sample reprojection described below) allows for a particularly efficient method of computing an approximation to motion blur.

In this method the actual image color space values (e.g. A, C1, C2) are retained from earlier sampling and are averaged using a weighing scheme that gives more importance to the most recent samples. This technique produces a method of decreasing temporal sampling frequency below the CTSF without causing discrete temporal aliasing. This temporally distributed approach to sampling may or may not incorporate a pseudorandom weighing of the type described by Cook et al. [U.S. Pat. No. 5,239,624].

As previously indicated, some of the present methods of perception-based spatio-temporal sampling can be applied to conventional image generation systems based on an object-order rasterization pipeline. Preferred implementation systems for these methods, however, should support adaptive sampling, multiresolution techniques, and temporally distributed depth buffering. Typical rasterization pipeline systems generally do not have these capabilities. The method of primitive reprojection described in the copending application is based on a general-purpose multiprocessor architecture that allows implementation of these special sampling and buffering techniques. Additionally, a multiprocessor architecture implementing real-time sample reprojection in which samples, not primitives, are the reprojected elements is presented in this specification. This system shares many of the techniques for efficient reprojective image generation that are specified in the copending application and is especially well suited to implement the present perception-based sampling and dynamic load balancing methods.

Implementation Based on Real-Time Sample Reprojection

The method of real-time sample reprojection and related multiprocessor system is now described. Primitive reprojection is a prior art method that is due to Badt, Fu, Adelson, Hodges and others and is reviewed extensively in the copending application. To date, no real-time implementation of sample reprojection employing identification of exposure regions has been developed. Image-based rendering methods (e.g. Chen et al) employ approximations of sample reprojection but do not allow the identification of newly exposed samples except in highly restricted cases (e.g., view direction vector rotation about the viewpoint such as in QuickTimeVR and Plenoptic rendering methods). The methods of the present invention, which allow reduced spatial and temporal sampling in poorly visible regions of the image stream, substantially reduce the cost of sample reprojection which facilitates the general-purpose real-time multiprocessor implementation specified herein.

Figure 17:
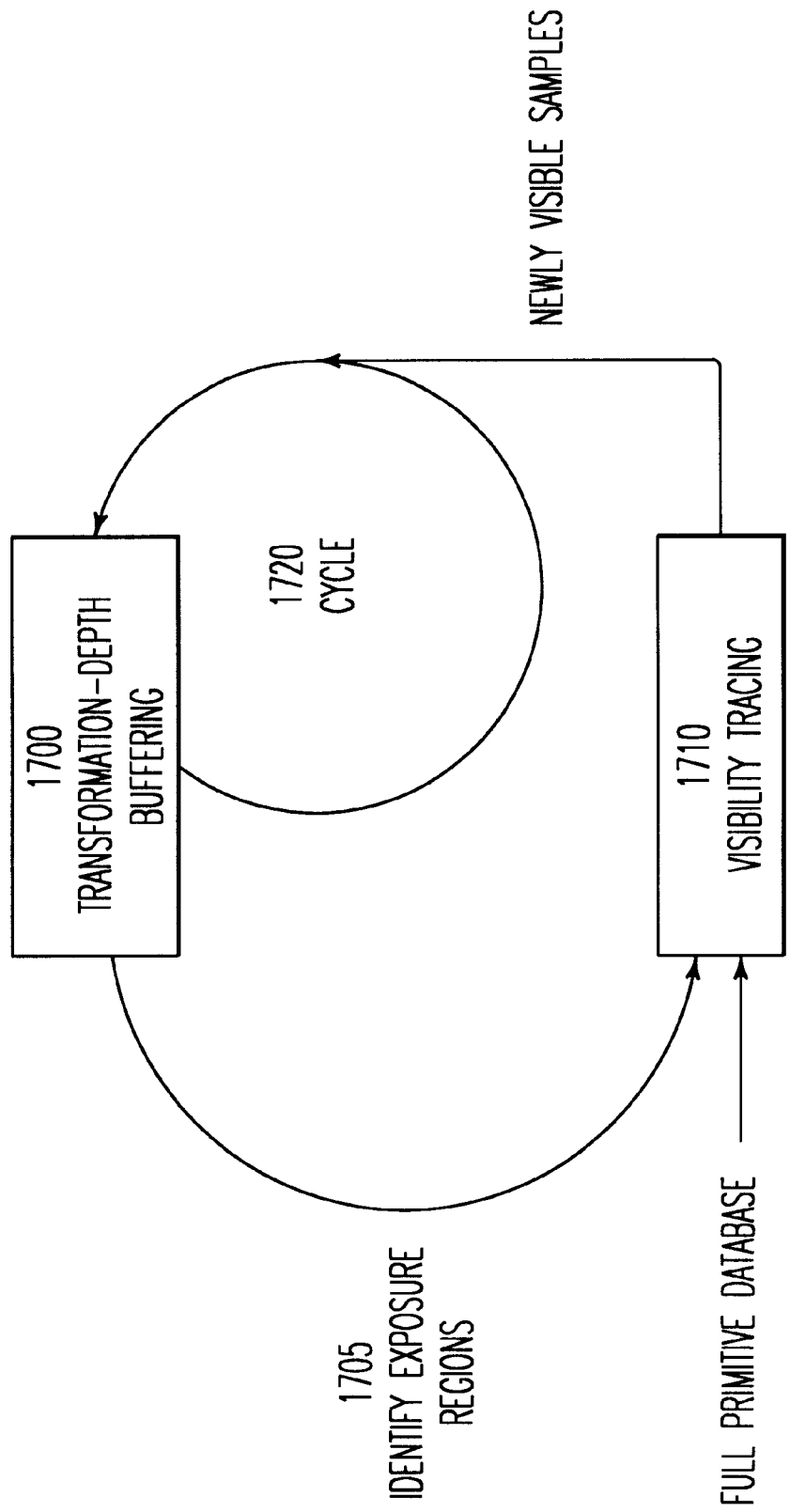
FIG. 17 is a flow diagram of a sample reprojection cycle for the uniprocessor of FIG. 11.

FIG. 17 shows the sample reprojection cycle for the uniprocessor of FIG. 11, and the depicted cycle includes a transformation and depth buffering step 1700, a step 1705 in which regions of the image containing potentially newly exposed samples are identified, and a visibility tracing step 1710. In the visibility tracing step 1710, a demand-driven, depth-prioritized sampling method of visible surface determination is conducted in the exposure regions identified by step 1705. Exposure regions are detected as actual "holes" in the depth buffer or as specific view volume incursion regions produced by view frustrum transformation. Specific methods for locating view volume incursion regions by consecutive view frustrum differencing are described in the copending application. As pointed out by Fu et. al. (Computers and Graphics Vol. 20. No. 2, pp.223–229, 1996, Elsevier Science Ltd. ) holes may be due to exposure or expansion. Expansion-type holes are identified by the method of Fu wherein holes surrounded by samples from the same convex primitive are considered to be potential exposure holes. In the present method such holes are filled by interpolation of the primitive if the expansion gap is less than a predetermined object space extent. Various methods of visibility tracing other than ray casting can be employed. As defined by Glassner (1995), visibility tracing is a general form of ray tracing in which cones, beams, rays, pencils or other structures may be employed in place of rays. In the present implementation ray casting (tracing of viewpoint to image rays) using a spatially subdivided database is employed as a demand-driven, depth-prioritized, method of generating new samples in the exposure region. This process is conducted using an adaptive sampling employing the perception-based refinement methods of the present invention. The samples so generated by step 1710 are added to the sample display list and are effectively injected into the reprojection-buffering cycle of 1720.

In depth buffering of step 1700 the method overwrites occluded samples. Samples overwritten by occluding samples are removed from the sample reprojection list. The cycle shown as 1720 indicates that the samples in the display list are repeatedly transformed and depth buffered until they become invisible because of occlusion by occluding samples or they fail to reproject into the viewport.

For the present invention the step 1700 and the cycle 1720 are performed only for samples known to be visible in a previous frame of an image sequence plus those that become newly visible during the current frame. By substantially limiting processing to only visible graphic elements (samples) and employing a demand-driven, front-to-back visible surface determination method to specific exposure regions, the performance of the present method is less dependant on database size or scene depth complexity than conventional object order transformation-rasterization pipelines.

Figure 18A:
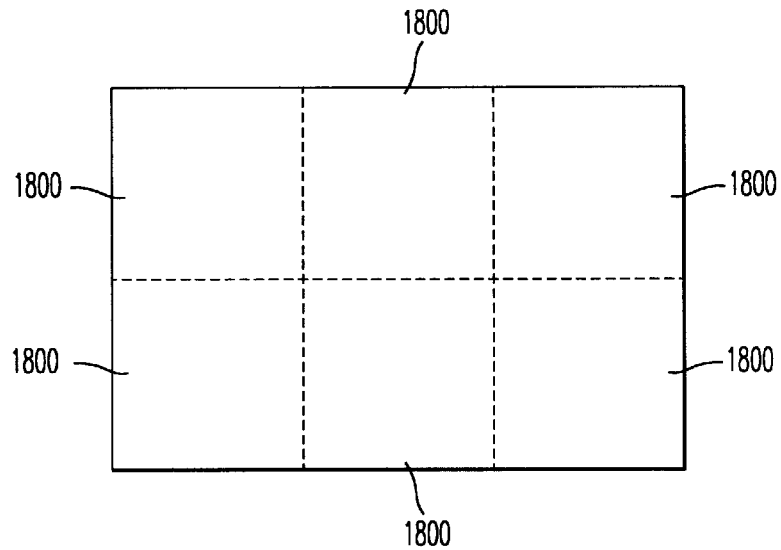
FIG. 18A is view of an image that has been divided into sub-images, each sub-image being handled by one of the sub-image processors.
Figure 18B:
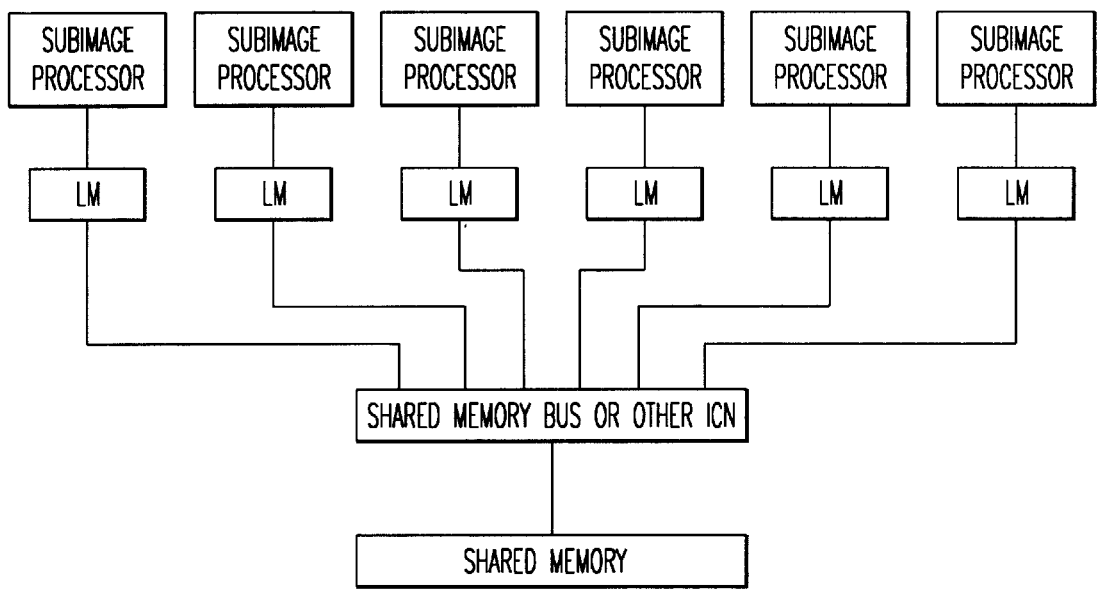
FIG. 18B is a schematic illustration of a multi-processor computer system for implementing a system and related method according to the present invention based on the partitioning of FIG. 18A.

The present specification describes a number of efficient image-parallel multiprocessor implementations of the method which exploit temporal image coherence to actively produce a temporal locality of data reference that results in efficient performance for cached and or NUMA architectures. FIG. 18B illustrates a shared memory multiprocessor implementation in which the interconnection network may be bus or crossbar switch based. Shared memory may be centralized UMA or distributed NUMA. In the preferred embodiment the memory interconnect (ICN) is a scalable crossbar based interconnection fabric employing a scalable, directory-based cache coherency protocol such as Scalable Coherent Interface (SCI). In this implementation each subimage processor is assigned to generate the image information for one or more subimages shown as 1800 in FIG. 18A.

Figure 19:
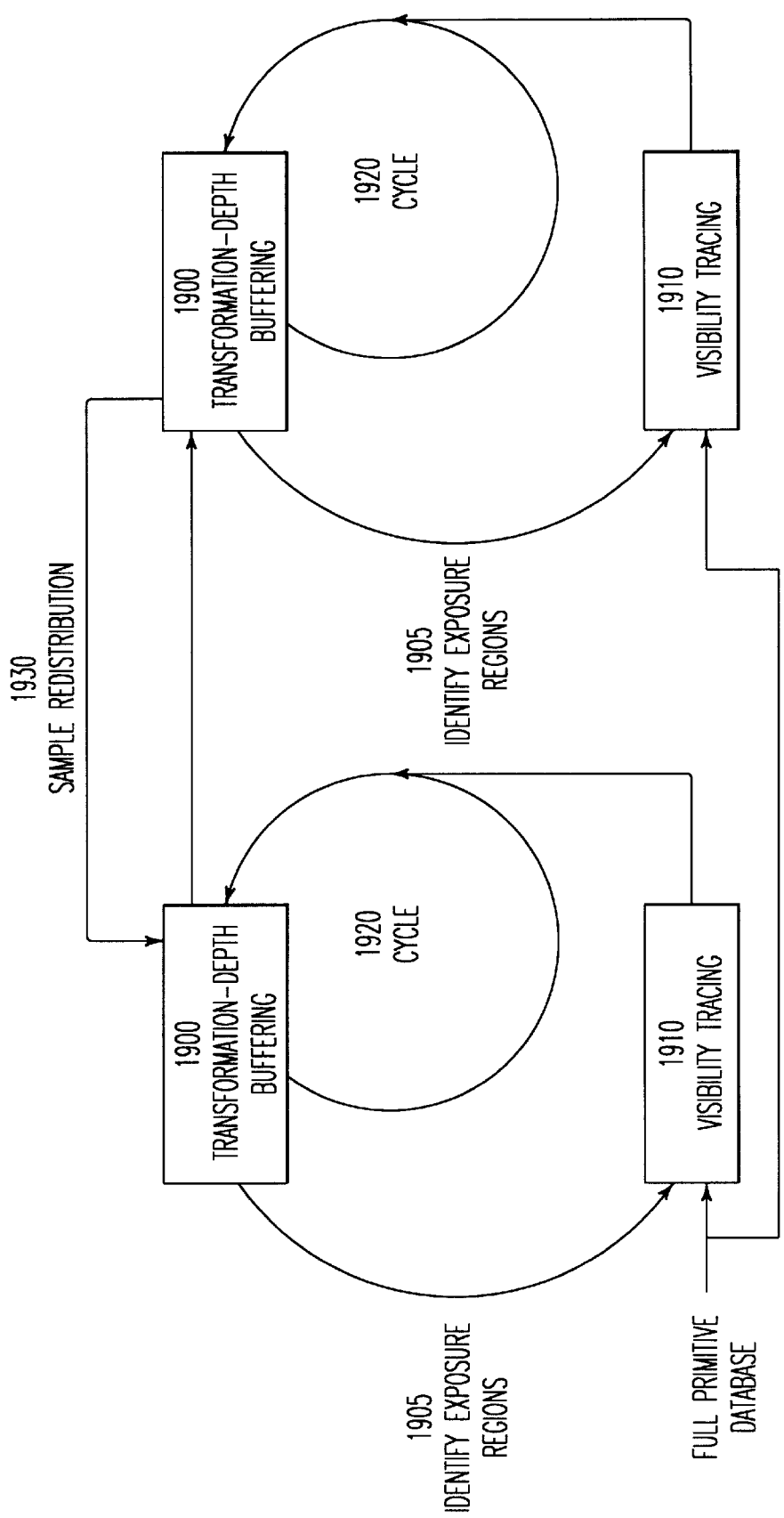
FIG. 19 is a flow diagram for parallel sample reprojection cycles for the multi-processor of FIG. 18B.

FIG. 19 is a schematic representation of the sample reprojection cycle in such a parallel implementation. In addition to the transformation-depth buffering steps 1900, identification of exposure regions in step 1905, and visibility tracing steps 1910, there is a reprojective redistribution process 1930 in which visible samples on local subimage display lists undergo reprojective redistribution between subimage processors. Redistribution between subimage processors is determined by classifying each sample with respect to its originating and neighboring subimages using known simple viewport clipping methods for point samples.

Figure 20:
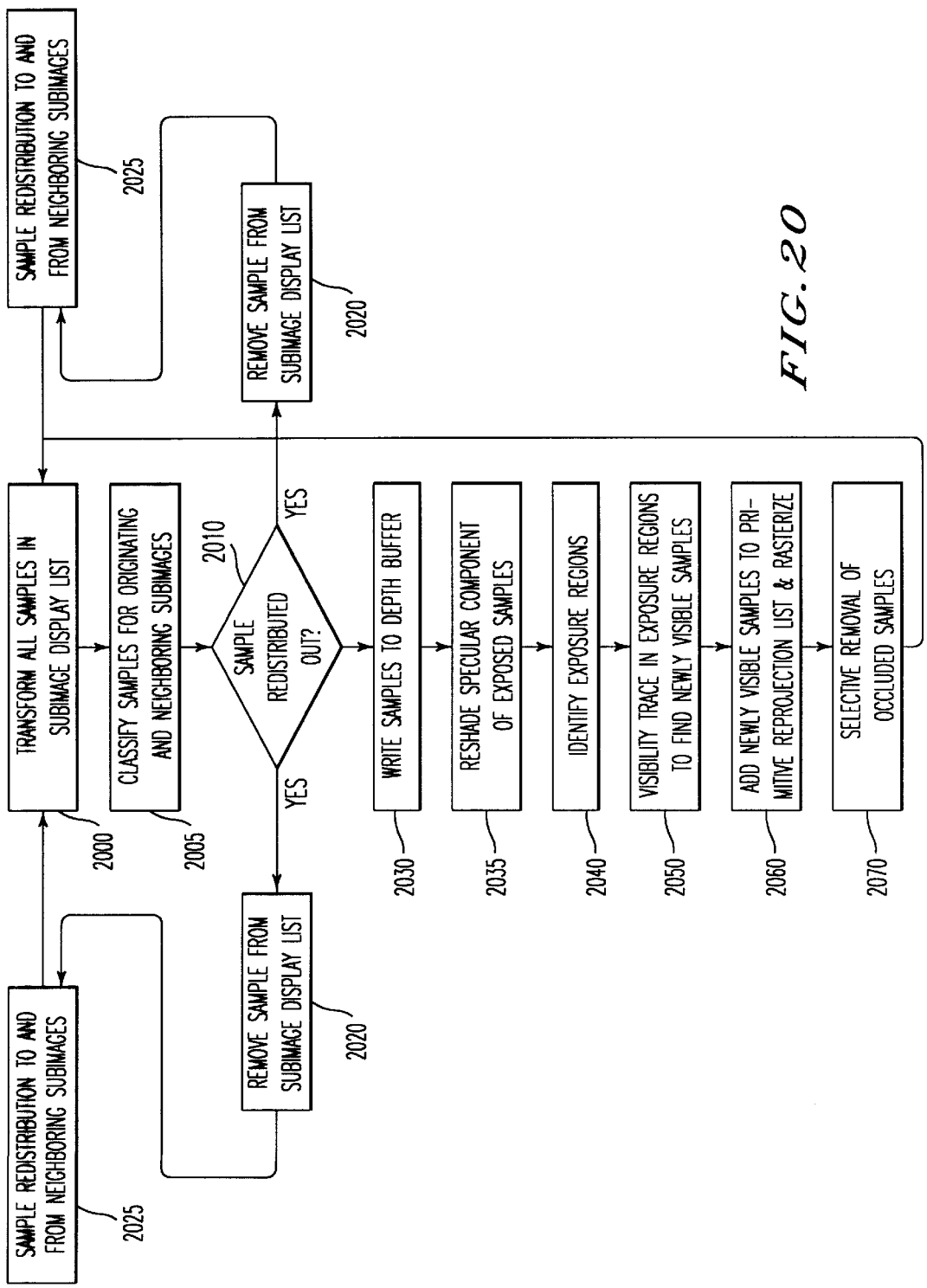
FIG. 20 is an alternate representation of a flow diagram of the sample reprojection cycle for the multi-processor of FIG. 18B.

FIG. 20 illustrates a more detailed flowchart for the parallel implementation of the sample reprojection cycle schematically illustrated in FIG. 19. This flow chart illustrates the complete process as executed by a single subimage processor with reprojective redistribution 2025 to and from other subimage processors.

Specifically, FIG. 20 shows a complete sample reprojection cycle and starts at the transformation step 2000 in which each sample on the local display list is transformed using the concatenated transformation matrix describing object and camera motion. Control then proceeds to step 2005 which classifies to which sub-images each sample belongs. Using this classification, step 2010 determines if the sample needs to be redistributed to other processors rendering other sub-images. If check of step 2010 determines redistribution is needed, control passes to step 2020 which removes the sample from the local display list and step 2025 which copies the corresponding sample to other processors rendering subimages. (Step 2025 is depicted as being on both sides of step 2000 in order to signify that the sample can be passed in any direction.) If the sample is not redistributed out it is passed to step 2030. Step 2030 is the process of writing the sample to the depth buffer. This writing process incorporates the previously described "spot size" of the sample to determine the number of depth buffer elements occupied by the sample. On completion of step 2030 for all previously unoccluded samples control shifts to step 2035 in which the specular component of only exposed samples is recomputed. This information is maintained as separate from the diffuse component of the samples shading value because the diffuse component (including texture value) does not change between frames if the relative position of the source object and light sources is constant. When all samples in the subimage display list have been rasterized control passes to step 2040 which locates all exposure regions left in the depth buffer by the reprojection of samples and the motion of the view frustrum. In contrast to previous methods of sample reprojection the present method employs a technique of specifically identifying view volume incursion regions which potentially contain newly visible elements that have penetrated the view volume. This technique employs a view frustrum differencing method and is described completely in the copending application. Also in step 2040 expansion holes are identified and filled by interpolation between samples from the same primitive which bound the hole using the approach of Fu et. al. Once expansion holes are filled only true exposure regions remain as "holes" in the buffer. These exposure regions include emergence regions caused by uncovering of a previously occluded surface and view volume incursion regions which potentially contain newly visible surfaces due to penetration of the view volume. As mentioned the location of view volume incursion regions uses a frustrum differencing technique described in detail in the copending application. Once all of these exposure regions have been located control proceeds to step 2050 which performs visibility tracing in the exposure regions located in step 2040 to generate newly visible samples. Afterwards, step 2060 adds the newly visible samples to the local primitive reprojection list and writes the newly visible samples to the depth buffer. The synthesis of the subimage data is complete on termination of step 2060 and the subimage image information can be displayed any time after step 2060. Finally, in step 2070, occluded samples are removed from the local display list. In the present method occluded samples are determined by a read of the depth buffer following write of all visible samples to identify those samples in non-occluded levels of an augmented depth buffer.

Although it is possible to use a uniprocessor embodiment of the present invention, the present method is ideally suited to image-parallel implementations on multiprocessor systems employing cached shared memory architectures. The natural temporal coherence of the image stream limits the rate of sample redistribution and creates a corresponding temporal locality of data reference that reduces the demand on the shared memory interconnect. Likewise the temporal coherence of the image stream limits the motion of exposure and incursion regions and thereby creates a corresponding temporal locality of data reference for ray casting. This temporal data coherence is enhanced for both processes by the method's dynamic load balancing strategies in which sub-image windows are caused to substantially track local optical flow. These dynamic load balancing techniques are specified in the copending application. In addition a method of dynamic load balancing based on a retinotopic mapping of subimage processors to visual-field regions (specified later in this disclosure) also enhances the temporal locality of data reference for multiprocessor implementations of sample reprojection. In light of the relatively low communication cost of the method, the method can be implemented on general purpose cached central shared-memory or distributed shared-memory multiprocessor architectures. In such parallel implementations the architecture is effectively image-parallel wherein each processor completely renders an assigned sub-image 1800, as shown in FIG. 18A. In the parallel architecture shown in FIG. 18B, sub-image processors are assigned to one or more rectangular sub-image windows which comprise a tiling of the image viewport. Sub-image sample display lists representing the visible subimage in each sub-image are initially determined by classifying each primitive in the database to the sub-images 1800, rasterizing to a depth buffer and retaining unoccluded samples. Alternatively the initial redistribution of primitives can be effected by the adaptive visibility tracing (e.g., ray casting) search strategy. In light of the newly available Non-Uniform Memory Access (NUMA) machines that implement Distributed Shared Memory using the Scalable Coherent Interface (SCI), a NUMA SCI-based DSM configuration is the preferred embodiment for a parallel implementation of primitive reprojection according to the present invention. The IEEE Standard for Scalable Coherent Interface (SCI) is IEEE Std 1596–1992 and is incorporated herein by reference. Alternate embodiments include a centralized memory shared memory multi-processor (SMMP) that is bus-based; however, such an architecture does not scale as well as the DSM, SCI implementation. In addition, a pipelined implementation using either hybrid message passing or shared memory is also possible.

Figure 21:
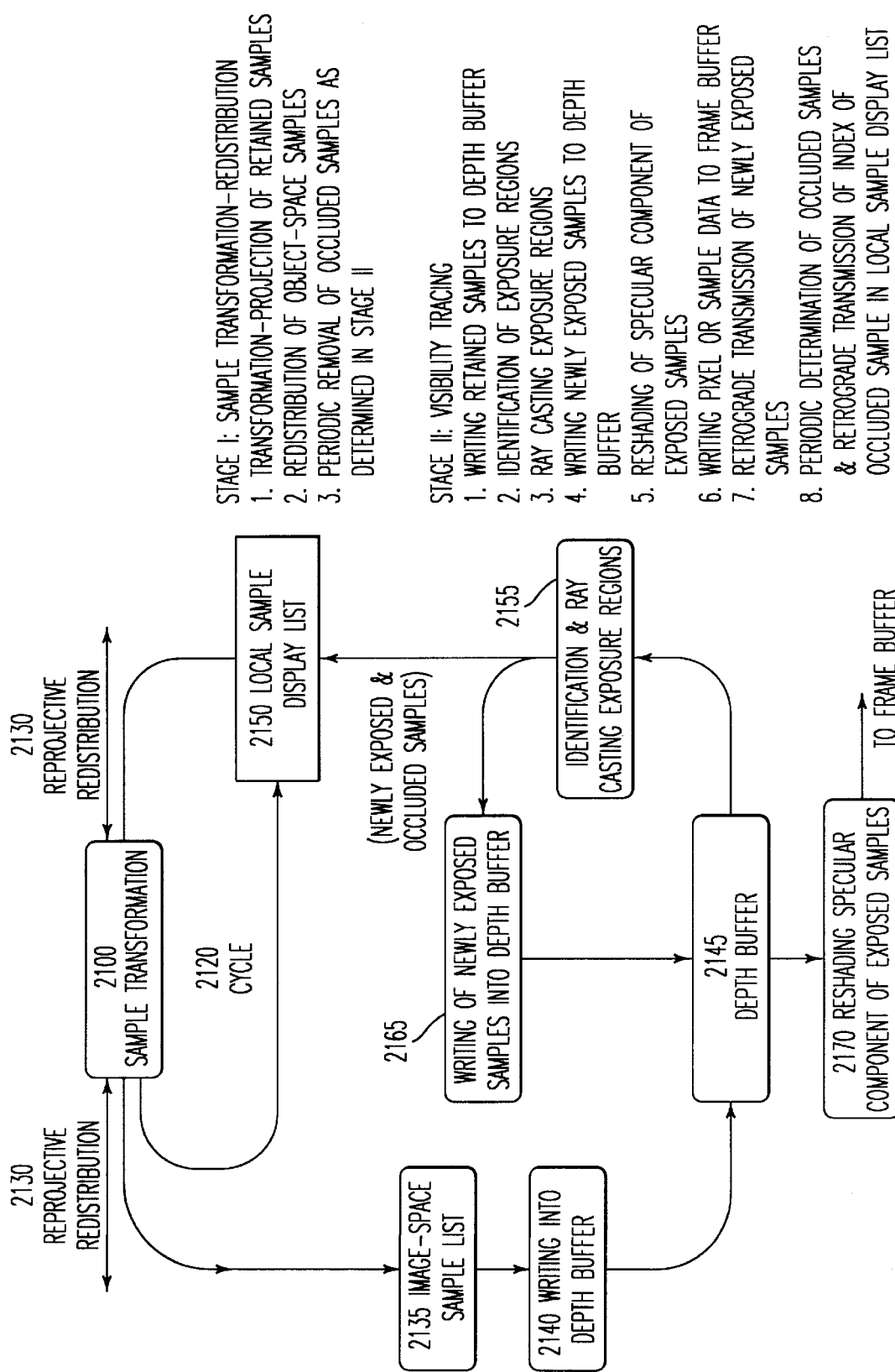
FIG. 21 is a flow diagram showing one embodiment of how the sample reprojection and visibility tracing are split into two stages.

FIG. 21 is a schematic representation of one embodiment in which the processes of sample transformation and ray casting are performed in two separate pipeline stages. In the first stage, samples in local sample display lists (e.g., 2150) are transformed and converted into image-space representations in the process represented as step 2100 in FIG. 21. Object-space samples are redistributed among stage I sub-image geometry processors in steps 2130.

These transformed image-space samples are passed to a second stage where they undergo writing to a depth buffer in step 2140. Each image-space sample transmitted to stage II is transmitted along with its corresponding index location in the first-stage local sample display list, 2150. Samples transmitted to stage II from stage I processors are stored in an image-space sample list, 2135. Following depth-buffered writing of all samples, the subimage depth buffer, 2145, is processed in step 2155 to identify exposure regions by the methods previously described. Subsequently ray casting or beam casting is performed in these exposure regions, also shown as part of step 2155, in the second stage to effect the generation of newly exposed samples. This process identifies newly exposed samples which are written to the depth buffer (2145) in step 2165. Following the writing of these newly exposed samples to the depth buffer the specular component of the exposed samples in the buffer is recomputed in step 2170. This is necessary because unlike the diffuse shading component the specular shading component changes with any change in viewpoint or view direction vector. By deferring the computation of the specular shading components until after the depth buffering process, only exposed samples need to be reshaded. Alternatively, the reshading could be computed in stage I following the transformation-redistribution step 2100. This organization of the processes is equivalent to transposing step 2030 and step 2035 in FIG. 20, moving the reshading step into stage I. Although this is less efficient, since shading is not deferred, it does unload the stage II processor somewhat and is employed if the stage II processor is otherwise overloaded. Newly exposed samples identified by the ray casting step are passed in a retrograde fashion in object-space form to the corresponding stage I processor to be added to the local sample reprojection list, 2150. An additional step is periodically conducted in stage II following step 2165. This step is the previously described read of the depth buffer, here 2145, to identify occluded samples. This step employs the data structures of 2145 and 2135 which is the local image-space sample list. In this process samples in 2135 that are not represented by any samples in non-occluded layers of the buffer are considered to be newly occluded for the subimage. The index of these samples in stage I (which were transmitted to stage II along with each sample) are transmitted in a retrograde fashion to stage I where the corresponding samples are removed from 2150.

Figure 22:
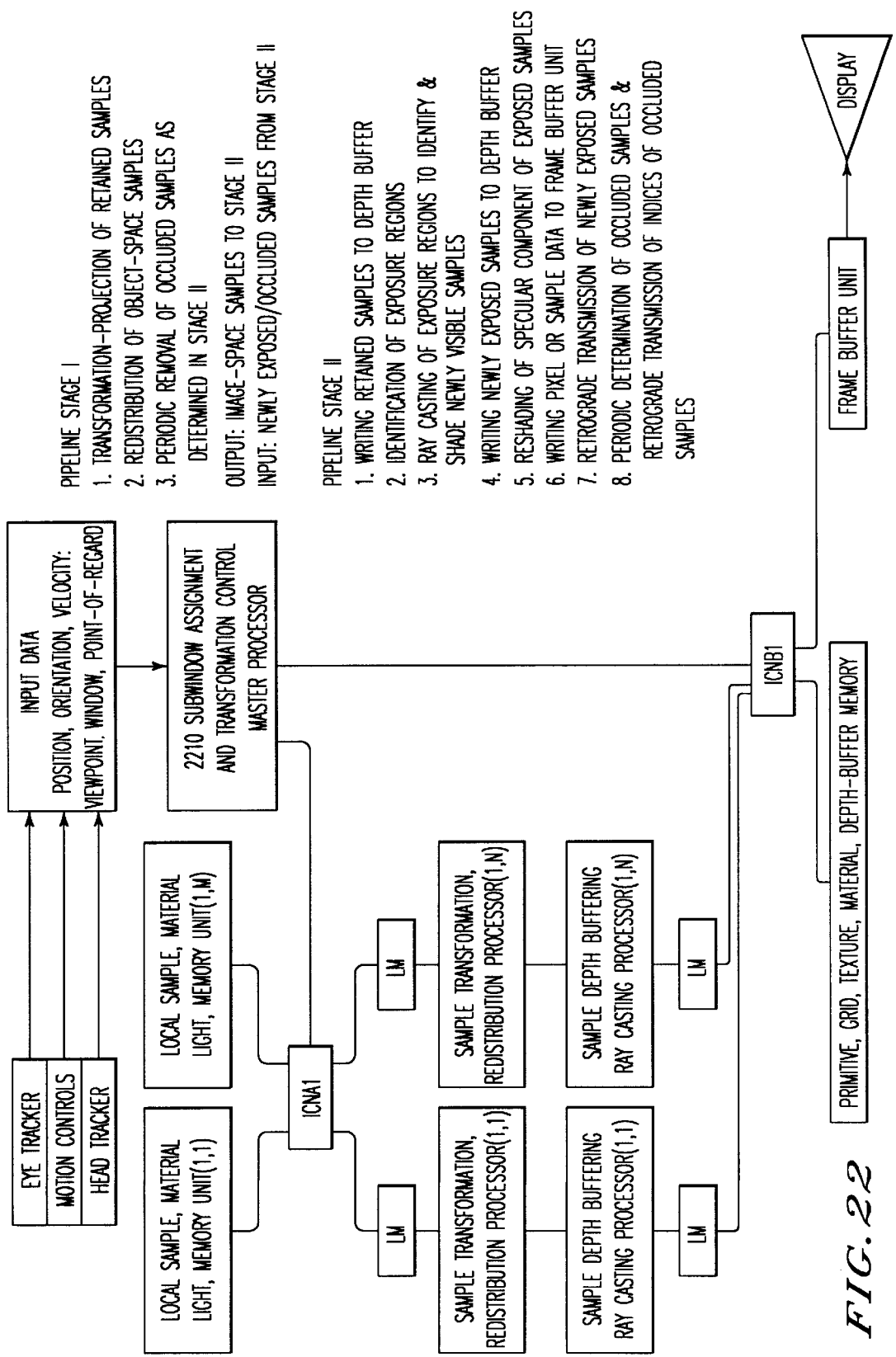
FIG. 22 is a block diagram showing an embodiment of a pipelined-parallel multi-processor system according to the present invention.

The above two stage primitive reprojection cycle of FIG. 21 is implemented according to one embodiment of the present invention as shown in FIG. 22. The two stage cycle is implemented using a two stage pipeline with separate interconnection networks subserving sample redistribution in one stage and rasterization—ray casting in a second stage. In common to both pipeline stages are data converted by sampling external sources, e.g. eyetracker, motion controls, and a head tracker. The data is applied to a subwindow assignment and transformation control master processor, 2210. In addition, a first interconnection ICNA1 provides for the distribution of local display list samples, material, and light parameters stored in a distributed set of shared memory units (1,1) through (1,N). In the first pipeline stage ICNA1 sends this data to local memories assigned to Sample Transformation and Redistribution Processors. Redistribution of local display list samples among stage I processors occurs through the first-stage ICNA1 interconnect.

With this local sample, material, and light data, the first pipeline stage performs the steps of 1)transformation of object-space samples (and optional reshading of specular component of samples if not performed in the second stage), 2) redistribution of object-space samples to other stage I processors, 3) periodic removal of occluded samples from local display list (based on information supplied from stage II) 4) outputting transformed, image-space samples, and 5) receiving newly visible samples from the second pipeline stage. After having received the results of the first pipeline stage, the second pipeline stage performs the following 8 steps: 1) writing samples received from stage I into a depth buffer for the subimage, 2) identification of exposure regions in the depth buffer (after interpolative filling of expansion holes), 3) ray casting of exposure regions in the depth buffer to create newly exposed samples, 4) writing newly exposed samples to depth buffer 5) reshading specular component of exposed samples (if not already performed in stage I), 6) writing pixel or sample data to frame buffer unit, 7) passing back newly exposed samples determined by ray casting to stage I processor, 8) periodic determination of occluded samples and passing back the indices of occluded samples as they occur in the Stage I display list. (The index location of each stage II sample in the corresponding stage I object-space display list was passed with the image-space representation of the sample from stage I). Data required for ray casting including primitive, spatial subdivision grid data is accessed using a second interconnection network ICNB1. This interconnection network is also used to supply material and texture data for shading of samples generated by ray casting and specular reshading of reprojected samples. Additionally, the frame buffer unit is written to using the second interconnection network.

In a two stage pipelined embodiment the connection between stage I and stage II processors is subserved by a dedicated, special communication channel between corresponding stage I and stage II subimage processors. The scheduling of interstage communication is simplified by the described sequencing of the sample reprojection cycle. This cycle results in specific communication phases in which, during a first phase, processed samples from stage I are communicated to stage II. In a second phase the same communication channel is later used to transmit newly visible (and newly occluded) sample information from stage II to stage I. The control of this communication employs a small subset of instructions and services specified by a known interprocessor communication protocol, MPI (message passing interface) implemented as extensions to the processor's instruction set or through auxiliary ASICs.

In one embodiment the second stage processors are connected by a high speed crossbar interconnection fabric (ICNB1) based on a distributed shared-memory SCI system for directory based cache coherency. This stage is a general purpose, high performance multiprocessor. In this example embodiment the first stage employs a bus-based interconnection between stage I processors (ICNA1) which are also general purpose microprocessors with instructions supporting fast geometric transformation of samples as well as a general instruction set and cache-coherency services. In this embodiment the first stage processors and associated bus effectively functions as an auxiliary graphics subsystem supporting transformation, and redistribution of (mostly) visible samples in the local display lists as well as specular reshading of samples if required. In this embodiment the first stage interconnect employs a less expensive, although somewhat less scalable, bus-based interconnect. This type of an interconnect is sufficient to support interprocessor communication within the first stage because non-local memory accesses incurred during sample redistribution are substantially limited by the natural temporal image coherence of the image stream (and further by the retinotopic load balancing techniques that are described below). This stage I subsystem is connected to the main multiprocessors of the second stage using the aforementioned interstage interconnections. In this embodiment the stage I subsystem serves effectively as an auxiliary sample reprojection graphics subsystem which augments a more general-purpose multiprocessor architecture of stage II. Overall this implementation is scalable graphics architecture in which the number of processors in the special-purpose graphics subsystem (stage I) are increased to reflect the number of general-purpose multiprocessors on the main interconnection fabric (stage II). In this embodiment the software implementation of the processes of sample reprojection and the supporting hardware are optimized for both real-time image generation and non-real-time image generation. When employed for non-real-time image synthesis, for example during rendering of high resolution, photorealistic images for film, the software processes include sophisticated shading, illumination, and antialiasing methods that may not be computed during performance of real-time image generation. Alternatively, these advanced rendering methods can be performed in real-time to produce a more limited resolution image suitable for real-time, photorealistic preview of computer animation. Because the graphics database is preprocessed using the technique of spatial subdivision into hierarchical grids which supports moving objects as separate grid structures (as described by Snyder J. M. et al. Proceedings ACM SIGGRAPH, Vol 21. No. 4, pg. 119–128,1987) included herein by reference; the present implementation allows interactive refinement of animation trajectories during the real-time rendering of an image sequence. Additionally the present method allows interactive manipulation of parameters such as lighting, material, and texture editing during the real-time rendering of an image sequence.

The visibility search techniques, exposure location methods, load balancing and other processes specified for the current invention are suitable to both real-time and non-real-time implementation. Consequently, unlike other dedicated real-time graphics systems, hardware embodiments of the present method can be employed to accelerate both real-time image generation and non-real-time photorealistic image synthesis.

In an alternative embodiment, actual ray tracing is performed in stage II for regions of the subimage depth buffer that require shadow determination, reflection, or refraction shading effects. This allows the incorporation of advanced shading and illumination effects that are difficult to achieve during rasterization. Although the present implementation employs busses as the interconnection network for stage I, alternative embodiments may employ crossbar or other types of interconnection networks for both stages.

The present system based on sample reprojection employs the object classification method described in the copending application to improve the accuracy and efficiency of reprojective image generation and to allow moving objects to be rendered. In this method objects with low dynamic occluding efficiency are classified as non-occluding and do not produce occlusion of other samples or primitives in a multilevel depth buffer which is used to determine occlusion of elements. This classification of samples from objects with low occluding efficiency as non-occluding reduces the size of exposure regions (which require ray casting) without substantially increasing the number of (unoccluded) samples in the sample display list. As discussed in the copending application, moving objects create special challenges for any reprojective method of image generation. The exposure of a moving object is not limited to exposure regions that can be defined by view volume incursion regions, occlusion transitions, or exposure holes. Therefore graphic elements belonging to moving objects must be managed with special techniques. The copending application specifies several methods for managing moving objects during reprojective image synthesis. In one technique graphic elements belonging to moving objects are classified as non-occluding and therefore are not removed from reprojection list because of being overwritten in a depth buffer. In a second technique the view volume incursion regions defined for static objects are extended to accommodate the identification of moving objects that penetrate the view volume. In a third technique graphic elements (e.g. primitives) belonging to moving objects are permanently retained in the display list and undergo transformation and potentially rasterization for each frame even if not in the view volume and even if totally occluded. These techniques, described in conjunction with primitive reprojection in the copending application, can also be applied to the present method of sample reprojection. In the latter technique in which primitives from moving objects are permanently retained, sample reprojection employs two types of graphic elements: 1) samples, generated by visibility tracing and reprojected with writing into a depth buffer, 2)primitives, permanently retained in a display list of primitives reprojected with rasterization to a depth buffer. In this case primitives undergo transformation, reprojective redistribution, and rasterization in the manner of a sort-first graphics architecture (cf Molnar). Moving objects can be rendered by the present system by maintaining display lists of primitives in the stage I subimage processors together with the display list of samples.

In accordance with the present invention, the methods of perception-based spatio-temporal sampling are applied in the context of the present system of sample reprojection during the initial generation of samples by ray casting. The perception-based spatio-temporal sampling techniques are also applied in the subsequent reprojection of samples to effect a resampling of previously sampled regions wherein the resampling reflects changes in the effective resolvability of previously generated samples.

A sample begins its lifetime in the unoccluded regions of the image stream when the sample is generated by spatial subdivision ray casting or other visible surface determination methods applied to the exposure regions defined at some specific time in the evolution of the image stream. The method of spatial subdivision ray casting is a known method of front-to-back, depth prioritized, visible surface determination employing a demand driven, data access approach (due to Fujimoto, Snyder, Barr and others) which is efficient at solving the visible surface determination problem for small, or irregular regions of an image. This makes it ideally suited to generate samples in exposure regions. Although the computational cost of ray casting is relatively high, its application to the present method is made feasible because the natural temporal visibility coherence of the image stream restricts the size of exposure regions and thereby limits the amount of ray casting required. The method accommodates the sampling of moving objects by including these as grids which are embedded in the fixed grids that spatially subdivide the space containing objects of the static environment. The copending application discusses the application of spatial subdivision ray casting to reprojective image synthesis including methods to limit the amount of ray casting required by effectively increasing the temporal visibility coherence of the unoccluded image stream by a multilevel depth buffer method in which poorly occluding elements are considered non-occluding. Additionally a variable level-ofdetail organization of the database and the auxiliary spatial subdivision data structures are described that reduce the amount of sampling needed to render distant or otherwise low level-of-detail representations. These methods, and others described in the copending application and in the prior art of spatial subdivision ray casting/ray tracing are also employed in the present method of sample reprojection.

If the ray casting is conducted adaptively, the method of employing perception-based refinement criteria to select local spatial sampling densities and level-of-detail representations is applied as described in conjunction with FIG. 9. The result of this process is to produce samples with associated data indicating the principle cause of each samples reduced resolvability. Several parameters affecting the newly generated sample's spatial and temporal resolvability are determined and stored with the sample during sample generation by ray casting. One parameter (e.g. "resolvabilityflag" bitflag field of C data structure "sample" in FIG. 12) encodes the specific spatio-temporal limit that resulted in low spatio-temporal resolvability of the sample. The value of this parameter is set during the steps equivalent to 990–997 in FIG. 9. Other stored parameters include the time when the sample was exposed (e.g. "exposure_time" field of C data structure "sample" in FIG. 12), image plane velocity components (e.g. "vxi", and "vyi" fields of C data structure "sample" in FIG. 12). Additionally, the resultant spatial density in the region of each sample is determined separately for the image-space xi, and yi dimensions and a metric in some inverse proportion to these spatial frequencies is stored with each newly generated sample equivalent to the "spotsize_x" and "spotsize_y" of the example C data structure shown in FIG. 12. The value of this spotsize is subsequently used to determine how a sample will be written to a sample buffer. Samples with a large spotsize written to several locations of the depth buffer while samples with a small spotsize are written to only one sample location in the depth buffer. Depth-buffer comparisons and image reconstruction are two processes that are simplified by duplicating sample values to reflect the spot size of the sample. This approach approximates the method of applying area-weighted coefficients during image reconstruction. Used in this way, the spotsize is a simple and efficient approach to implementing variable resolution depth buffering and image reconstruction/display.

The spatial and temporal resolvability of a sample may change during its lifetime in the image stream. These changes may be the result of changes in the exposure duration, estimated or measured retinal velocity, acceleration, and retinal location that occur during the evolution of the image stream. During subsequent reprojection of a sample, the sample's spot size is modified to reflect the current level of resolvability of the sample.

Changes in the spot size of a sample become manifest when the sample is written to the depth buffer. In this writing process, shown as steps 2140 and 2165 in FIG. 21, the number of sample locations filled by a sample (either newly generated or reprojected) is determined by the spot size of the sample. Changes in the spot size of a sample result in a resampling of the image in the region of the sample.

The spot size of a sample is decreased when the resolvability increases. Decreasing the spot size creates holes in the sample buffer after reprojection that require additional sampling to fill. These holes are detected during the process of identifying true exposure holes (expansion holes may be filled by interpolation) shown as part of step 2155 in FIG. 21. This results in a resampling of the region at a higher spatial density corresponding with the increased resolvability of the region.

Conversely an increase in the spot size of a sample is effected when the visible contrast structure in the region of the sample decreases. During writing of the sample to the buffer (e.g. as in step 2140) this produces an effective overwrite of surrounding samples in which the resultant sample value (e.g. AC1C2 shading components) substantially representing a weighted average of the subsumed samples using a predetermined filter. This approximates the effect of a wider reconstruction filter appropriate to the decreased resolution. The overwritten or subsumed samples in the region of decreased resolvability are removed from the sample display list. In the two stage pipeline implementation of FIG. 21 the process of overwriting subsumed samples occurs as part of step 2140. The newly subsumed samples are identified by reference to their location in the stage I object-space sample display list (2150). Removal of these samples from the sample display lists 2135 and 2150 occur through the reference to the samples index in the object-space display list (2150). The index of each sample in the object-space sample display list (2150) and the image-space sample display list (2135) are identical if the two arrays are structured to substantially mirror each other with respect to the order of active samples in the lists. Like the indices of occluded samples, the indices of samples eliminated by resampling at a lower resolution are passed to stage I where they are used to remove the sample from the stage I sample display list.

In the present two-stage pipelined implementation shown in FIG. 22 writing of samples to the depth buffer occurs in the stage II Sample Depth Buffering, Ray Casting Processor. The empty elements of the depth buffer, stored in the depth buffer memory connected to the stage II processor, are subsequently filled by ray casting image regions corresponding to these missing depth buffer elements. This amounts to a resampling of the region at a higher spatial density. Additional samples generated in this process are written to the depth buffer and transmitted in a retrograde fashion (similar to the process for newly exposed samples) to the corresponding stage I object-space sample display list.

The present system for real-time image generation employs shared-memory multiprocessor subsystems for which the natural temporal image coherence of the image stream, which limits the flow of samples on the image plane, produces a corresponding temporal locality of data reference for the subimage processors. This locality of reference is enhanced by application of the method of dynamic subimage processor assignment based on optical flow as specified in the copending application. This method causes subimage windows to substantially track optical flow on the image plane and thereby increase the average time that tracked graphic elements remain as local data to corresponding subimage processors, thereby reducing non-local memory accesses.

For implementations that employ real-time eye tracking, an alternative processor-to-subimage-to-image mapping may be employed that further improves the temporal locality of data reference. In this method subimage processors are assigned to generate image data that will be processed by specific parts of the viewer's retina. This retinotopic mapping of subimage processors to image regions is analogous to the visual system's retinotopic mapping between retinal receptors and higher levels of the visual cortex. This mapping reflects the higher density of receptors in the foveal region of the retina and results in a neural processing architecture in which large numbers of cortical processing elements (neurons) are assigned to the foveal region. This nonuniform mapping between the visual processing elements and the visual field is called cortical magnification.

Because the highest density of visual information comes from the fovea and because visual acuity is dependent on the relative stability of the retinal image, a principle goal of the oculomotor system is to relatively stabilize the foveal image. (Note that absolute stability is not the goal since the visual system may actually require very small motions on the retina in order to prevent a perceptual fade of the image. These motions are produced by small mircosaccades which are generally less than one minute of visual angle and are not tracked by the eye tracking systems used in the present method. The importance of these microsaccades to visual function is not completely clear and remains a matter of some controversy in the field of visual physiology).

Smooth pursuit and fixation are two strategies employed by the visual-oculomotor system to maintain relative stabilization of the foveal image. These mechanisms enhance visual performance by increasing the temporal coherence of image data being supplied to foveal photoreceptors and higher visual cortical elements subserving the foveal region of the visual field.

The present method of dynamic load balancing can be applied to all image-parallel image generation systems in which subimage processors accessed cached shared memory or in which a NUMA (non-uniform memory access) architecture is employed, and in which the visual point-of-regard is tracked in real-time. The method employs a retinotopic mapping of subimages to subimage processors that reflects the cortical magnification effect and that exploits the temporal image coherence of the foveal image that is produced by the viewer's natural eye movements.

In the application of this method to the present system of real-time image generation, a Subimage Assignment and Transformation Control Processor, shown as 2210 in FIG. 22, assigns a subimage-to-image mapping and a subimage processor-to-subimage mapping in which each subimage processor is assigned to a specific region of the viewer's visual field (corresponding to a specific region of the viewer's retina). The assignment dedicates a relatively disproportionate amount of the subimage processors to the small foveal regions. This assignment is made to reflect the acuity falloff function. Additional parameters affecting the subimage processor load balance, including the number of graphic elements in a subimage, the amount of visibility search required in a subimage, and the level of completion of earlier subimage processes, are all factors that are employed, in addition to the retinal location of a subimage, to provide an efficient load balance using known methods of task-adaptive load balancing.

Figure 23:
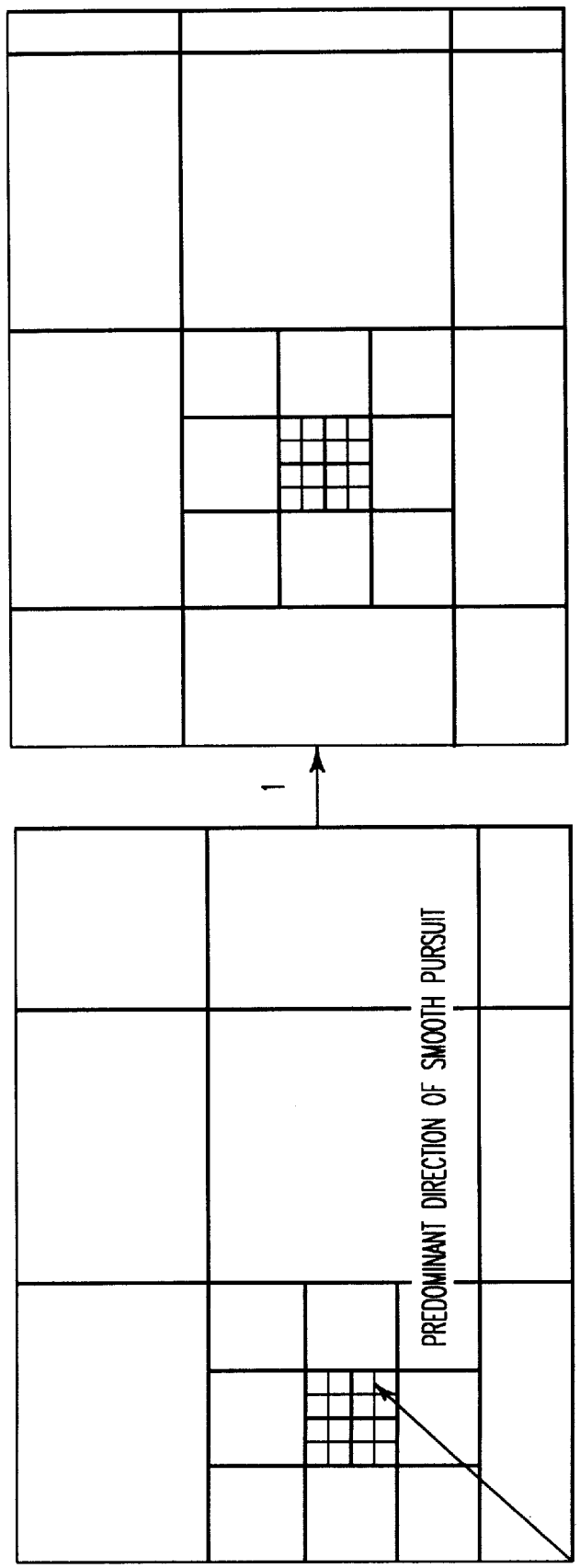
FIG. 23 illustrates the method of retinotopic subimage processor assignment that produces a spatio-temporal locality of data reference for the subimage processors that parallels the spatio-temporal locality of reference for the visual processing elements.

The retinotopic load balancing method is illustrated in FIG. 23. The subimages labeled a, b, c, d in FIG. 23A are subimages dedicated to the region of the viewer's visual field containing the point-of-regard. This region is subserved by photoreceptors in the foveal region of the viewer's retina. In FIG. 23B the viewer's point-of-regard is moved up and to the right on the image plane. The subimages a, b, c, d that are mapped to the fovea in the present method of retinotopic subimage mapping also are moved to substantially track the point-of-regard. In this way the position of foveal subimage windows are slaved to the viewer's eye movements.

This retinotopic load balancing strategy not only matches the resolution of the image to the acuity falloff function but also produces an image generation system which has dynamic performance characteristics that closely match the dynamic performance characteristics of the visual system. Dynamic visual performance (i.e., spatial resolving power) depends upon relative stabilization of the foveal image. The performance of the present image generation system also depends upon relative stabilization of foveal image elements (which, because of the acuity falloff function, comprise the majority of the image information) to produce a temporal locality of data reference for subimage processors. Because of this similarity the viewer's natural pattern of fixation and pursuit eye movements, designed to maintain stabilization of the retinal image, will tend to improve vision at the same time it improves image generation performance. Conversely, when these oculomotor strategies fail to maintain temporal coherence of the foveal image, the performance of the visual system and the performance of the image generation process will decrease together, making degradation in the performance of the image generation system relatively invisible. The aforementioned method of selecting image resolution as a function of retinal velocity of the image insures that the performance degradation of the two systems, vision and image generation, occur not only under the same conditions but in precisely the same way: with a decrease in resolvability/resolution as a result of retinal image motion.

Saccades are rapid, reorienting eye movements that disrupt the temporal coherence of the foveal image. During saccades vision is very poor. In fact, active suppressive mechanisms function during saccades which eliminate the perception of overall image motion blur that would otherwise be produced by rapid, unsuppressed motion of the foveal image. Using the present retinotopic load balancing method these same rapid eye movements will also disrupt the temporal data coherence for foveal subimage processors. The decrease in data coherence of the retina and higher visual cortex centers that occurs during these periods will make the performance degradation of the image generation process relatively invisible.

After a saccade is complete the viewer's point-of-regard may be on an entirely different part of the environment than before the saccade began. Following this retargeting the visual system requires more than 1000 ms to regain full acuity. This delay is a fundamental temporal limit of visual integration and is essentially identical to the phenomena of acuity increase with exposure time. The present method of retinotopic subimage processor assignment can exploit the relatively poor acuity immediately following a saccade to reorganize the image-to-processor mapping in a way that mitigates the nonlocality of data reference caused by the retargeting.

In the present method, subimage processors remain assigned to the same region of the visual field during fixation and smooth pursuit. In contrast the present method accommodates a technique in which reprojective redistribution of graphics elements is suspended during and immediately after a saccade of sufficient magnitude. In this technique the foveal subimages may be assigned to different subimage processors during or immediately after the saccade. Following the saccade the foveal subimages are assigned to processors that had previously been assigned to the image region corresponding to the post-saccadic point-of-regard (i.e., the "landing point" of the saccade). These processors contained the graphics elements required to render the post-saccadic foveal image before the saccade began. Consequently, these elements will remain in the local memory during the saccade if reprojective redistribution is suspended during the saccade. The new post saccadic foveal subimage processors will in general have immediate local access to both reprojected samples and 3-D database that will be required for the generation of the new foveal subimages. The database representation initially stored in the post-saccadic foveal subimage processor may be a low level-of-detail representation because the elements previously projected to a region of low resolvability based on the previous retinal location and the acuity falloff function. This allows immediate display of the postsaccadic foveal image at a low level-of-detail that is subsequently replaced with a higher level-of-detail representation over a time course that substantially reflects the acuity vs. exposure time of the visual system.

The method also accommodates models of the oculomotor system that allow accurate prediction of the final location of the point-of-regard based on the initial velocity and acceleration vectors for eye movements. This allows the foveal subimage assignment to be made before the saccade is actually finished and well before foveal vision has recovered from saccadic suppression.

An alternative strategy that can be accommodated by the method is to keep subimages locked to specific regions of the visual field at all times. In this implementation the subimage processors assigned to the peripheral visual field accesses only low LOD database representations and are never reassigned to foveal regions of the image.

Efficient Techniques for Sample Transformation and Projection

Compared to conventional methods of image generation the present method of sample reprojection potentially involves the transformation of many more graphic elements. In conventional graphics pipelines each primitive typically requires an object-space transformation prior to rasterization. In typical implementations control points or vertices of the primitives are transformed by multiplying a vector representation of the vertex by a concatenated general transformation matrix that includes the effect of object motion and camera motion (including translation and perspective projection). The cost of this operation is approximately 20 floating point operations per vertex. In the present method of sample reprojection the number of transformed graphic elements (samples) is related to the visible resolution of the displayed image. This number is greater than the number of visible primitives and, depending on the displayed resolution, can easily exceed the number of primitives in the database.

In order to reduce the computational cost associated with transforming samples the present method employs special transformations for samples from static objects to compute the effects of specific viewpoint translations and view direction vector rotations on the image-space representation of the samples. These transformations require fewer operations than a general transformation matrix. These less expensive transformations can be used in common situations including: 1) pure viewpoint motion with constant view direction vector, 2) view direction vector rotation about a single axis with constant viewpoint position, 3) viewpoint motion together view direction vector rotation about a single axis. In each of these cases the cost of transforming the graphic element is significantly less than the cost of applying a general transformation matrix.

A first set of transformations applies to the case of viewpoint motion with a constant view direction vector. Assuming that all object samples have previously been transformed into the canonical viewing orientation in which the view direction vector is translated and rotated to be congruent with the world coordinate system z axis as described in Foley and VanDam et. al. in the text "Computer Graphics Principles and Practice Second Edition 1990. ISBN 0-201-12110-7" chapter 6 section 6.5.1, then the projection of any object space sample is simply:

$xi=D*x/z$ Equation 9a $yi=D*y/z$ Equation 9b

Where xi and yi are image space coordinates of the sample, x, y, and z are object space coordinates of the sample, and D is the distance from the viewpoint to the center of the viewport that is assumed to be orthogonal to the view direction vector. If the view direction vector is parallel to the z axis and camera motion is limited to viewpoint translation in any dimension x, y, or z in object space then the effect of the viewpoint translation on image space coordinates of a sample is determined by incrementing the new object space values of the samples in the equations 9a and/or 9b. In the case when the viewpoint motion vector is parallel to the view direction vector, object space x and y values are constant while the z value varies. In this case the effect on xi and yi can be determined with only 5 floating point operations. Similarly, if the object space y value of the sample changes (as a result of viewpoint motion "up" or "down") the image space value of xi is unchanged while yi can be recomputed with only 3 floating point operations (one if the value of D/z is precomputed and stored for the sample). These methods give exact results and have a cost of only 3–5 floating point operations compared to 18–20 floating point operations required for multiplication of a sample vector [x y z] by a general transformation matrix. These simplified projections are possible in the preceding cases because the samples already have been transformed so that the world coordinate system z axis is parallel to the view direction vector. Because this orientation is similar to the canonical viewing orientation, projection of samples can occur without rotational transformation. Because walking in the direction of looking is a common and natural way of exploring a virtual environment the preceding technique of determining the image-space location of samples can frequently be employed to reduce the cost of transformation-projection by approximately 75% in these cases. Transformation of the viewpoint in directions other than the view direction can be computed for an additional 2 floating point operations required to transform the x and y object-space values.

In a second technique sample transformations that result from rotation of the view direction vector about a single axis centered at the viewpoint are performed by applying a rotation-specific computation to the samples instead of a generalized rotation matrix. A change in heading is performed by application of the following relationship describing rotation about the y axis:

$x=x*\cos(delta\_heading)-z*\sin(delta\_heading)$ Equation 10a $z=x*\sin(delta\_heading)+z*\cos(delta\_heading)$ Equation 10b For rotation about any single axis a similar relationship is applied. In this case computation of the new value for x and z require 4 floating point multiplies and 2 adds. (If the source objects are static then the transformation is totally the result of view transformation and the trigonometric functions need only be computed once per subimage, not per sample). To effect the planar perspective projection after transformation requires an additional 1 multiply and 1 divide. The total number of floating point operations in this case is 8 which is less than one half the number of floating point operations required to apply a general composite transformation.

A third case is the transformation describing combined viewpoint motion and view direction vector rotation about a single, viewpoint centered, axis. For this case the x, y, z values are transformed by a translation in addition to the rotational transformation described above. The total cost is 1–3 floating point operations for the translation (depending on the number of dimensions in the translational motion) in addition to the 8 floating point operations for the rotation and projection. Using this technique the total number of floating point operations required to compute the common viewing transformation of translation plus panning rotation is only 9 floating point operations per transformed vertex or sample. This is less than one half the cost of applying a general 4 by 4 transformation matrix.

Each of the preceding methods require the actual values of the object space elements (e.g. samples) to be initially modified to reflect a canonical viewing transformation position prior to the application of the simplified transformations. This transformation effectively places the viewpoint at the world coordinate system origin and aims the viewdirection vector such that it is congruent to the world coordinate system z axis. In the standard fashion described by Foley and VanDam et. al. in the text "Computer Graphics Principles and Practice Second Edition 1990. ISBN 0-201-12110-7" chapter 6 section 6.5.1, the object-space elements (e.g., samples) are transformed by the inverse of the transformation that would map the view direction vector to the canonical viewing position and orientation.

Such a change in the actual value of an object-space entity is generally not required when applying the more expensive general transformation matrix because the general transformation matrix can include the viewing transformation. Because a single general transformation matrix can encode any arbitrary sequence of transformations it can be applied to object-space elements that are in any arbitrary position to transform them to a canonical viewing position. In typical application of the general transformation matrix the current matrix represents the transformation of an object from some original position and orientation (e.g. centered at the world coordinate system origin and oriented to the world coordinate system axis). In such an implementation the original object data never has to be modified by a write operation to reflect the new position and orientation for each frame. Because the transformed object-space values are never retained, the transformation matrix must represent the entire sequence of rotations and translations required to move the object from its original position to the position and orientation at the current time.

In the present method of simplified transformation, the transformations cannot encode the viewing transformation. Consequently prior to their application, the actual data is modified by the application of the current general transformation matrix to effect the viewing transformation. Subsequently the previously described simplified transformations can be applied without actually updating the object-space data.

Therefore in the present method, simplified transformations are employed during periods when the viewpoint and view direction vector motions are relatively simple. Because viewer motion within a virtual environment typically involves these simplified transformations, considerable computational savings can be achieved by their application. The general transformation matrix is only employed when the transformations are complex and involve simultaneous rotation about more than one axis. Additionally the general transformation matrix is applied, together with a write update of the object-space data, prior to the application of the simplified transformations. Subsequently, the simplified transformations are applied without write update. The write update process is a small additional setup cost for the simplified transformations. These simplified transformations result in considerable subsequent savings. When the viewing transformations are continuous and coherent the simplified transformations can generally be applied and the incidence of transformation transitions requiring write-update is relatively low. Conversely, when viewing transformations are more complex or discontinuous the simplified transformations are less applicable. However, such discontinuous viewing transformations also reduces the temporal image coherence and the temporal visibility coherence of the image stream, which in turn tends to reduce the visual system's ability to resolve the image stream. Consequently, during periods when the simplified transformations are not employed, the present image generation system typically computes a reduced resolution image stream which mitigates the computational cost of the general transformation matrix by decreasing the number of samples processed.

In addition to the exact techniques described above, the present invention employs an approximate method of computing the reprojection of graphic elements (e.g., samples or vertices). This second technique to accelerate the process of reprojecting graphic elements employs an image-space differencing method which uses the earlier image-space locations of a sample to approximate the current image-space position of the sample. In this method a first order approximation to the image-plane velocity of a sample is made from earlier values of the sample's image-space location of these locations according to the simple equation 11a and 11b:

$$\text{Equation 11a:} \quad Sample_{vxi} = \frac{SampleXi_{t2} - SampleXi_{t1}}{t_2 - t_1}$$

$$\text{Equation 11b:} \quad Sample_{vyi} = \frac{SampleYi_{t2} - SampleYi_{t1}}{t_2 - t_1}$$

Where $SampleXi_{t2}$ is the image-space value of the x coordinate at time t2, and $SampleXi_{t1}$ is the image-space value of the x coordinate at some earlier time t1. Likewise where $SampleYi_{t2}$ is the image-space value of the y coordinate at t2, and $SampleYi_{t1}$ is the image-space value of the y coordinate at some earlier time t1.

Alternatively, for samples from static objects, the image-space velocity of a sample can be computed directly from the known object-space velocity of the viewpoint and the rotational velocity of the view direction vector, and the sample's object space location. This computation of the image-space acceleration of a sample employs formulae which relate the image-space velocity of a static object-space point to the translational velocity of the viewpoint and the angular velocity of the view direction vector. In the case of constant-velocity viewpoint motion in the direction of view the image-space velocity of a static graphic element is determined from the formula:

$$dxi/dz=(-1.0*D*x)/z*z \qquad \text{Equation 12a}$$

$$dyi/dz=(-1.0*D*y)/z*z \qquad \text{Equation 12b}$$

Where dxi/dz is the partial derivative of the image-space position of a graphic element (e.g. sample) with respect to the object space z position of the viewpoint, for the case of viewpoint motion in the direction of view. In this formula x, y, and z are the values of the object-space coordinates of the sample.

Whether the velocity is estimated using a difference formula or determined exactly from a partial derivative of image-space velocity with respect to object space velocity, the determined velocity is subsequently employed to provide a first order approximation to subsequent image-space locations of the graphic element or sample. The current image-space position is calculated to be:

$$xi_{new}=xi_{old}+Sample_{vxi}*Delta\_t \qquad \text{Equation 13a}$$

$$yi_{new} = yi_{old} + Sample_{vyi} * Delta\_t \qquad \text{Equation 13b}$$

This constant-velocity approximation is employed for samples known to have acceleration below some predetermined value. Once the sample velocity is determined then for a fixed sampling interval (e.g. Delta_t constant) then the computation of $xi_{new}$ and $yi_{new}$ requires only 2 operations which may be floating point or integer operations. The number of sampling intervals during which the determined velocity is used is dependent on the acceleration of the graphic element. If the acceleration exceeds a predetermined value then the velocity value is employed for only a small number of sampling intervals. In the present method the number of sampling intervals during which an determined image-space velocity is employed is made in some inverse proportion to the determined acceleration of the graphic element.

In the present method the acceleration of a sample is determined periodically from at least three image-space values that were actually calculated by an exact method of transformation/projection (such as the general transformation matrix). Alternatively, for samples from static objects, the image-space acceleration of a sample can be computed directly from the known object-space velocity of the viewpoint and view direction vector, and the sample's object space location. This computation of the image-space acceleration of a sample employs formulae which relate the image-space acceleration of a static object-space point to the translational velocity of the viewpoint and the angular velocity of the view direction vector. In the case of constant-velocity viewpoint motion in the direction of view, the image-space acceleration of a static graphic element is determined from the formula:

$$d^2xi/dz^2 = (2*D*x)/z*z*z \qquad \text{Equation 14a}$$

$$d^2yi/dz^2 = (2*D*y)/z*z*z \qquad \text{Equation 14b}$$

Where $d^2xi/dz^2$ and $d^2xi/dz^2$ are the second partial derivatives of the image-space position of a graphic element (e.g. sample) with respect to the object space z position of the viewpoint, for the case of viewpoint motion in the direction of view. In this formula x, y, and z are the values of the object-space coordinates of the sample.

This approximation is based on the second derivatives of the optical flow with respect to forward (or z direction) motion of the viewpoint for the special, but common, case of viewpoint motion in the direction of view.

Because equation 14a is equation 12a multiplied by the factor: $-2.0/z$, and equation 14b is equation 12b multiplied by $-2.0/z$; the computation of velocity and acceleration at the same time requires only 8 floating point operations. If the value of the acceleration is low then the determined velocity is employed for several temporal sampling intervals and produces good results during this time.

Because these image-space techniques are approximate they tend to produce cumulative error and cannot be applied without periodic correction by some exact technique. In the present method the frequency with approximated image-space sample positions are "refreshed" with actual values is made in some proportion to the image-space acceleration of the sample. Alternatively the value of a higher-order acceleration (e.g. based on the third derivative of the image-space position with respect to the viewpoint z position: $-6.0*D/z^4$) is used to estimate the period of accuracy of the approximate velocities employed in equations 13a and 13b.

During image-space approximations the object-space value of the approximated samples are not updated. Updating of these values is subsequently performed using the general transformation matrix representing the viewing and object-motion transformations that occurred during the approximations. This is similar to the update policy employed during application of the simplified transformations described previously.

Microsoft's proposed Talisman™ architecture approximates the object-space transformation of an object with a single image-space transformation that is applied to all of the samples of the object. Because the optical flow characteristics can vary considerably for different parts of a single object, such an approximation is inherently inaccurate. In contrast, the present method employs image-space approximations to each sample individually allowing a more accurate approximation to optical flow. Additionally, the image-space approximation techniques of the present method can also be applied to groups of samples that are known to have similar optical flow characteristics (e.g. from the same primitive wherein the primitive has an extent in viewing depth that does not exceed a predetermined value).

The combination of these image-space approximation methods and the previously described simplified transformation methods together with limited use of the general transformation matrix and database update provide a system of reprojection that provides unprecedented performance and controlled accuracy.

Although these methods of simplified and approximate transformation are specified herein as applying primarily to sample reprojection, these methods can be applied to the transformation of any graphic element including but not limited to: 1)primitives, 2)vertices of polygonal primitives, 3)control points of non-polygonal graphics primitives, 4)control points of non-planar graphics primitives.

Adaptive Rasterization

The present invention employs several methods of perception-based sampling. These perception-based sampling methods can be implemented as adaptive or non-adaptive sampling. Implementations based on adaptive sampling offers several advantages over non-adaptive implementations.

As described in detail earlier in this specification, during adaptive, perception-based sampling an image region is sampled and the values of various parameters affecting the spatial and temporal resolvability of the region are determined and used to control the degree of further spatio-temporal sampling in the region. In one implementation of the present invention, described in detail earlier in this specification, the values of the aforementioned parameters are used to effectively modulate contrast-based refinement criteria in a manner that reflects the effect of each parameter on the spatial contrast sensitivity function of the human visual system. Other adaptive implementations are possible that do not use the contrast-based refinement criteria but instead modulate resolution directly.

The advantage of the adaptive sampling implementation is that the spatial sampling density can be adjusted within arbitrarily small sampling regions. This allows very fine control over the spatial sampling density. Such control over local spatial sampling density is not possible using a non-adaptive sampling strategy in which an entire image region or an entire graphic element (e.g. primitive) is sampled at the same density.

Additionally, adaptive sampling is ideally suited to a progressive stratification that allows the resolution of the sampled region to be increased over time. In the present invention this refinement strategy is used to increase the resolution of the sampled region during the rendering of a single frame. As previously described, this real-time progressive refinement of an image region allows the method to achieve a balance between resolution and frame rate that parallels the relationship between spatial and temporal limits of human vision. While a progressive increase in resolution over time is possible during non-adaptive sampling (e.g. a conventional "multipass" sampling strategy) the combination of adaptive sampling and progressive stratification is an efficient method for constructing an image stream that has a local spatio-temporal structure that closely matches the visible information content of the region.

Adaptive and progressive sampling methods are typically limited to implementations in which samples are produced independently in an image-order rendering system, such as ray tracing. In fact, in the initial description of adaptive-refinement sampling, Fuchs indicated that it is best suited for implementation with ray tracing. Subsequent development and application of adaptive refinement sampling has generally been limited to image-order point sampled methods such as ray tracing or ray casting. The adaptive-progressive sampling method has not been applied to conventional real-time rendering by rasterization of graphic primitives (e.g. polygons). Some renders do preprocess curved surface descriptions such as non-uniform rational B-splines (NURBS) using an adaptive subdivision of the surface into planar primitives based on the local curvature of the surface. This type of adaptive subdivision is generally performed as a preprocessing step that essentially modulates the level-of-detail that is presented to the renderer based on the number of primitives required to represent a smooth curved surface. In this method the actual image space sampling is not performed adaptively during real-time image generation.

As indicated elsewhere in this specification the perception-based spatio-temporal importance sampling methods of the present invention can be applied to adaptive or non-adaptive sampling. In one implementation using non-adaptive sampling, the resolution of individual primitives is selected to reflect one or more of the following parameters that affect the resolvability of the primitive: 1)lowest measured or estimated retinal velocity of any vertex in the primitive (e.g. in a manner that reflects the dynamic visual resolvability of the slowest moving vertex), 2) exposure time of the primitive (e.g. in a manner that reflects the acuity vs. exposure performance of the visual system), 3)retinal location of the primitive (using the minimum retinal eccentricity of the primitive to determine the displayed resolution that reflects the acuity falloff function of the human visual system). Used on a per-primitive basis in this way, the sampling methods of the present invention can be implemented in conventional object-order primitive rasterization pipelines. Alternatively, the sampling methods can be implemented using systems based on the method of primitive reprojection described in the copending application. For either implementation the only additional requirement is that the depth buffer/image buffer accommodate rasterization of primitives at different resolutions.

In addition to being used to adjust the rendering resolution of an entire primitive, the present invention includes a method of adaptive rasterization which allows the rendered resolution within different image-space regions of a primitive to be adjusted to reflect the dynamic resolvability of samples within the image-space region being rasterized.

Rasterization is essentially an interpolative process in which image space samples are produced from a sampling (typically linear, incremental) that is conducted on the surface of a graphic primitive using an image-space to object-space mapping to determine object-space values corresponding to specific image-locations. Rasterization generally depends on an initial object-space to image-space mapping of a primitive which defines the image-space borders of the primitive. This image-boundary of the primitive defines the region in which the image-space to object-space interpolations of rasterization take place.

As an interpolative technique in a defined image-space region, rasterization can be implemented as an adaptive sampling process. Sampling within the image-space boundary of a single primitive can be conducted in an adaptive pattern similar to the adaptive sampling of a defined image-space region illustrated in FIG. 1. In the case of adaptive rasterization within the image-space boundary of a primitive, samples are generated by the interpolative image-space to object-space mapping typically employed for rasterization rather than the image-space directed, object space visibility search typically employed for ray casting.

Figure 24C:
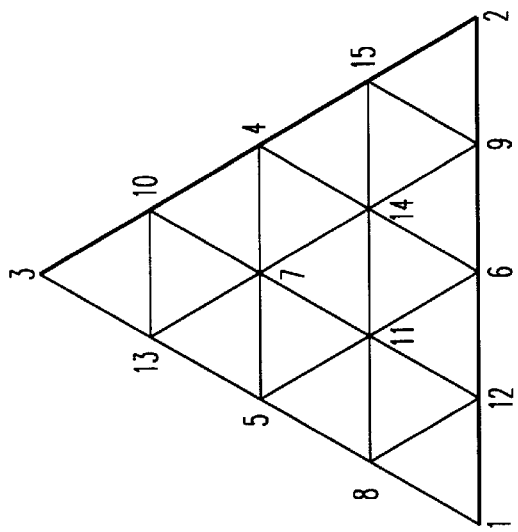
FIG. 24A–24C illustrates one implementation of the method of adaptive rasterization using triangle midpoint subdivision for the case of a triangular primitive.
Figure 24B:
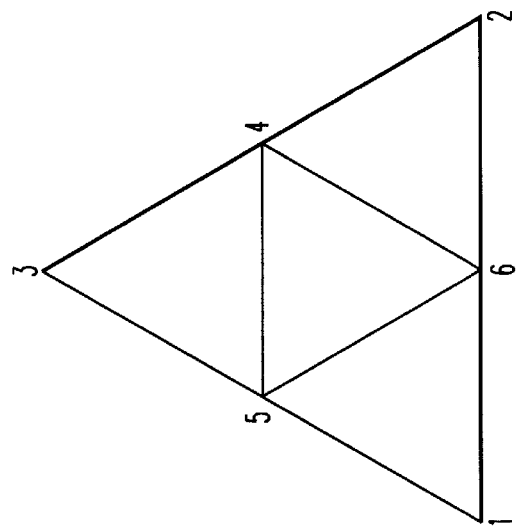
Figure 24A:
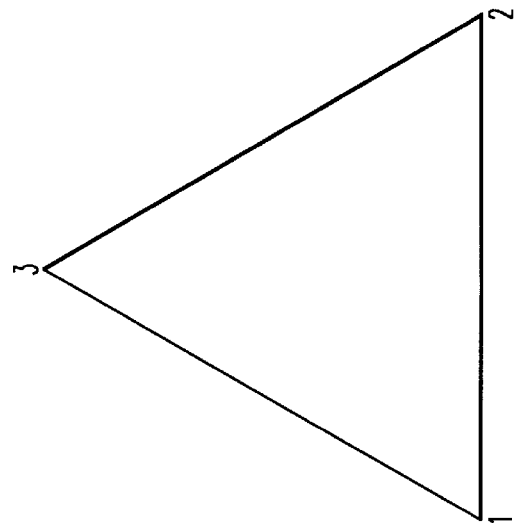

The present invention employs one technique of adaptive rasterization within a primitive's image space boundary which uses a recursive triangular midpoint subdivision scheme similar to that commonly used for generating fractal terrains. The midpoints of a triangles edges together with the initial vertices comprise 6 points on the triangle's boundary that represent 4 interior subtriangles which share 9 sub-edges. The interpolated values of normals, texture, radiosity and other values are computed for the midpoint vertices during the adaptive recursion. Each of the subtriangles may be adaptively subdivided to produce a higher sampling density in the region of the subtriangle. This pattern of subdivision for triangular graphic primitives is shown in FIG. 24. FIG. 24A shows a triangular graphic primitive with three samples (1, 2, and 3) generated by an initial adaptive sampling on the primitive surface. The sampling in this case uses the vertex values without requiring interpolation. FIG. 24B shows three additional samples (4, 5, and 6) taken at the midpoint of each edge of the triangular primitive. Values are interpolated from the adjacent vertices. FIG. 24C shows further sampling of the triangular primitive using a sampling pattern based on a recursive midpoint subdivision of the subtriangles shown in FIG. 24B. Once again, values are interpolated from adjacent edge or interior samples using an linear incremental interpolative process analogous to conventional rasterization. Note that the sampling pattern in FIG. 24C employs a progressive stratification in which all subtriangles on a specific level are tested for the need for further sampling before any single triangle is sampled at a lower level of the recursion.

The level of subdivision sampling of the subtriangles is controlled by the previously described perception-based sampling criteria. In the present method this adaptive sampling employs a progressive stratification in which no single subtriangle at any level of the recursion is further subdivided until all subtriangles in the next higher level of the recursion have been processed.

The goal of adaptive sampling is to sample an image region with a spatial sampling density that reflects the local information content of the sampled region. In the present invention perception-based refinement criteria are employed which cause the local spatial sampling density to reflect the local visible information content of the image stream. The previously described process of adaptively rasterizing a single primitive (e.g. using midpoint triangular subdivision), when employed with the perception-based refinement criteria of the present method, allows the local spatial sampling density to reflect the visible information content within the boundaries of a primitive. In fact, however, much of the contrast structure of a typical image results from contrast that exists between dissimilar primitives at primitive boundaries. The present invention includes a method of adaptive rasterization in which both intra-primitive contrast and inter-primitive contrast is determined and the spatial sampling density within an image region is modulated to reflect some predetermined refinement criteria, which may be the previously described perception-based refinement methods specified by the present invention.

In order to adequately sample an image region using adaptive sampling, the sampling process must determine the inter-primitive contrast across image-space borders of adjacent primitives. This requires the sampling process to have immediate read and write access to data representing all primitives in an image region. For several reasons the intrinsic primitive-order organization of conventional rasterization pipelines is unable to support this type of interprimitive sampling. Conventional rasterization pipelines are generally organized as a strictly primitive-order feed-forward fashion in which the rasterizer does not, in general have direct read or write access to data representing all of the primitives in a specific image region. This is true of conventional image generation systems based on either sort-middle or sort-last architectures as described by Molnar et. al. In sort-middle architectures the rasterization process is conducted as a strictly feed forward process in which a rasterizer receives a primitive description that is held in a temporary data storage area directly accessible by the rasterizer while the primitive is being rasterized. Subsequently, this local data storage is flushed or overwritten by data for the next primitive to be rasterized. Moreover in the sort-middle architectures a rasterizer is often not rendering a contiguous (e.g. rectangular) image subregion but instead is directly hard-wired to a distributed or interleaved set of pixel or sample areas in order to achieve a static load balance for rasterization processors that avoids primitive clumping in subimage areas.

In contrast, image generation systems based on the sort-first architecture proposed by Molnar et. al. would have subimage processors with direct access to a local primitive display list. Additionally, the image generation systems based on the image-parallel primitive reprojection architecture described in the copending application also possess subimage processors which perform rasterization and have direct read-write access to a local display list of all primitives in the subimage. Consequently, rasterizing processors for both the sort-first type architectures and the primitive reprojection architectures described in the copending application, in principle have direct access to subimage primitive data that would be required for adaptive rasterization between primitives.

The present invention includes a method of adaptive rasterization in which the organization of the rasterization is not limited to a strict primitive-order. In this method rasterization proceeds primarily in a primitive-order. During adaptive rasterization samples are written to a depth buffer/image buffer data storage area. The color-space values of surrounding samples are compared in order to assess the intersample contrast as previously described. The surrounding samples may be from the same primitive being rasterized or, alternatively, may be from other primitive (s) in the region of the rasterized primitive that were rasterized earlier. If the compared samples are from the same primitive then the adaptive triangular subdivision or similar adaptive sampling pattern process is conducted to control the ongoing generation of samples within the primitive's border by rasterization. On the other hand, the compared samples may be from a different primitive in the region of the primitive being rasterized. This can be determined by employing a depth buffer which contains data for each buffer element that indicates the source primitive for the visible sample. In the present invention this information is included in the augmented depth buffer data structure "struct sample_buffer_sample", specified earlier in connection with table 3.

If, during adaptive rasterization, the contrast between two samples having different source primitives exceeds a predetermined refinement criteria (for the present invention the contrast is adjusted to reflect the visible contrast by the previously described method) then, in addition to more sampling of the primitive being rasterized, additional samples are also generated for the other primitive not currently being rasterized. The additional samples are obtained for the primitive not currently being rasterized by re-rasterizing the primitive in the region containing the initial samples. In this way new contrast that develops for a previously rasterized primitive on account of its adjacency with a newly rasterized primitive is identified and the previously rasterized primitive is re-rasterized in the region of the new contrast structure.

Figure 25:
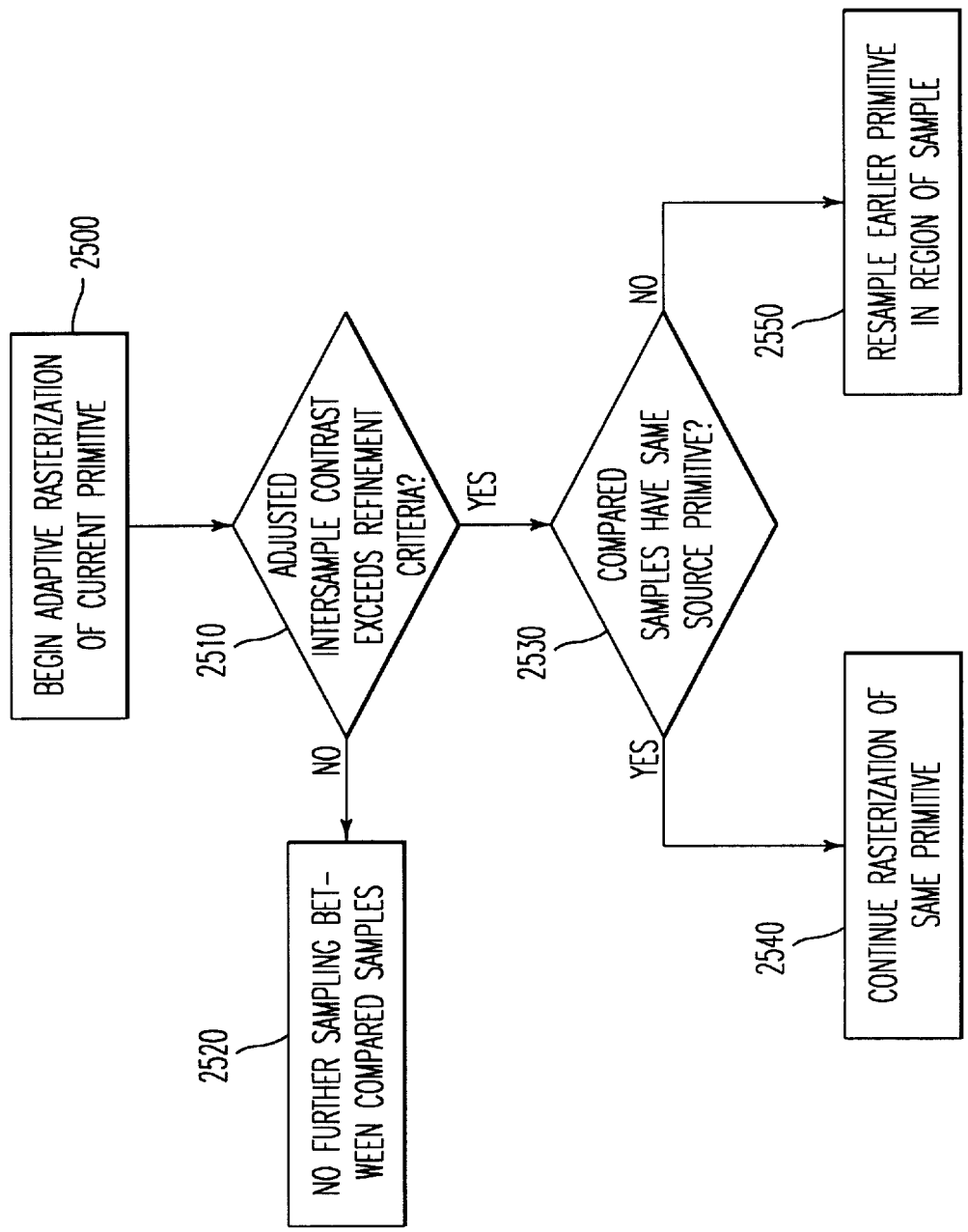
FIG. 25 is a flowchart describing the process of adaptive rasterization that identifies inter-primitive contrast and re-samples previously rasterized primitives in the region of newly identified inter-primitive contrast.

The process of adaptive rasterization accounting for inter-primitive contrast is given in the flowchart of FIG. 25. In this flowchart step 2500 represents the initiation of rasterization for the current primitive. The process is performed for each primitive in a local subimage display list. In step 2510 the intersample contrast of 2 samples during the rasterization is compared. This contrast may be adjusted to reflect the visible contrast using the previously specified methods. If the visible contrast does not exceed a predetermined refinement criteria then control shifts to step 2520, which signals the controlling process that no further sampling is needed between the two samples. Using the previously described methods this decision may be direction-specific, reflecting the direction-specific reduction in resolvability with retinal motion. Otherwise if the visible contrast between the two samples exceeds a predetermined refinement criteria then control shifts to step 2530. In step 2530 the source primitive for each of the compared samples is determined by reference to the "struct sample_buffer_sample", specified earlier in connection with table 3. If the source primitive for both samples is the current primitive then control shifts to step 2540, which indicates to the controlling process to continue adaptive rasterization of the current primitive. Otherwise one of the samples is from a different source primitive that was rasterized earlier, and control shifts from step 2530 to step 2550. In step 2550 the earlier rasterized primitive is resampled in the region of the new contrast. This resampling may employ an incremental interpolative process such as rasterization or, alternatively, the primitive may be resampled using a point-sampled, non-incremental method such as ray-primitive intersection.

When applied to the method of primitive reprojection specified in the copending application, the present method of adaptive rasterization using perception-based contrast adjustments substantially reduces the cost of rasterization by limiting the number of samples that need to be generated. The method of adaptive rasterization can be easily integrated into systems based on the primitive reprojection architectures described in the copending application because in these architectures these rasterizing processors (e.g. subimage processors) have direct access to the requisite data structures including the local primitive display list and an augmented depth buffer that indicates the source primitive for each sample.

The method of primitive reprojection described in the copending application supports a type of visibility event encoding method also described in the copending application. The method of visibility event encoding is an efficient means of encoding the results of a computer generated image sequence produced in real-time or non-real-time. In this method of datastream encoding, information for newly visible and newly invisible graphic primitives is determined and transmitted to the destination display list of a client/decoder unit that performs primitive rasterization. The methods of the present invention can be employed to decrease the transmission/playback bandwidth of this codec. In one implementation of the present invention the level-of-detail of the database representation used to encode newly visible primitives is reduced in a manner that substantially reflects the visual system's decreased resolving ability for objects with low exposure time. Subsequently if the exposure time for a primitive that had previously been identified as newly visible by sampling a low level-of-detail database exceeds a predetermined exposure duration then the primitive is replaced by re-encoding a primitive from a higher level-of-detail database in a manner in which the level-of-detail substantially reflects the acuity vs exposure time performance of the visual system. For image sequences in which a substantial number of primitives do not develop full visible exposure (e.g. 1000 ms) the overall transmission/playback bandwidth is reduced by this method.

Additionally, the present invention can be applied to modulate level-of-detail during encoding to substantially reflect the measured or estimated retinal velocity of the encoded graphic primitive. For image sequences in which a substantial number of primitives have a high estimated or measured retinal velocity, application of this method can reduce not only the transmission/playback bandwidth but also reduces the compute and storage demands of the client/decoder unit.

On the client/decoder side the resolution of the displayed primitives can also be selected to reflect the exposure duration and/or retinal velocity of the primitive.

Like all of the perception-based spatio-temporal sampling methods of the present invention the preceding methods of controlling visibility event encoding can be applied for real-time or non-real time image generation.

Obviously, numerous modifications and variations of the present invention are possible in light of the above teachings. It is therefore to be understood that within the scope of the appended claims, the invention may be practiced otherwise than as specifically described herein.

Further, the present application incorporates by reference the following papers, reports and technical disclosures:

Abrash, M. (1996). Zen of Graphics Programming. The Coriolis Group, Inc.

Ackeley, K. (1993). RealityEngine Graphics. Silicon Graphics Computer Systems. SIGGRAPH 93 Conference Proceedings, pp. 109–116.

Adelson, E. H. and Bergen, J. R. (1991) The Plenoptic Function and the Elements of Early Vision. Computational Models of Visual Processing, MIT Press, Chapter 1, pp. 3–22.

Adelson, S. J. and Hodges, L. F. (1993) Generating Exact Ray-traced Animation Frames by Reprojection. IEEE Computer Graphics and Applications, pp. 43–51.

Adelson, S. J. and Hodges, L. F. (1995) Stereoscopic raytracing. The Visual Computer (1995)10, pp. 127–144.

Akimoto, T., et. al. (1991). Pixel-Selected Ray Tracing. IEEE Computer Graphics & Applications, July '91, pp. 14–21.

Arvo and Kirk (1991), Unbiased Sampling Techniques for Image Synthesis, ACM SIGGRAPH Proceedings 1991. pg. 153–156.

Barbour, C. G. and Meyer, G. W. (1992) Visual cues and pictorial limitations for computer generated photorealistic images. The Visual Computer (1992) 9, pp. 151–165.

Becker, W.(1991) Saccades. Vision and Visual Dysfunction: Eye Movements, chapter 5, pp. 95–135. CRC Press, Inc.

Bex, P. J., et. al. (1995). Sharpening of Drifting, Blurred Images. Vision Research Vol. 35, No. 18 pp. 2539–2546. Elsevier Science Ltd.

Bishop, G., et. al (1994). Frameless Rendering: Double Buffering considered Harmful. Department of Computer Science, University of North Carolina at Chapel Hill. SIGGRAPH 94 Conference Proceedings, pp. 175–176.

Bizzi, E.(1981) Eye-head coordination. Handbook of Physiology—The Nervous System II, Chapter 29, p. 1321.

Bolin, M. R. and Meyer, G. W. (1995). A Frequency Based Ray Tracer. Univ. of Oregon. SIGGRAPH 95 Conference Proceedings, pp. 409–418.

Bradick, O., et. al.(1978). Channels in Vision: Basic Aspects. Handbook of Sensory Physiology, Vol. VIII: Perception, pp. 24–33. Held, R., Leibowitz, H. W. and Teuber, H -L. (Eds.), Springer-Verlag Berlin Heidelberg.

Bradt, S. (1988) Two algorithms for taking advantage of temporal coherence in ray tracing. The Visual Computer (1988) 4, pp. 123–132.

Brown, B. (1972a) Resolution Thresholds for moving targets at the Fovea and in the Peripheral Retina. Vision Res. Vol. 12, pp. 293–304. Pergamon Press 1972.

Brown, B. (1972b) Dynamic Visual Acuity, Eye Movements and Peripheral Acuity for moving targets. Vision Res. Vol. 12, pp. 305–321. Pergamon Press 1972.

Bundensen, C. and Shibuya, H. (1995). Visual Selective Attention, Lawrence Eribaum Assoc., Publishers.

Burbidge, D. and P. M. Murray(1989). Hardware Improvements to the Helmet Mounted Projector on the Visual Display Research Tool (VDRT) at the Naval Training Systems Center. GM Hughes Electronics Co. SPIE Vol. 1116 Helmet Mounsted Displays(1989).

Carpenter, R. H. S. (1991). The Visual Origins of Ocular Motility. Vision and Visual Dysfunction: Eye Movements, Vol. 8, pp. 1–10. CRC Press.

Chapman, J., et. al. (1991). Spatio-Temporal Coherence in Ray Tracing. Simon Fraser Univ. Graphics Interface '91.

Charney, M. J. and Scherson, I. D. (1990) Efficient Traversal of Well-behaved Hierarchical Trees of Extents for Raytracing complex Scenes. The Visual Computer (1990) 6, pp. 167–178.

Chen, S. E. (1995). QuickTime VR—An Image-Based Approach to Virtual Environment Navigation. Apple Computer, Inc. SIGGRAPH 95 Conference Proceedings, pp. 29–37.

Chen, S. E. and Williams, L. (1993). View Interpolation for Image Synthesis. Apple Computer, Inc. SIGGRAPH 93 Conference Proceedings, pp. 279–288.

Clapp, R. E. (1985). The Rastered Eye; Vision in Television. Boeing Military Airplane Co. In: SPIE Vol. 526, Advances in Display Tech. V (1985).

Cleary, J. G. and Wyvill, G. (1988) Analysis of an algorithm for last ray tracing using uniform space subdivision. The Visual Computer (1988) 4, pp. 65–83.

Collewijn, H., et.al. (1974). Precise Recording of Human Eye Movements. Vision Research, Vol. 15, pp. 447–450. Pergamon Press.

Collewijn, H. (1991). The Optokinetic Contribution. Vision and Visual Dysfunction: Eye Movements, Vol. 8, pp. 45–70. CRC Press.

Davson, H. (1990). Physiology of the Eye. Pergamon Press.

Ditchburn, R. W.(1973). Eye-movements and visual perception. Claredon Press—Oxford.

Deering, M. (1995). Geometry Compression. Sun Microsystems. SIGGRAPH 95 Conference Proceedings, pp. 13–19.

Deering, M. (1992). High Resolution Virtual Reality. Sun Microsystems. SIGGRAPH 92 Conference Proceedings, pp. 195–201.

Durlach, N. et. al. (1995). Virtual Reality—Scientific and Technological Challenges, National Research Council, National Academy Press.

Eckert, M. P. and Buchsbaum, G. (1993). The Significance of Eye Movements and Image Acceleration for Coding Television Image Sequences. In Digital Images and Human Vision, Watson, A. B. (Ed.), MIT Press, chapter 8, pp. 89–98.

Eizenman, M., et.al. (1984). Precise Non-contacting Measurement of Eye Movements using the Corneal Reflex. Vision Research, Vol. 24, No. 2, pp. 167–174. Pergamon Press.

Farrell, J. E.(1991) Fitting Physical Screen Parameters to the Human Eye. Vision and Visual Dysfunction: The Man-Machine Interface (Vol 15), chapter 2, pp. 7–23. CRC Press, Inc.

Fano, A. and Cooper, P.(1994). Maintaining Visual Models of a Scene Using Change Primitives. Proceeding: Vision Interface '94. Canadian Image Processing and Pattern Recognition Society.

Ferwerda, J. A., and Greenberg, D. P. (1988). A Psychophysical approach to Assessing the Quality of Antialiased Images. IEEE Computer Graphics & Applications, November '88, pp. 85–95.

Ferwerda, J. A., et.al.(1996). A Model of Visual Adaptation for Realistic Image Synthesis. Program of Computer Graphics, Cornell Univ. SIGGRAPH 96 Conference Proceedings, pp. 249–258.

Fisher, R. W. (1982) Society for Information Display International Symposium Digest of Technical Papers, pg. 144–145, 1982.

Fisher, R. W.(1984a) A Variable Acuity Display for Simulator Applications. McDonnell Aircraft Co. SID 84 Digest.

Fisher, R. W.(1984b) Psychophysical Problems and Solutions in Variable Acuity Displays. McDonnell Aircraft Co. SID 84 Digest.

Formella, A. and Gill, C. (1995) Ray tracing: a quantitative analysis and a new practical algorithm. The Visual Computer (1995)11, pp. 465–476.

Fu, S., et. al. (1996). An Accelerated Rendering Algorithm for Stereoscopic Display. Computer & Graphics, Vol. 20, No. 2, pp. 223–229. Elsevier Science Ltd.

Fuchs, H.,et.al. (1989). Pixel-Planes 5: A Heterogeneous Multiprocessor Graphics System Using Processor-Enhanced Memories. Department of Computer Science, University of North Carolina at Chapel Hill. SIGGRAPH 89 Conference Proceedings, pp. 79–88.

Funkhouser, T. A. and Sequin, C. H. (1993). Adaptive Display Algorithm for Interactive Frame Rates During Visualization of Complex Virtual Environments. University of California at Berkeley. SIGGRAPH 93 Conference Proceedings, pp. 247–254.

Funkhouser, T. A. (1995a). Database Management for Models Larger than Main Memory. AT&T Bell Laboratories. 1995 Symposium on Interactive 3D Graphics, Monterey, Calif.

Funkhouser, T. A., (1995b) Course Notes on Interactive Visualization of Large Databases, SIGRAPH 1995, Lecture E, AT&T Bell Laboratories.

Funkhouser, T. A. (1995c). RING: A Client-Server System for Multi-User Virtual Environments. AT&T Bell Laboratories. SIGGRAPH 95 Lecture E.

Ganz, L.(1975). Temporal Factors in Visual Perception. In: Handbook of Perception, Vol. V, Seeing. Carterette, E. C. and Friedman, M. P. (Eds.), Academic Press, ch. 6, pp. 169–229.

Gaudet, S., et. al. (1988). Multiprocessor Experiments for High-speed Ray Tracing. ACM Transactions on Graphics, Vol. 7, No. 3, July '88, pp. 151–179.

Gegenfurtner, K. R. and Hawken, M. J. (1995). Temporal and Chromatic Properties of Motion Mechanisms. Vision Research Vol. 35, No. 11, pp. 1547–1563. Elsevier Science Ltd.

Gigante, M. A. (1993). Virtual Reality: Enabling Technologies. In Virtual Reality Systems, Earshaw, R. A., et. al. (Ed.), Academic Press, Chapter 2, pp. 15–25.

Girod, B (1993). What's Wrong with Mean-squared Error. In Digital Images and Human Vision, Watson, A. B. (Ed.), MIT Press, Chapter 15, pp. 207–220.

Glassner, A. S. (1988). Spacetime Ray Tracing for Animation. IEEE Computer Graphics & Applications, March '88, pp.60–70.

Glassner, A. S.(Eds.) (1989). An introduction to ray tracing. Academic Press, Inc.

Glassner, A. S. (1995). Principles of Digital Image Synthesis. Volumes I and II, Morgan Kaufmann Publishers, Inc., ISBN 1-55860-276-3.

Glenn, W. E. (1993). Digital Image Compression Based on Visual Perception. In Digital Images and Human Vision, Watson, A. B. (Ed.), MIT Press, Chapter 6, pp. 63–71.

Goldsmith, J. and Salmon, J. (1987). Automatic Creation of Object Hierarchies for Ray Tracing. IEEE Computer Graphics & Applications, May '87, pp. 14–20.

Grzywacz, N. M. and Yuille, A. L. (1991) Theories for the Visual Perception of Local Velocity and Coherent Motion. Computational Models of Visual Processing, MIT Press, Chapter 16231-252, pp. 231–252.

Green, S. A. and Paddon, D. J. (1989). Exploiting Coherence for Multiprocessor Ray Tracing. IEEE Computer Graphics & Applications, November '89, pp. 12–26.

Green, S. A. and Paddon, D. J. (1990). A Highly flexible Multiprocessor solution for Ray Tracing. The Visual Computer (1990) 5, pp. 62–73.

Grob, M. (1994). Visual Computing, Springer-Verlag.

Guenter, B. K., et. al. (1993). Motion Compensated Compression of Computer Animation Frames. SIGGRAPH 93 Conference Proceedings, pp. 279–304.

Hahn, L. W., and W. S. Geisler(1994). Adaptation Mechanisms in Spatial Vision—I: Bleaches and Backgrounds. Vision Res. Vol.35, No. 11, pp. 1585–1594. Elsevier Science Ltd.

Haines, R. F. (1975). A Review of Peripheral Vision Capabilities for Display Layout Designers. Proceedings of the S. I. D., Vol. 16/4 Fourth Quarter 'b 75.

Hallet, P. E. (1991). Some Limitations to Human Peripheral Vision. Vision and Visual Dysfunction: Limits of Vision, Vol. 5, ch. 6, p.44. CRC Press, Inc.

Harrell, C. and Fouladi, F. (1993). Graphics Rendering Architecture for High Performance Desktop Workstation. Silicon Graphics Computer Systems. SIGGRAPH 93 Conference Proceedings, pp. 93–100.

Hart, W. M. Jr.(1987). Visual adaptation. Chapter 16, Adler's physiology of the eye. The C. V. Mosby Co.

Hart, W. M. Jr.(1987). The temporal responsiveness of vision. Chapter 18, Adler's physiology of the eye. The C. V. Mosby Co.

Harwerth, R. S., et. al. (1980). Sustained and transient channels in the monkey. Vision Research. Vol. 20, pp. 15–22. Pergamon Press.

Hearty, P. J. (1993). Achieving and Confirming Optimum Image Quality. In Digital Images and Human Vision, Watson, A. B. (Ed.), MIT Press, chapter 12, pp. 149162.

Hebert, M -P., et. al. (1992). MARTI—A Multiprocessor Architecture for Ray Tracing Images. In: Advances in Computer Graphics Hardware V—Rendering, Ray Tracing and Visualization Systems. Grimspace, R. L. and Kaufman, A. (Eds.). Springer-Verlag publishers.

Heinrich, J. (1993). MIPS R4000 Microprocessor User's Manual, PTR Prentice Hall.

Helman, J. (1995). Graphics Techniques for Walkthrough Applications. Silicon Graphics Inc. SIGGRAPH 95 Lecture B, Course#32, Interactive Walkthrough of Large Geometric Databases, Course Organizer: E. L. Brechner.

Hennessy, J. L. and Patterson, D. A. (1990). Computer Architecture—A Quantitative Approach, Morgan Kaufmann Publishers.

Hess, R. F. and Snowden, R. J. (1992). Temporal Properties of Human Visual Filters: Number, Shapes and Spatial Covariation. Vision Research, Vol. 32, No. 1, pp. 47–59. Pergamon Press.

Hess, R. F. and Snowden, R. J. (1992). Temporal Frequency Filters in the Human Peripheral Visual Field. Vision Research, Vol. 32, No. 1, pp. 61–72. Pergamon Press.

Horiguchi, S., et. al. (1993) Parallel processing of Incremental Ray Tracing on a Shared Memory Multiprocessor. The Visual Computer (1993) 9, pp. 371–380.

Hsiung, P -K. (1992) Accelerating Arts. The Visual Computer (1992) 8, pp. 181–190.

Jacob, R. J. K. (1995). Eye Tracking in Advance Interface Design. Virtual Environments and Advanced Interface Design, Oxford Univ. Press, Chapter 7, pp. 258–290.

Jevans, D. A. (1992). Object Space Temporal Coherence for Ray Tracing. Apple Computer, Inc., Graphics Interface '91.

Joch, A. (1996). What Pupils Teach Computers. Byte Magazine, July '96, pp. 99–100, Kalawsky, R. S. (1993). The Science of Virtual Reality and Virtual Environments. Addison-Wesley Publishing Co.

Kalawsky, R. S. (1993). Critical Aspects of Visually Coupled Systems. In Virtual Reality Systems, Earshaw, R. A., et. al. (Ed.), Academic Press, chapter 14, pp. 203–212.

Kelly D. H. 1985, Visual Processing of Moving Stimuli, Journal of the Optical Society of America, A,2. 216–225.

Kirk, D. and Voorhies, D. (1990). The Rendering Architecture of the DN10000VS. Apollo Systems Division of Hewlett-Packard, California Institute of Technology. SIGGRAPH 90 Conference Proceedings, pp. 299–307.

Kobayashi, H., et. al. (1988). Load balancing strategies for a parallel ray tracing system based on constant subdivision. The Visual Computer (1988) 4, pp.197–209.

Kocian D. F. and Task H. L. (1995). Visually Coupled Systems Hardware and the Human Interface. Virtual Environments and Advanced Interface Design, Oxford Univ. Press, Chapter 6, pp. 175–257.

Kortum, P. T., and W. S. Geisler(1994). Adaptation Mechanisms in Spatial Vision—I: Flash Thresholds and Background Adaptation. Vision Research Vol.35, No. 11, pp. 1595–1609. Elsevier Science Ltd.

Kowler, E. (1991). The Stability of Gaze and its Implications for Vision. Vision and Visual Dysfunction: Eye Movements, Chapter 4, pp. 71–92. CRC Press, Inc.

Kowler, E., et. al. (1995). The Role of Attention in the Programming of Saccades. Vision Research Vol. 35, No. 13, pp. 1897–1916. Elsevier Science Ltd.

Kumar, V., et. al. (1994). Introduction to Parallel Computing—Design and analysis of algorithms, The Benjamin/Cummings Publishing Co., Inc. Lampton, C.(1994). Gardens of Imagination: Programming 3D Maze Games in C/C++. Waite Group Press.

LaMothe, A. (1995). Black Art of 3D Game Programming. Waite Group Press.

Landy, M. S., et. al. (1996). Exploratory vision—The Active Eye, Springer-Verlag New York, Inc.

Lappe, M. and Rauschefcker, J. P. (1995). An Illusory Transformation in a Model of Optical Flow Processing. Vision Research Vol. 35, No. 11, pp. 1619–1631. Elsevier Science Ltd.

Lee, M. K.,et.al. (1985). Statistically Optimized Sampling for Distributed Ray Tracing. Univ. of Tulsa. SIGGRAPH 85 Conference Proceedings, pp. 61–67.

Leighh, J. R., M. D. and Zee, D. S.(1991). The Neurology of Eye Movements, edition 2. F. A. Davis Co., Phila.

Levoy, M. (1995). Polygon-Assisted JPEG and MPEG Compression of Synthetic Images. Stanford University. SIGGRAPH 95 Conference Proceedings, pp. 21–27.

Levoy, M. and Hanrahan, P. (1996). Light Field Rendering. Stanford University. SIGGRAPH 96 Conference Proceedings, pp. 31–42.

Lin, T. and Barron, J. L.(1994). Image Reconstruction Error for Optical Flow. Proceeding: Vision Interface '94. Canadian Image Processing and Pattern Recognition Society.

Lisberger et al. (1987) Annual Review of Neuroscience 1987, 10:97–129.

Luntinen, O., et. al. (1995). Modeling the Increase of Contrast Sensitivity with Gating Area and Exposure time. Vision Res. Vol. 35, No. 16, pp. 2339–2346. Elsevier Science Ltd.

MacDonald, J. D. and Booth, K. S. (1990) Heuristics for ray tracing using space subdivision. The Visual Computer (1990) 6, pp. 153–166.

Marciel, P. W. C. and Shirley, P. (1995). Visual Navigation of Large Environments Using Textured Clusters. 1995 Symposium on Interactive 3D Graphics, Monterey, Calif.

Marr, D. (1982). Vision, W. H. Freeman and Co.

Masuishi, T., et. al.(1992). 6,000×2,000 Display Prototype. Visual Language Workshop, The Media Laboratory, MIT SPIE Vol. 1664 High-Resolution Displays and Projection Systems (1992).

Matin, E. (1974). Saccadic Suppression: A review and an analysis. Psychological Bulletin, The American Psychological Assoc. (December 1974), vol. 81, no. 12, pp. 889–917.

McMillan, L. and Bishop, G. (1995). Plenoptic Modeling: An Image-Based Rendering System. Department of Computer Science, University of North Carolina at Chapel Hill. SIGGRAPH 95 Conference Proceedings, pp. 39–46.

Mitchell, D. P. (1987). Generating Antialiased Images at Low Sampling Densities. AT&T Bell Laboratories. SIGGRAPH 87 Conference Proceedings, pp. 65–69.

Mitchell, D. P. (1996). Consequences of Stratified Sampling in Graphics. Microsoft Corporation. SIGGRAPH 96 Conference Proceedings, pp. 277–280.

Molnar, S.,et.al. (1992). PixelFlow: High-Speed Rendering Using Image Composition. Department of Computer Science, University of North Carolina at Chapel Hill. SIGGRAPH 92 Conference Proceedings, pp. 231–240.

Mueller, C. (1995). The Sort-First Rendering Architecture for High-Performance Graphics. Univ. of Carolina at Chapel Hill. 1995 Symposium on Interactive 3D Graphics, Monterey, Calif.

Nakamura, H., et.al. (1991). A Design of Eye Movement Monitoring System for Practical Environment. SPIE, Vol. 1456 Large-screen-projection, Avionic and Helmet-mounted Displays, pp. 226–228.

Narayanaswami, C. (1996) Superscalar RISC machines, straight-line programs, and graphics. The Visual Computer (1996)12, pp. 117–131.

Olano, M., et. al. (1995). Combating Rendering Latency. Univ. of Carolina at Chapel Hill. 1995 Symposium on Interactive 3D Graphics, Monterey, Calif.

Painter, J. and Sloan, K. (1989). Antialiased Ray Tracing by Adaptive Progressive Refinement. University of Washington. SIGGRAPH 89 Conference Proceedings, pp. 281–288.

Parke, F. I. (1991). Perception-based Animation Rendering. N.Y. Institute of Technology. Computers and Graphics '91, 1049-8907/91/020044-08. John Wiley & Sons, Ltd.

Pola, J., and H. J. Wyatt(1991). Smooth Pursuit: Response Characteristics, Stimuli and Mechanisms. Vision and Visual Dysfunction: Eye Movements, chapter 6, pp. 138–149. CRC Press, Inc.

Potmesil, M. and Hoffert, E. M. (1989). The Pixel Machine: A Parallel Image Computer. AT&T Bell Laboratories. SIGGRAPH 89 Conference Proceedings, pp. 69–78.

Reddy, M. (1996). SCROOGE: Perceptually-Driven Polygon Reduction. Univ. of Edinburgh. Computer Graphics Forum (1996), Vol. 15, No. 4, pp. 191–203.

Regan, M. and Pose, R. (1994). Priority Rendering with a Virtual Reality Address Recalculation Pipeline. Monash University. SIGGRAPH 94 Conference Proceedings, pp. 155–162.

Robinson, D. A.(1981) Control of Eye Movements. Handbook of Physiology—The Nervous System II, chapter 28, pp. 1275–1319.

Robinson, D. A.(1991) Overview. Vision and Visual Dysfunction: Eye Movements, chapter 14, pp. 320–331. CRC Press, Inc.

Robinson, R. M., Capt., USAF, M. L. Thomas, M. S., and P. A. Wetzel, Ph. D.(19?). Eye Tracker Development on the Fiber Optic Helmet Mounted Display. SPIE Vol. 1116 Helmet Mounted Displays(1986).

Roufs, J. A. J. and Bouma, H. (1980). Towards Linking Perception Research and Image Quality. Proceedings of the S. I. D., Vol.21/3 1980.

Roufs, J. A. J. and Boschman, M. C.(1991). Visual Comfort and Performance. Vision and Visual Dysfunction: The Man-Machine Interface (Vol 15), chapter 3, pp. 24–40. CRC Press, Inc.

Ruelen, J. P. H., et. al. (1988). Precise recording of Eye Movement: the IRIS Technique Part 1. Medical & Biological Engineering & Computing, January '88, pp. 20–29.

Rubin G. S. and Turano, K. (1992). Reading Without Saccadic Movement. Vision Research, Vol.32, No. 3, pp.895–902. Pergamon Press.

Rushmeier, H. E. and Ward, G. J. (1994). Energy Preserving Non-linear Filters. National Institute of Standards and Technology. SIGGRAPH 94 Conference Proceedings, pp. 131–138.

Scherson, I. D. and Caspary, E. (1988) Multiprocessing for ray tracing: a hierarchical self-balancing approach. The Visual Computer (1988) 4, pp. 188–196.

Schmalstieg, D., and Gervautz, M. (1996). Demand-Driven Geometry Transmission for Distributed Virtual Environments. Vienna Univ. of Technology. Eurographics '96.

Schneider, B -O.(1991). Towards a Taxonomy for Display Processors. In: Advances in Computer Graphics Hardware IV, Grimsdale, R. L. and Straber, W. (Eds.), EurographicSeminars, Springer-Verlag, pp. 3–36.

Segal, M.,et.al. (1992). Fast Shadows and Lighting Effects Using Texture Mapping. Silicon Graphics Computer Systems. SIGGRAPH 92 Conference Proceedings, pp. 249–252.

Seitz, S. M. and Dyer, C. R. (1996). View Morphing. Univ. of Wisconsin-Madison. SIGGRAPH 96 Conference Proceedings, pp. 21–30.

Shinya, M., et. al (1987). Principles and Applications of Pencil Tracing. NTT Electrical Communications Laboratories, Tokyo, Japan. SIGGRAPH 87 Conference Proceedings, pp. 45–54.

Shinya, M. (1993). Spatial Anti-aliasing for Animation Sequences with Spatio-temporal Filtering. NTT Human Interface Laboratories, Tokyo, Japan. SIGGRAPH 93 Conference Proceedings, pp. 289–296.

Shirley, P. (1991). Discrepancy as a Quality Measure for Sample distributions. Indiana University. Eurographics '91.

Siderov, J., et. al. (1995). The Role of Attention in the Programming of Saccades. Vision Research Vol. 35, No. 13, pp. 1897–1916. Elsevier Science Ltd.

Siderov, J. and Harwerth, R. S. (1995). Stereopsis, Spatial Frequency and Retinal Eccentricity. Vision Research Vol. 35, No. 16, pp. 2329–2337. Elsevier Science Ltd.

Sistare, S. and Friedell, M. (1989). A Distributed system for Near-Real-Time Display of Shaded Three-dimensional graphics. Harvard Univ. Graphics Interface '89.

Smets, G. J. F., and Overbeeke, K. J. (1995). Trade-off Between Resolution and Interactivity in Spatial Task Performance. IEEE Computer Graphics & Applications, September '95, pp. 46–51.

Snyder and Barr, ACM Proceedings SIGGRAPH Vol 21, No.4, July 1987, pp 119–128.

Steinman, B. A. et. al. (1995). Visual Attention Mechanisms Show Center-Surround Organization. Vision Research Vol. 35, No. 13, pp.1859–1869. Elsevier Science Ltd.

Stone, H. S. (1993). High-Performance Computer Architecture, Addison-Wesley Publishing Co.

Sung, K. and Kubitz, W. J. (1995) Tracing rays with the Area Sampling Machine. The Visual Computer (1995)11, pp. 477–496.

Thomas, J. P. (1975). Spatial Resolution and Spatial Interaction. In: Handbook of Perception, Vol. V, Seeing. Carterette, E. C. and Friedman, M. P. (Eds.), Academic Press, ch. 7, pp. 233–259.

Thomas, D., et. al. (1989) Anti-aliased Ray Tracing with Covers. AT&T Bell laboratories. Computer Graphics Forum 8 (1989) pp. 325–336.

Torborg, J. and Kajiya, J. T. (1996). Talisman: Commodity Realtime 3d Graphics for the PC. Microsoft Corporation. SIGGRAPH 96 Conference Proceedings, pp. 353–363.

Tost, D. (1991). An Algorithm of Hidden Surface Removal Based on Frame-to-frame coherence. Eurographics '91.

Tyler, C. W. (1978). Hyper-Resolution in Human Perception of movement in Visual Displays. Proceedings of the S. I. D., Vol. 19/3 Third Quarter '78.

Vince J.(1995). Virtual Reality Systems, Addison-Wesley Publishing Co.

Wallach, D. S., et. al. (1994). Accelerated MPEG Compression of Dynamic Polygonal Scenes. Department of Computer Science, Princeton University. SIGGRAPH 94 Conference Proceedings, pp. 193–196.

Walsum, T., et.al. (1991). Refinement criteria for adaptive stochastic ray tracing of textures. Delft University of Technology. Eurographics '91.

Watson et al. (1986) J. Optical Society of America. A,3(3), 300–307,1986.

Watson et al. NASA Tech Paper 2211

Whitted (1980) Communications of the ACM, June 1980, pg. 343–349.

Wilson, H. R. (1991) Pattern Discrimination, Visual Filters, and Spatial Sampling Irregularity. Computational Models of Visual Processing, MIT Press, Chapter 12, pp. 153–168.

Yagel, R., et. al. (1992). Discrete Ray Tracing. IEEE Computer Graphics & Applications, September, pp.19–28.

Yellott, J. I. Jr., B. A. Wandell, and T. N. Cornsweet (1984). The beginnings of visual perception: the retinal image and its initial encoding. Handbook of Physiology, sect. 1, vol. II. American Physiological Society.

Yoshida, M., et. al.(1991). A Dedicated Graphics Processor SIGHT-2. In: Advances in Computer Graphics Hardware IV, Grimsdale, R. L. and Straber, W. (Eds.), EurographicSeminars, Springer-Verlag, pp. 151–169.

Yoshida, A, J. P. Rolland, and J. H. Reif (1995) Design and Applications of a High-Resolution Insert Head-Mounted-Display. IEEE 1995 Conference on Virtual Reality, Orlando, Fla. 0-8186-7084-3/95

Young L. R., AND D. Sheena (1975) Methods & Designs—Survey of eye movement recording methods. Behavior Research Methods & Instruments, vol. 7, 397–429.

Yuan, Y., et. al. (1988) GemstoneFire: adaptive dispersive ray tracing of polyhedrons. The Visual Computer (1988) 4, pp. 259–270.

IEEE Standard for Scalable Coherent Interface (SCI), (1992). IEEE Std. 1596–1992. Recognized as an American National Standard (ANSI). The Institute of Electrical and Electronics Engineers, Inc.

What is claimed as new and desired to be secured by Letters Patent of the United States is:

1. In a computer-implemented method of rendering a sequence of images of a 3-D model space, wherein the model space comprises a plurality of graphics primitives, the method of rendering each of said graphics primitives at a spatial resolution that reflects an ability of a human visual system to spatially resolve said graphics primitive, the method comprising the steps, for each of said graphics primitives, of:
   a) determining an initial exposure time at which a graphics primitive becomes exposed in an image sequence;
   b) storing the initial exposure time for said graphics primitive;
   c) determining, for said graphics primitive, an exposure duration corresponding to a current frame of the image sequence by subtracting (1) a current time corresponding to said current frame from (2) said initial exposure time;
   d) rendering, for said current frame, said graphics primitive at a spatial resolution that is proportional to the exposure duration of said graphics primitive if said exposure duration is substantially less than a known time required for the human visual system to maximally resolve a newly exposed target.

2. The method of claim 1, wherein the step d) of rendering renders said graphics primitive based on a relationship between a spatial acuity of the human visual system and a retinal exposure time.

3. The method of claim 1, wherein the step d) of rendering comprises utilizing primitive reprojection.

4. In a computer-implemented method of rendering a sequence of images of a 3-D model space, wherein the model space comprises a plurality of objects wherein each object is represented at a plurality of levels of detail, the method of rendering said objects at a level-of-detail that reflects an ability of a human visual system to spatially resolve said objects comprising the steps, for each of said objects, of:
   a) determining an initial exposure time at which an object becomes exposed in an image sequence;
   b) storing, for said object, the initial exposure time;
   c) determining, for said object, an exposure duration corresponding to a current frame of said image sequence by subtracting a time corresponding to said current frame from said initial exposure time;
   d) rendering, for said current frame, said object by rendering a representation of said object having a level-of-detail that is proportional to the exposure duration of said object if the exposure duration is substantially less than a known time required for the human visual system to maximally resolve a newly exposed object.

5. The method of claim 4, wherein the step d) of rendering renders said object based on a relationship between a spatial acuity of the human visual system and a retinal exposure time.

6. The method of claim 3, wherein the step d) of rendering comprises utilizing primitive reprojection.

7. In a computer-implemented method of encoding graphics information for an image sequence of a 3-D model space, the model space comprising graphics primitives representing a plurality of objects at a plurality of levels of detail, by determining and storing, for substantially each image of said image sequence, visibility event information comprising a set of graphics primitives that becomes newly visible during an image of said image sequence, the method of determining and storing newly visible graphics primitives that reflect an ability of a human visual system to spatially resolve newly exposed objects comprising the steps of:
   a) determining, for a current frame of said image sequence, objects that are newly visible; and
   b) storing, for the current frame of said image sequence, newly visible graphics primitives from source objects represented at a low level-of-detail.

8. In a computer-implemented method of encoding graphics information for an image sequence of a 3-D model space, the model space comprising graphics primitives defining a plurality of objects, each represented at a plurality of levels of detail, by determining and storing, for each image of said image sequence, visibility event information comprising a set of graphics primitives that becomes newly visible during an image of said image sequence, the method of determining and storing newly visible primitives that reflect an ability of a human visual system to spatially resolve the corresponding newly exposed object comprising the steps of:
   a) determining, for each of said plurality of objects in the 3-D model space, for each level-of-detail representation of said plurality of objects, a threshold exposure duration at which the human visual system cannot substantially distinguish between each level-of-detail representation and a next higher level-of-detail representation of said object;
   b) storing the threshold exposure duration for each of said level-of-detail representations of said plurality of objects;
   c) determining an initial exposure time at which an object becomes exposed in said image sequence;
   d) storing, for each exposed object, the initial exposure time;

e) storing, for each exposed object, an indication of the level-of-detail representation of the object that was last selected to determine and encode newly visible graphics primitives of said object;

f) determining, for each exposed object, an exposure duration of said object for a current frame of said image sequence by subtracting a time corresponding to the current frame from said initial exposure time;

g) comparing, for each exposed object in the current frame of said image sequence, (1) the exposure duration of said exposed object to (2) the threshold exposure duration corresponding to the level-of-detail representation of the object that was last selected to determine and encode newly visible primitives; and h) replacing previously encoded graphics primitives visible in the current frame with graphics primitives from a higher level-of-detail source object representation if, the step g) of comparing, determines that the exposure duration for the source object exceeds the threshold exposure duration for the corresponding level-of-detail representation of the source object that was last selected to determine and encode newly visible graphics primitives.

9. In a computer-implemented method of rendering an image sequence of a 3-D model space, wherein the model space comprises graphics primitives defining a plurality of objects wherein each object is represented at a plurality of levels of detail, the method of rendering, by primitive reprojection, newly exposed objects at a level-of-detail that reflects an ability of a human visual system to spatially resolve said objects comprising the steps of:

a) transforming and rasterizing previously exposed graphics primitives;

b) identifying regions in a current image of said sequence of images that may contain newly exposed graphics primitives;

c) searching said regions of the current image for newly visible graphics primitives using an image-order, front-to-back visibility tracing in a 3-D model space containing objects represented at a low level-of-detail; and d) rasterizing the newly visible graphics primitives.

10. The method according to claim 9, further comprising the steps of:

e) determining, for each of said objects in the 3-D model space, for each level-of-detail representation of said objects, a threshold exposure duration at which the human visual system cannot substantially distinguish between each level-of-detail representation and a next higher level-of-detail representation of said object;

f) storing the threshold exposure duration for each of said level-of-detail representations of objects;

g) determining an initial exposure time at which an object becomes exposed in said image sequence;

h) storing, for each exposed object, the initial exposure time;

i) determining, for a current frame of said sequences of images, an exposure duration of each exposed graphics primitive;

j) comparing (1) the exposure duration of said each exposed graphics primitive to (2) the threshold exposure duration of the specific level-of-detail representation of the corresponding source object that was last selected to determine a newly visible graphics primitive; and k) replacing previously exposed graphics primitives visible in the current frame with graphics primitives from a higher level-of-detail source object representation if the step j) of comparing determines that the exposure duration for said source object exceeds the threshold exposure duration for the corresponding level-of-detail representation of the source object that was last employed during visibility tracing for new graphics primitives, wherein the step k) of replacing comprising the step of visibility tracing in regions of the current image containing said previously exposed graphics primitives, wherein said visibility tracing comprises visibility tracing in a 3-D model space containing said source object represented at a higher level-of-detail.

11. In a computer-implemented method of encoding graphics information for an image sequence of a 3-D model space, the model space comprising graphics primitives defining a plurality of objects wherein each object is represented at a plurality of levels of detail, by determining and storing, for each image of said image sequence. visibility event information comprising a set of graphics primitives that becomes newly visible during an image of said image sequence, the method of determining and storing newly visible graphics primitives by selecting said graphics primitives from an object having a level-of-detail that reflects an ability of a human visual system to spatially resolve said object, the method comprising the steps of:

a) determining, for each of said objects in the 3-D model space, for each level-of-detail representation of said objects, a threshold image-space velocity above which the human visual system cannot substantially distinguish between each level-of-detail representation and a next higher level-of-detail representation of said object;

b) storing the threshold image-space velocity for each of said level-of-detail representations of objects;

c) storing, for each object visible in a current frame of said image sequence, an indication of the level-of-detail representation of the object that was last selected to determine and encode newly visible graphics primitives of said object;

d) determining, for each object visible in the current frame of said image sequence, the image-space velocity of the object;

e) comparing, for each object visible in the current frame of said image sequence, (1) the image-space velocity of said exposed object to (2) said threshold image-space velocity corresponding to the level-of-detail representation of the object that was last selected to determine and encode newly visible primitives; and f) replacing previously encoded graphics primitives visible in the current frame with graphics primitives from a higher level-of-detail source object representation if the step g) of comparing determines that the image-space velocity for the source object exceeds the threshold exposure duration for the corresponding level-of-detail representation of the source object that was last selected to determine and encode newly visible graphics primitives.

12. A method of load-balancing a shared-memory multiprocessor that implements a computer-implemented method of rendering an image sequence, wherein each subprocessor of said multiprocessor is assigned to render at least one subimage region of an image, the method comprising the steps of:

tracking eye movements of a viewer in real-time; and assigning each subimage processor to a subimage region that corresponds to a specific region of a visual field of the viewer.

13. The method according to claim 12, wherein the method comprises utilizing primitive reprojection.

14. The method according to claim 12, wherein the method comprises utilizing sample reprojection.

15. The method according to claim 12, further comprising the steps of:
   g) determining, for each of the subimage regions, a luminance level of the subimage region at a time corresponding to the current frame of said image sequence;
   h) determining, by employing a relationship substantially describing a time-course of retinal light adaptation, a current state of light adaptation of retinal receptors corresponding to each of said subimage regions, the step h) of determining comprising the sub-steps of:
      h1) determining a time interval since the state of light adaptation of the corresponding retinal receptors was last determined;
      h2) determining the luminance level to which the retinal receptors corresponding to said subimage region are currently adapted by employing said relationship substantially describing the time-course of retinal light adaptation, and using the values of:
         1) the current luminance level of the subimage region determined in step g),
         2) the time interval determined in step h1),
         3) the previous state of light adaptation of the corresponding retinal elements stored in step i);
   i) storing the current state of light adaptation of the retinal receptors corresponding to said subimage region; and
   j) rendering a subimage with a reduced spatial resolution if the current luminance level of the subimage determined in step g) is substantially less than the luminance level to which the retinal receptors corresponding to the subimage are currently adapted as determined in step h2).

16. The method of claim 15, wherein step g) of determining comprises the step of determining, for each of said subimage regions, substantially the luminance level of the subimage region at a time corresponding to the current frame of said image sequence by using a previously stored value of said luminance level of the same subimage region at a time corresponding to an earlier frame of said image sequence.

* * * * *